(12) United States Patent
Nagayama

(10) Patent No.: US 6,511,274 B1
(45) Date of Patent: Jan. 28, 2003

(54) METAL FASTENING MEMBER WITH SEPARATABLE FLARING CAP

(75) Inventor: Yutaka Nagayama, Kishiwada (JP)

(73) Assignee: Nagayama Electronic Industry Co., Ltd., Kokawa-cho (JP)

( * ) Notice: Subject to any disclaimer, the term of this patent is extended or adjusted under 35 U.S.C. 154(b) by 36 days.

(21) Appl. No.: 09/638,413

(22) Filed: Aug. 14, 2000

Related U.S. Application Data

(63) Continuation-in-part of application No. 09/469,460, filed on Dec. 21, 1999.

(30) Foreign Application Priority Data

| | | |
|---|---|---|
| Nov. 10, 1999 | (JP) | 11-320178 |
| Jan. 28, 2000 | (JP) | 2000-020689 |

(51) Int. Cl.[7] ................................ F16B 37/04
(52) U.S. Cl. ................. 411/179; 411/181; 411/501
(58) Field of Search ................. 411/179, 180, 411/181, 183, 427, 501

(56) References Cited

U.S. PATENT DOCUMENTS

| | | | |
|---|---|---|---|
| 28,212 A | * | 1/1898 | Von Biedenfeld |
| 1,045,562 A | * | 11/1912 | Kennedy |
| 3,365,998 A | * | 1/1968 | Zahodiakin |
| 4,077,647 A | | 3/1978 | Nagayama |
| 5,195,854 A | | 3/1993 | Nagayama |
| 5,238,344 A | | 8/1993 | Nagayama |
| 5,348,432 A | | 9/1994 | Nagayama |
| 5,429,466 A | | 7/1995 | Nagayama |
| 5,503,596 A | | 4/1996 | Nagayama |
| 5,618,144 A | | 4/1997 | Leistner |
| 5,823,729 A | | 10/1998 | Nagayama |
| 5,904,461 A | * | 5/1999 | McKarge, Jr. |
| 5,908,664 A | | 6/1999 | Nagayama |
| 6,109,849 A | | 8/2000 | Nagayama |
| 6,139,237 A | | 10/2000 | Nagayama |
| 6,183,181 B1 | * | 2/2001 | Leistner et al. |

FOREIGN PATENT DOCUMENTS

| | | | |
|---|---|---|---|
| GB | 1157734 | | 7/1969 |
| JP | 11-241713 | * | 9/1999 |

\* cited by examiner

*Primary Examiner*—Flemming Saether
(74) *Attorney, Agent, or Firm*—W. F. Fasse; W. G. Fasse

(57) ABSTRACT

A T nut has a cap portion 45 integrally formed continuous from a tip end portion of a flarable portion 34. At a connecting region between flarable portion 34 and cap portion 45, an inner surface 44 of flarable portion 34 is formed recessed outward. With this structure, the T nut can be driven cleanly directly into a solid workpiece object, without the necessity of providing a receiving hole in advance. Also with this structure, a caulking force applied by a caulking counter tool to the tip end portion of the T nut separates the cap portion from the flarable portion and outwardly caulks and flares the flarable portion to secure the T nut to the workpiece.

20 Claims, 89 Drawing Sheets

50(150a)

50(150a)

50(150a)

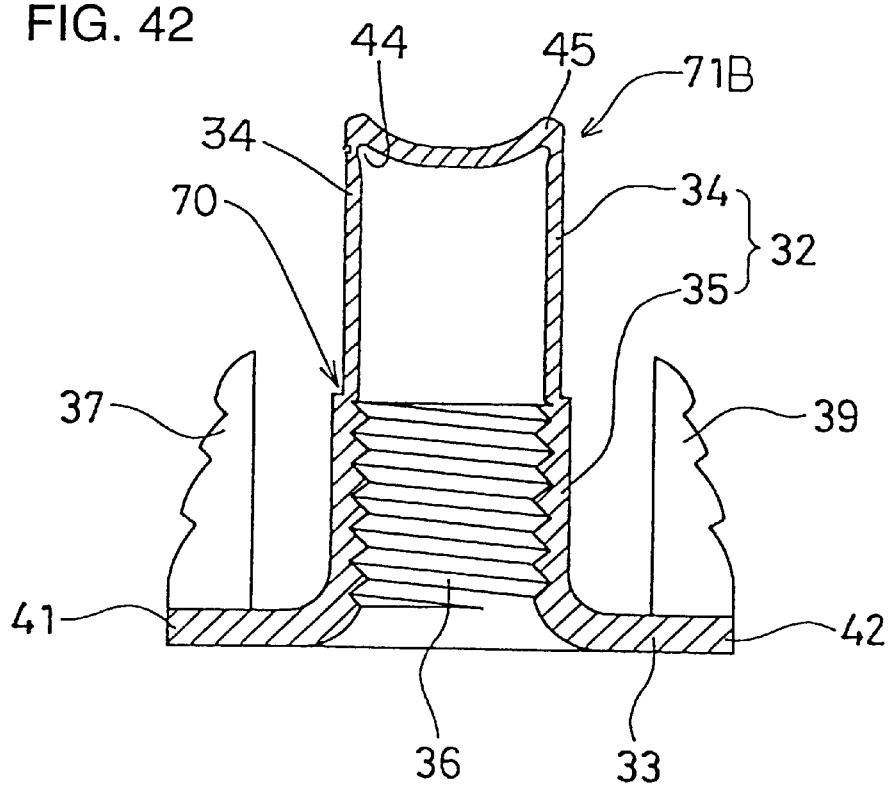

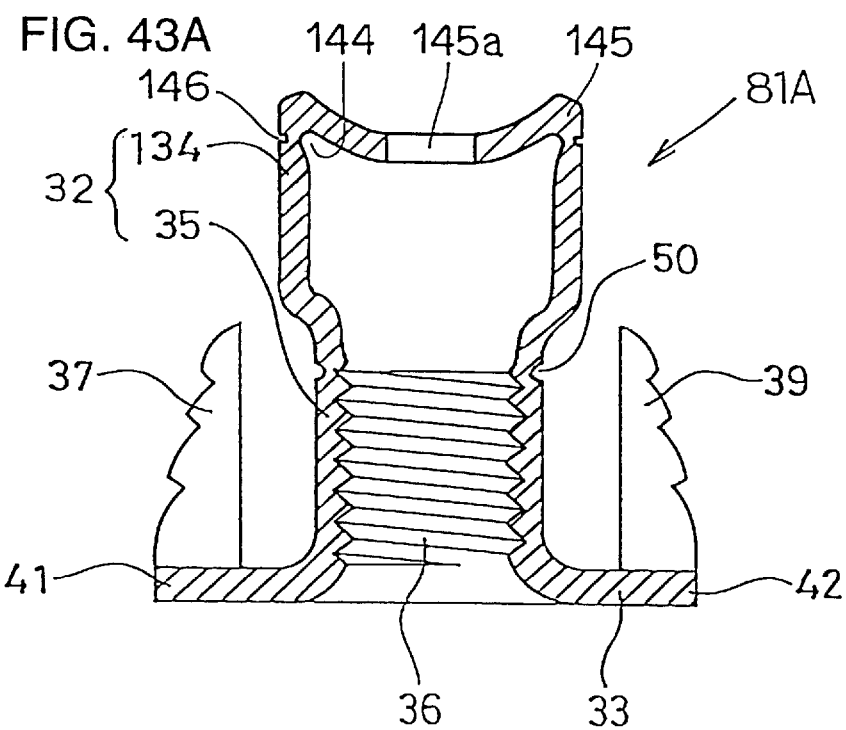
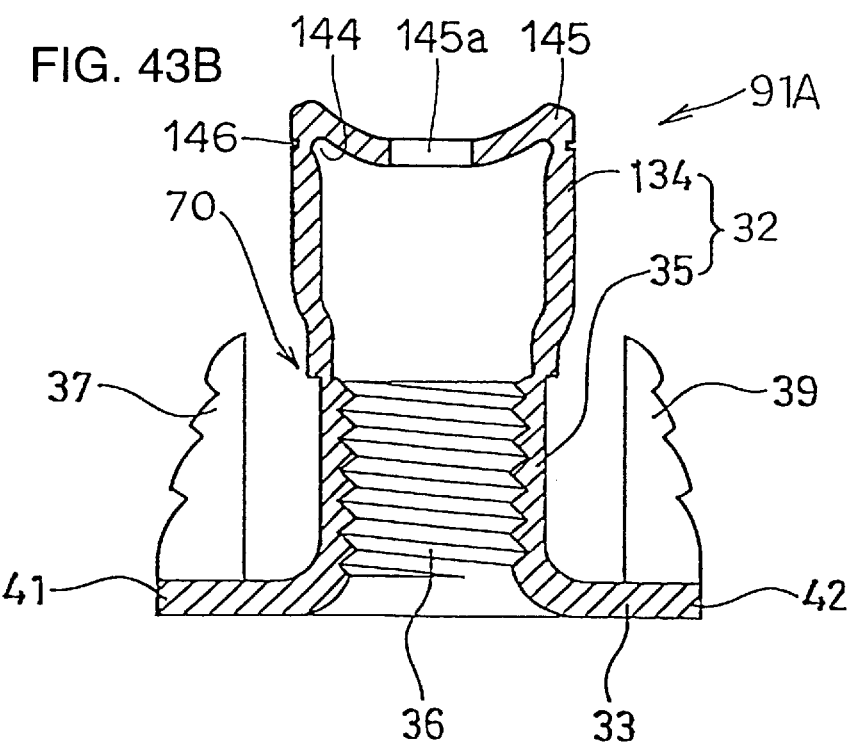

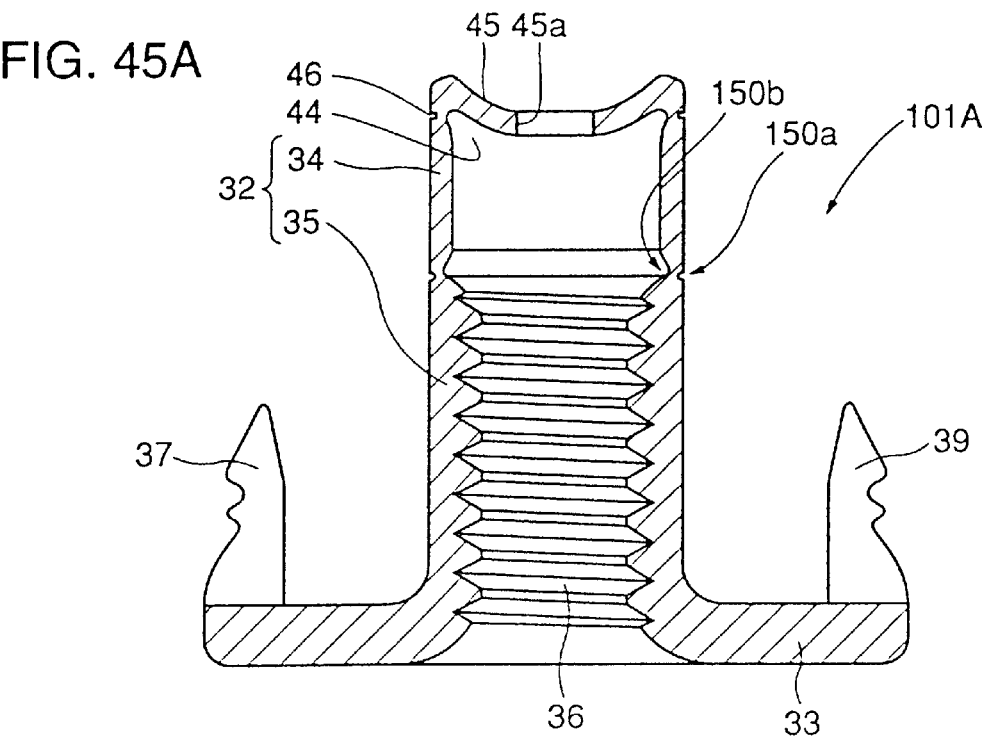
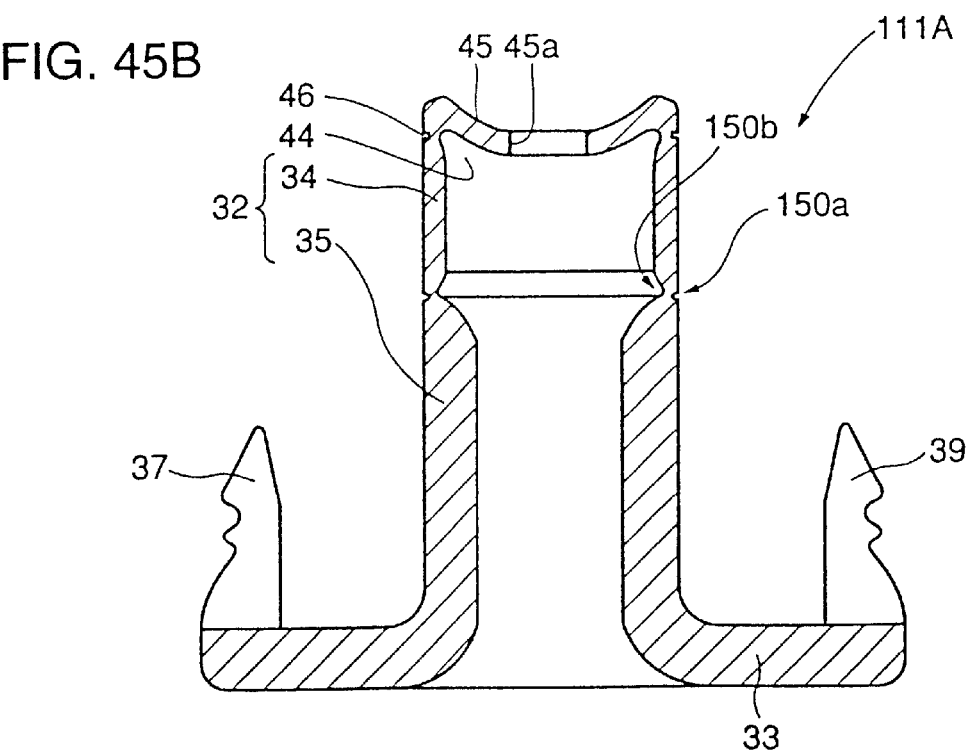

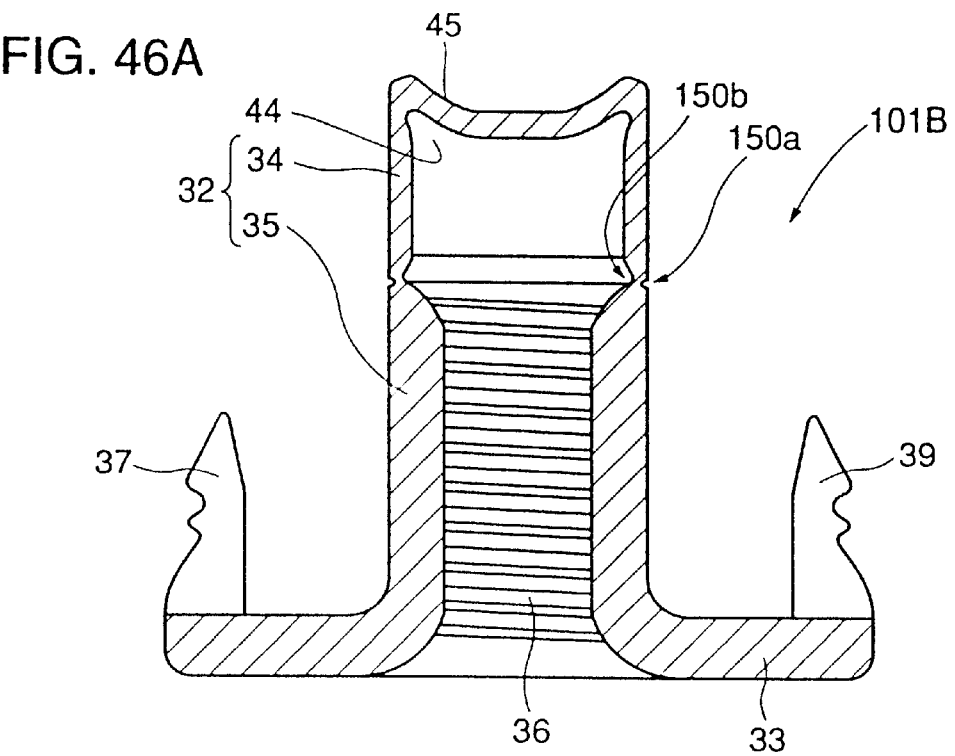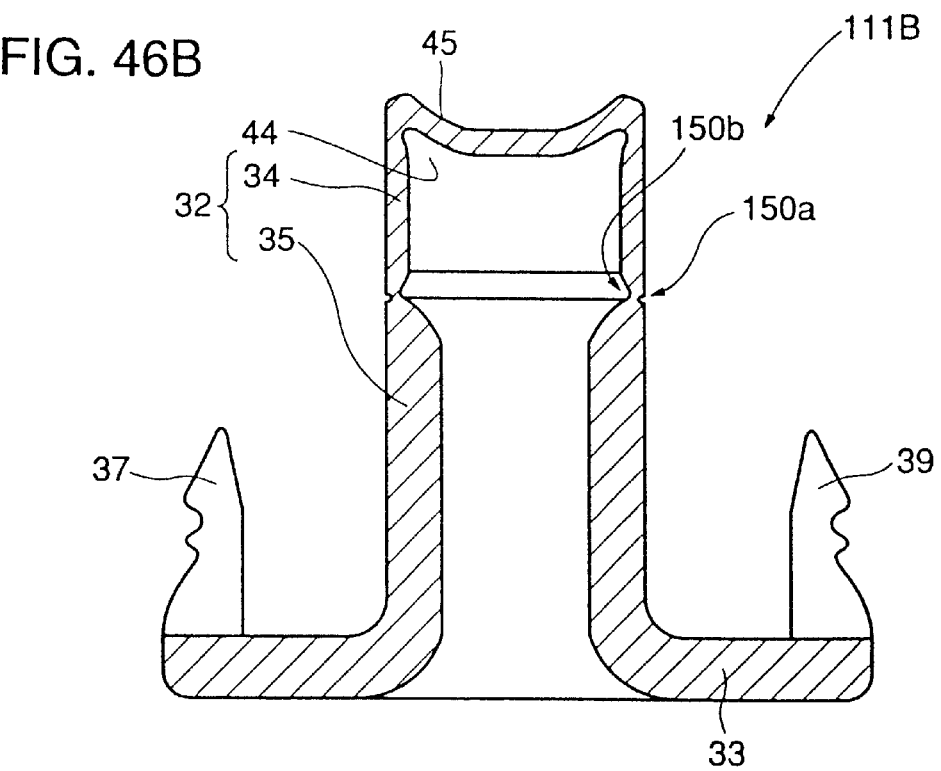

METAL FASTENING MEMBER WITH SEPARATABLE FLARING CAP

CROSS-REFERENCE TO RELATED APPLICATION

The present application is a Continuation-In-Part application of my copending application U.S. Ser. No. 09/469,460, filed on Dec. 21, 1999.

BACKGROUND OF THE INVENTION

1. Field of the Invention

The present invention relates to a metal fastening member such as a T nut, a rivet and the like or to an outer casing member for a bullet having a hollow shaft portion. More specifically, the present invention relates to a metal fastening member and an outer casing member for a bullet having such a structure in that a cap provided at a tip end portion is easily separated to come off when driven into an object.

2. Description of the Background Art

A conventional T nut having a thin flarable portion (prospective caulked portion) in the shaft portion is disclosed, for example, in U.S. Pat. Nos. 5,238,344 or 5,348,432.

A T nut 11 described in U.S. Pat. No. 5,238,344 has such a shape as shown in FIGS. 95A and 95B, which is provided as an integral part by sheet metal working of an iron based metal plate, for example, which T nut includes a shaft portion 12 and a flange portion 13 protruding outward from a first end portion of the shaft portion 12.

Shaft portion 12 has a hollow cylindrical shape with uniform outer diameter, a flarable portion 14 at a second end portion opposite to the first end portion, and a female screw 15a formed on an inner peripheral surface of a female screw forming portion 15 other than the flarable portion 14. Flarable portion 14 is made thinner in thickness as compared with female screw forming portion 15. Therefore, when female screw 15a is to be formed, the thread can be formed either from the side of the first end portion or the second end portion of the shaft portion 12.

Flange portion 13 has two pawls 16 formed by mushing part of an outer peripheral edge of flange portion 13 from the outer side to the inner side, which pawls oppose to each other at 180°, protruding toward the second end portion of shaft portion 12. As a result of formation of the pawls 16, notches 17 having approximately semi circular cross section are left at the outer peripheral edge of flange portion 13.

Such a T nut 11 is used, for example, in the manner as shown in FIG. 97A. Referring to FIG. 97A, shaft portion 12 is first inserted to an object 19 of fixing formed of resin material or wood and having a receiving hole 18 formed in advance, and in this state, the flarable portion 14 is caulked by a caulker, so that a caulked portion 14a is formed on one surface side of object 19 of fixing. At the same time, pawls 16 are driven into the other surface of the object 19 of fixing. Thus T nut 11 is completely fixed in object 19.

A T nut 31 described in U.S. Pat. No. 5,348,432 has such a shape as shown in FIGS. 96A and 96B. Similar to T nut 11 described above, it is provided as an integral body by sheet metal working of an iron based metal plate, for example, and the T nut has a shaft portion 32 and a flange portion 33 protruding outward from the first end portion of shaft portion 32. The shaft portion 32 has a female screw forming portion 35 where a female screw 36 is formed on the inner periphery, and the T nut also has a flarable portion (prospective caulked portion) 34. The structure of T nut 31 is different from that of T nut 11 in that two pairs of pawls 37 and 38 as well as 39 and 40 extending from the first end portion toward the second end portion are arranged opposing in the radial direction of flange portion 33, so that flange portion 33 as a whole has substantially octagonal shape.

Such a T nut 31 is generally called a "hopper feed T nut", since the T nut 31 can be smoothly moved along a feed track which is provided on a nut fixer for fixing the nut to the object, enabling automatic feeding of the T nuts. For example, British Patent No. 1,157,734 describes a type of such a hopper feed T nut in detail.

FIG. 96B shows the aforementioned feed track 243 in phantom lines. Feed track 243 includes a pair of guide rails 244 and 245 having C-shaped sections, which are symmetrically arranged to be opposite to each other. Flange portion 33 is received by each of the guide rails 244 and 245, so that T nut 31 is moved along feed track 243 in a prescribed posture while locating the pawls 37 to 40 between the guide rails 244 and 245. Though not shown, feed track 243 is frequently bent to bring the T nut 31 into a desired posture, so that shaft portion 32 is aligned with a hole provided in an object, not shown.

T nut 31 is used in the similar manner as T nut 11, as shown in FIG. 97B, for example. More specifically, shaft portion 32 of T nut 31 is inserted to a through hole 18 of an object 19 of fixing, flarable portion 34 is caulked by a caulker in this state, and caulked portion 34a is formed on the side of one surface of object 19. At the same time, pawls 37 to 40 are driven into the other surface of object 19.

In such a state of fixing of T nut 31, rotation of T nut 31 relative to the object 19 of fixing is inhibited by pawl 37 to 40, and flange portion 33 and caulked portion 34a grip the object 19, so that T nut 31 is not slipped from through hole 18. Thus, T nut 31 is firmly fixed on object 19, and the fixed state is maintained semi-permanently.

When the above described T nut is to be driven to the object of fixing under automatic control, however, it is necessary to provide a receiving hole exactly at the expected position to which T nut is driven, of the object of fixing. Further, it is necessary to position the T nut exactly at the receiving hole and to drive the T nut into the object.

Therefore, when the T nut is to be driven to the object of fixing by automatic control, exact positioning is necessary both in the process of forming receiving hole and the process of driving the T nut, which results in lower efficiency of working and increase in cost of driving.

SUMMARY OF THE INVENTION

The present invention was made to solve the above described problems and its object is to provide a metal fastening member having such a structure that enables exact driving into the object of fixing without the necessity of forming a receiving hole in advance.

Another object of the present invention is to provide an outer casing member for a bullet of which tip end portion surely tears simultaneously with collision at the object.

According to an aspect, the present invention provides a metal fastening member including a cylindrical shaft portion having a flarable portion which is expected to be caulked and a shaft body portion provided continuous from the flarable portion, and a cap portion provided continuous from an end portion of the flarable portion opposite to the shaft body portion, and formed of an integral metal material, wherein a connecting region between the flarable portion and the cap portion has such a shape in that, a force bending outward the flarable portion is exerted when a pressing force is applied to the tip end surface of the cap portion in a direction from the side of the cap portion to the side of the flarable portion, so that the cap portion is separated or goes off from the flarable portion by the bending force and the flarable portion comes to be bent outward.

In the above described structure, when the metal fastening member is driven into the object of fixing, the object of fixing is removed by the cap portion, and therefore it is unnecessary to provide in advance a receiving hole for driving the metal fastening member in the object of fixing.

As an example of a preferred embodiment, a structure may be adapted in which an inner surface of the flarable portion is recessed outward at the connecting region between the flarable portion and the cap portion, so that immediately after driving the metal fastening member into the object of fixing, when the cap portion collides an abutting member provided outside, the cap portion is kept in the state colliding against the abutting member, whereas an external force for caulking is applied to the flarable portion. At this time, as the inner surface of the flarable portion is recessed outward, the external force for caulking flows outward. As a result, caulking of the flarable portion is ensured.

In order to implement the present invention in a more preferred state, the following structure may be adopted.

Preferably, in the connecting region between the flarable portion and the cap portion, the inner surface of the flarable portion is curved gradually outward, toward the cap portion.

Preferably, in the connecting region between the flarable portion and the cap portion, the flarable portion has its thickness gradually reduced outward, toward the cap portion.

Preferably, on an outer peripheral surface of the shaft portion at the connecting region between the flarable portion and the cap portion, a groove is provided extending in the peripheral direction.

By adapting the above described structures, the external force applied to the flarable portion flows outward in a preferable state and, as a result, caulking of the flarable portion can be ensured.

In another preferred embodiment, the cap portion has such a shape that has a dent in the central portion. Alternatively, the cap portion has an opening at the central portion. A female screw is provided at an end surface of the opening. Alternatively, the cap portion may have a shape that is protruded at the central portion.

In another preferred embodiment, a female screw is formed at least on a part of the inner periphery of the shaft body portion. Preferably, a flange portion protruding outward is provided at an end portion of the shaft body portion opposite to the flarable portion.

Preferably, the flange has a polygonal shape and includes, on the outer periphery of the flange, a pawl extending toward the side of the cap portion. Alternatively, the flange preferably has a polygonal shape and includes a protruded portion extending toward the side of the cap portion.

Preferably, the flange has a circular shape and includes a pawl on the outer periphery of the flange extending toward the side of the cap portion. Alternatively, the flange preferably has a circular shape and includes a protruded portion extending toward the side of the cap portion. Such a structure enables used of the metal fastening member as a T nut or a rivet.

Preferably, in an approximately annular region providing a periphery of the shaft portion on a side closer to the shaft body portion than the region which will be flared by the caulking of the flarable portion, a portion of small thickness is further provided by locally making thinner the thickness of the shaft portion, which thin portion has sufficient strength so as not to be torn by an axial force exerted in the state of use when the nut is caulked and fixed in the object and breaks when a tractive force larger than a prescribed magnitude is applied in the axial direction, separating the shaft portion into two.

Because of this structure, when a jig that exerts a tractive force in the central axial direction of the shaft portion on the portion of small thickness provided in the shaft portion is used with the fastening member caulked in the object, it becomes possible to tear the metal fastening member at this portion and to separate the member into two easily. As a result, the metal fastening member which has been fixed by the flange portion and the caulked portion gripping the object from the upper and lower surfaces can be easily removed from the object.

In a preferred embodiment, the flarable portion of the shaft portion has an inner diameter larger than the inner diameter of the shaft body portion, and has an outer diameter larger than the outer diameter of the shaft body portion.

In a preferred embodiment of the present invention, the shaft body portion of the shaft portion has an inner diameter larger than the inner diameter of the flarable portion, and an outer diameter larger than the outer diameter of the flarable portion.

The following structure may be adopted for the metal fastening member of a more preferred embodiment.

For example, the present invention provides a metal fastening member including a cylindrical shaft portion having a flarable portion which is expected to be caulked and a shaft body portion provided continuous from the flarable portion, and a flange portion extending outward to an end portion of the shaft body portion opposite to the flarable portion, and formed of an integral metal material, wherein a female screw is formed at least at a part of an inner periphery of the shaft body portion, the flange has a polygonal shape and includes a pawl on the outer periphery extending toward the side of the cap portion, the cap portion has an opening with a female screw provided on an end surface of the opening, and the connecting region between the flarable portion and the cap portion has such a shape that a force bending outward the flarable portion is exerted when a pressing force is applied to the tip end surface of the cap portion in a direction from the side of the cap portion to the side of the flarable portion, so that the cap portion goes off from the flarable portion and the flarable portion is bent outward by the bending force.

As to another preferred embodiment, the present invention provides a metal fastening member including a cylindrical shaft portion having a flarable portion which is expected to be caulked and a shaft body portion provided continuous from the flarable portion, and a flange portion extending outward to an end portion of the shaft body portion opposite to the flarable portion, and formed of an integral metal material, wherein a female screw is formed at least at a part of an inner periphery of the shaft body portion, the flange has a circular shape and includes a pawl on the outer periphery extending toward the side of the cap portion, the cap portion has an opening with a female screw provided on an end surface of the opening, and the connecting region between the flarable portion and the cap portion has such a shape that a force bending outward the flarable portion is exerted when a pressing force is applied to the tip end surface of the cap portion in a direction from the side of the cap portion to the side of the flarable portion, so that the cap portion goes off from the flarable portion and the flarable portion is bent outward by the bending force.

As a further preferred embodiment, the present invention provides a metal fastening member including a cylindrical shaft portion having a flarable portion which is expected to be caulked and a shaft body portion provided continuous from the flarable portion, and a flange portion extending outward to an end portion of the shaft body portion opposite to the flarable portion, and formed of an integral metal material, wherein the shaft body portion of the shaft portion has an inner diameter larger than the inner diameter of the flarable portion and an outer diameter larger than the outer diameter of the flarable portion, a female screw is formed at least at a part of an inner periphery of the shaft body portion, the flange has a polygonal shape and includes a pawl on the outer periphery extending toward the side of the cap portion, the cap portion has an opening with a female screw provided on an end surface of the opening, and the connecting region between the flarable portion and the cap portion has such a shape that a force bending outward the flarable portion is exerted when a pressing force is applied to the tip end surface of the cap portion in a direction from the side of the cap portion to the side of the flarable portion, so that the cap portion goes off from the flarable portion and the flarable portion is bent outward by the bending force.

As a further preferred embodiment, the present invention provides a metal fastening member including a cylindrical shaft portion having a flarable portion which is expected to be caulked and a shaft body portion provided continuous from the flarable portion, and a flange portion extending outward to an end portion of the shaft body portion opposite to the flarable portion, and formed of an integral metal material, wherein the shaft body portion of the shaft portion has an inner diameter larger than the inner diameter of the flarable portion and an outer diameter larger than the outer diameter of the flarable portion, a female screw is formed at least at a part of an inner periphery of the shaft body portion, the flange has a circular shape and includes a pawl on the outer periphery extending toward the side of the cap portion, the cap portion has an opening with a female screw provided on an end surface of the opening, and the connecting region between the flarable portion and the cap portion has such a shape that a force bending outward the flarable portion is exerted when a pressing force is applied to the tip end surface of the cap portion in a direction from the side of the cap portion to the side of the flarable portion, so that the cap portion goes off from the flarable portion and the flarable portion is bent outward by the bending force.

Preferably, a groove is provided extending in the peripheral direction on an outer peripheral surface of the shaft portion at a connecting region between the flarable portion and the cap portion.

Preferably, in the connecting region between the flarable portion and the cap portion, the inner surface of the flarable portion is provided recessed outward.

Preferably, in the connecting region between the flarable portion and the cap portion, the inner surface of the flarable portion is curved gradually outward, toward the cap portion.

Preferably, at the connecting region between the flarable portion and the cap portion, the flarable portion is provided with its thickness gradually reduced toward the cap portion.

Preferably, in an approximately annular region providing a periphery of the shaft portion on a side closer to the shaft body portion than the region which will be flared by the caulking of the flarable portion, a portion of small thickness is further provided by locally making thinner the thickness of the shaft portion, which thin portion has sufficient strength so as not to be torn by an axial force exerted in the state of use when the nut is caulked and fixed in the object and breaks when a tractive force larger than a prescribed magnitude is applied in the axial direction, separating the shaft portion into two.

More preferably, the flarable portion of the shaft portion has an inner diameter larger than the inner diameter of the shaft body portion and has an outer diameter larger than the outer diameter of the shaft body portion.

According to another aspect, the present invention provides an outer casing member for a bullet including a cylindrical shaft portion and a cap portion provided continuous from one end of the shaft portion and having a protruded central portion, formed of an integral metal material, wherein a connecting region between the shaft portion and the cap portion has such a shape in that a force bending the shaft portion outward exerts when a pressing force is applied to the tip end surface of the shaft portion in a direction from the side of the cap portion to the side of the shaft portion, so that the cap portion goes off from the shaft portion and the shaft portion is bent outward by the bending force.

When the outer casing member for a bullet having such a structure is applied to a bullet, the cap portion provided at the tip end portion is torn off, causing explosion, so that the object can effectively be broken by the explosion.

In order to implement the present invention in a preferable state, at the connecting region between the shaft portion and the cap portion, an inner surface of the shaft portion is recessed outward. Alternatively, at the connecting region between the shaft portion and the cap portion, preferably, the inner surface of the shaft portion is provided gradually curved outward toward the cap portion. Preferably, at the connecting region between the shaft portion and the cap portion, the shaft portion is provided with its thickness made thinner gradually outward, toward the cap portion. Preferably, a groove provided extending in the peripheral direction is provided on an outer peripheral surface at the connecting region between the shaft portion and the cap portion. Preferably, the cap portion has a dent in the central portion. Alternatively, a female screw is formed at least partially on an inner periphery of the shaft portion. Alternatively, a male screw is preferably formed at least partially on an outer periphery of the shaft portion.

By adapting such a structure, the cap portion provided at the tip end is surely torn, causing explosion when the outer casing member for the bullet collides against the object, and hence the object can effectively be broken by the explosion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 42 is a cross sectional view of a T nut 71B which is a modification of T nut 71A in accordance with the eleventh embodiment of the present invention.

FIG. 43A is a central vertical section of T nut 81A in accordance with a twelfth embodiment of the present invention, and FIG. 43B is a central vertical section of T nut 91A which is a modification of the twelfth embodiment of the present invention.

FIG. 45A is a central vertical section of a T nut 101A in accordance with a thirteenth embodiment of the present invention, and FIG. 45B is a central vertical section of a T nut 111A in accordance with a modification of the thirteenth embodiment of the present invention.

FIG. 46A is a central vertical section of a T nut 101B in accordance with a modification of the thirteenth embodiment of the present invention, and FIG. 46B is a central vertical section of a T nut 111B in accordance with a modification of the thirteenth embodiment of the present invention.

DESCRIPTION OF THE PREFERRED EMBODIMENTS

Embodiments of the present invention will be described with reference to the figures.

First Embodiment: Shape of T Nut 61A

Figure 1A:
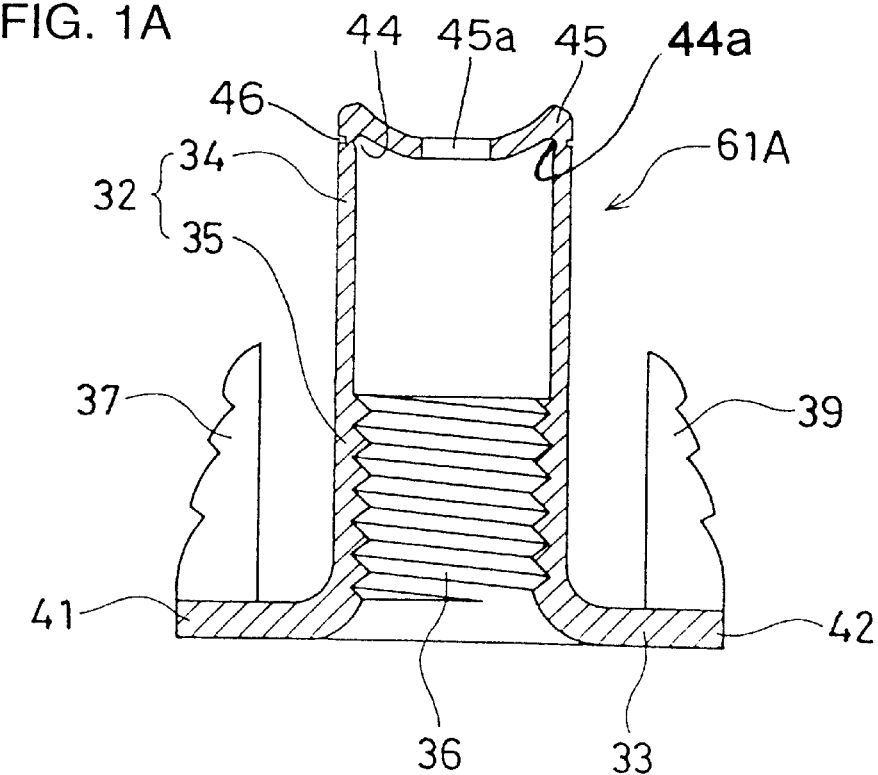
FIG. 1A is a central vertical section of a T nut 61A in accordance with a first embodiment of the present invention.
Figure 1B:
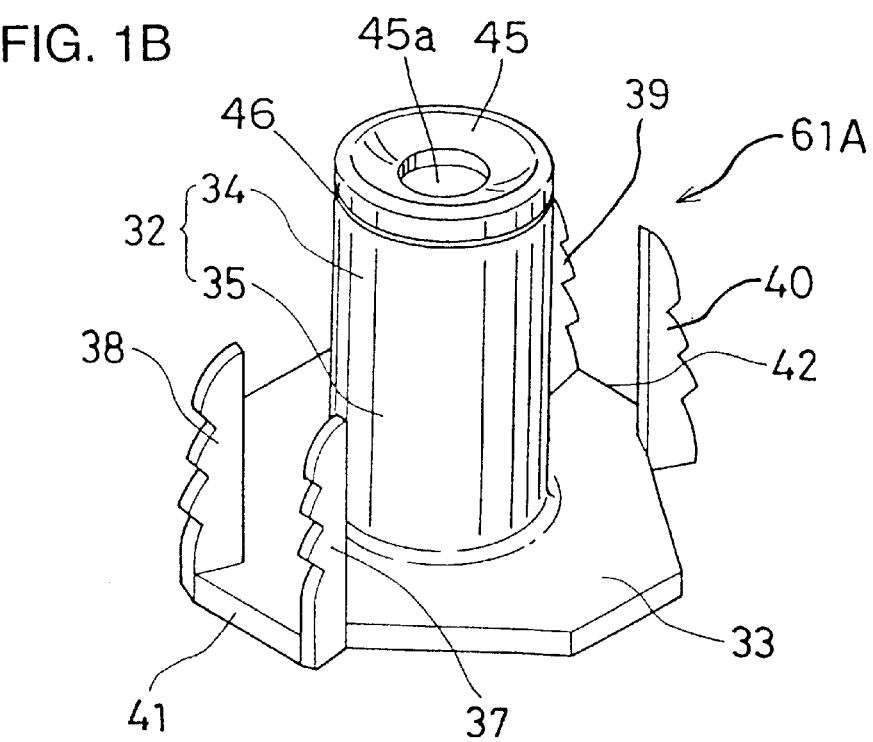
FIG. 1B is a perspective view of T nut 61A.
Figure 96A:
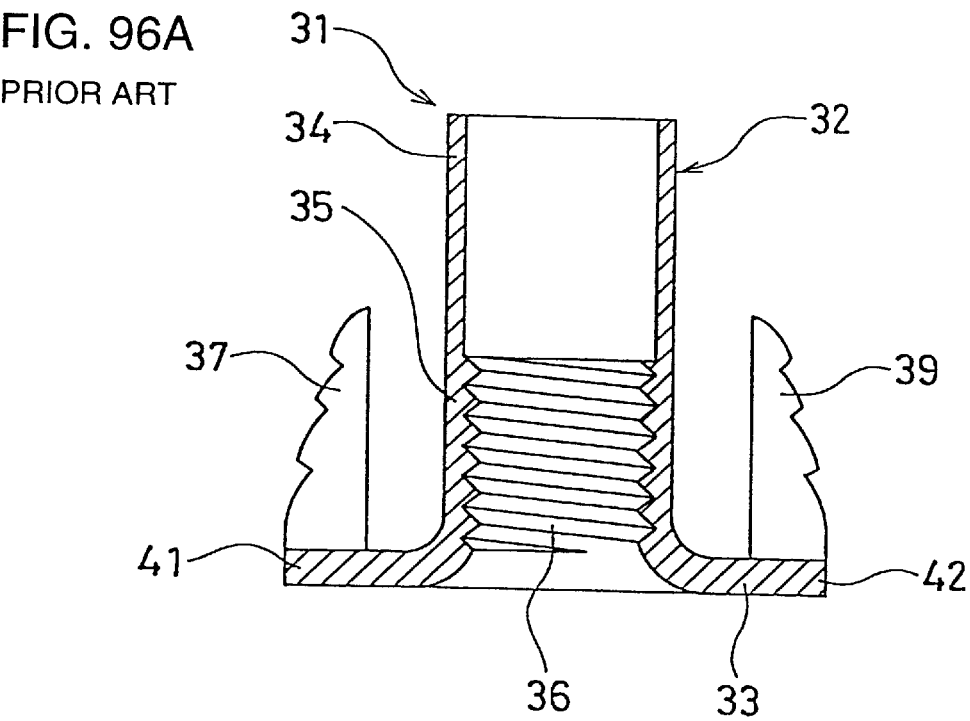
FIG. 96A is a central vertical section of a conventional T nut 31.
Figure 96B:
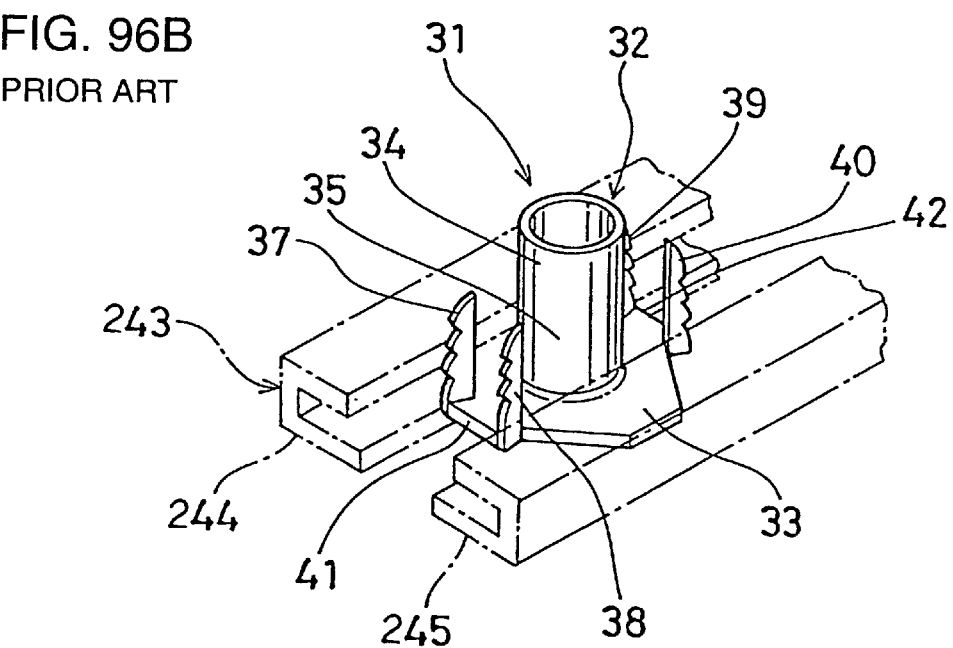
FIG. 96B is a perspective view thereof.
Figure 97A:
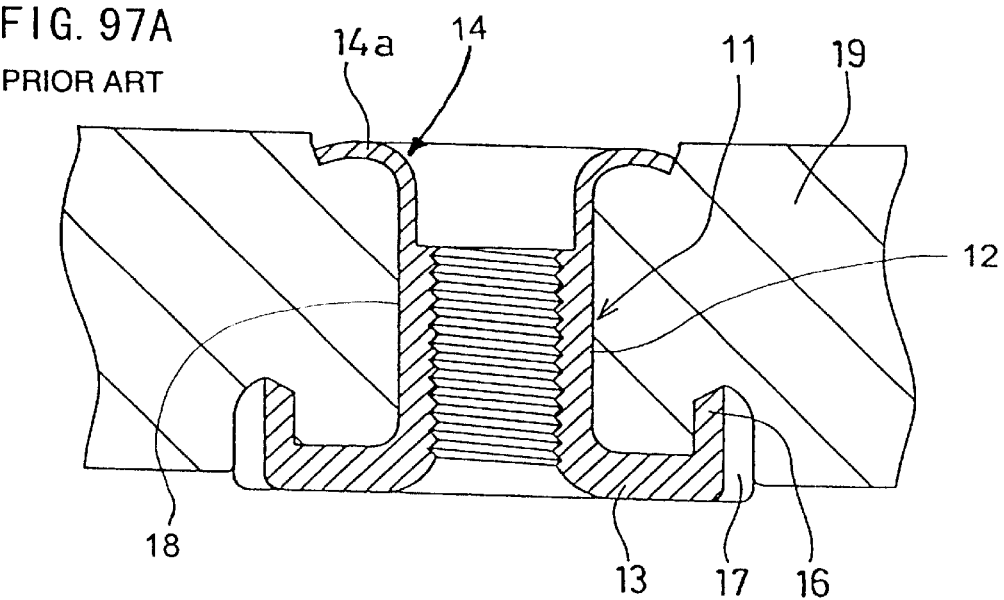
FIG. 97A is a cross section showing the state of driving the conventional T nut 11.
Figure 97B:
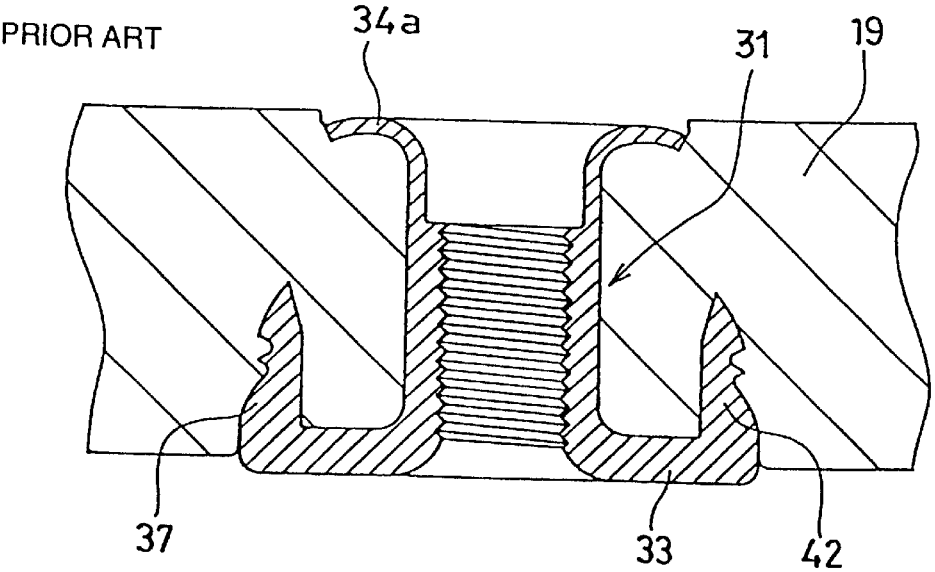
FIG. 97B is a cross section showing the state of driving the conventional T nut 31.

As shown in FIGS. 1A and 1B, T nut 61A in accordance with the first embodiment of the present invention has a shaft portion 32 and a flange portion 33 of which shapes are basically the same as those of the conventional T nut 31 described in U.S. Pat. No. 5,348,432, which has been described with reference to FIG. 96A. Therefore, common components will be denoted by the same reference characters and detailed description thereof will not be repeated.

T nut 61A in accordance with the present embodiment differs from T nut 31 of the prior art described above in that a cap portion 45 is provided integrally, continuous from a tip end portion of flarable portion 34. In T nut 61A in accordance with the present invention, cap portion 45 has a dent, i.e. an axially inwardly indented bowl shape, at the central portion, and an opening 45a is provided at the central portion in view of processing of female screw forming portion 35 by a bent shank tap or the like. As seen in FIG. 1A, the opening 45a has the smallest inner diameter of the T nut 61a, being smaller than the inner diameter of the shaft portion 32. Thus, the cap portion 45 is closer to a common central axis of the T nut 61a than is any other part of the T nut 61a.

Further, in the connecting region between flarable portion 34 and cap portion 45, an inner surface 44 of flarable portion 34 is provided recessed outward at portion 44a. Specific shape will be described later, and the shape of the connecting region is only an example. Essentially, any shape may be employed provided that when a pressing force is applied to a tip end surface of cap portion 45 in a direction from the side of cap portion 45 to flarable portion 34, a force bending the flarable portion 34 outward is exerted, so that cap portion 45 separates from or goes off from flarable portion 34 and flarable portion 34 is bent outward. The same applies to other embodiments described in the following. Further, over the entire outer periphery of shaft portion 32 at the interface between flarable portion 34 and female screw forming portion 35, an annular groove 46 is provided.

Second Embodiment: Shape of T Nut 61B

Figure 2A:
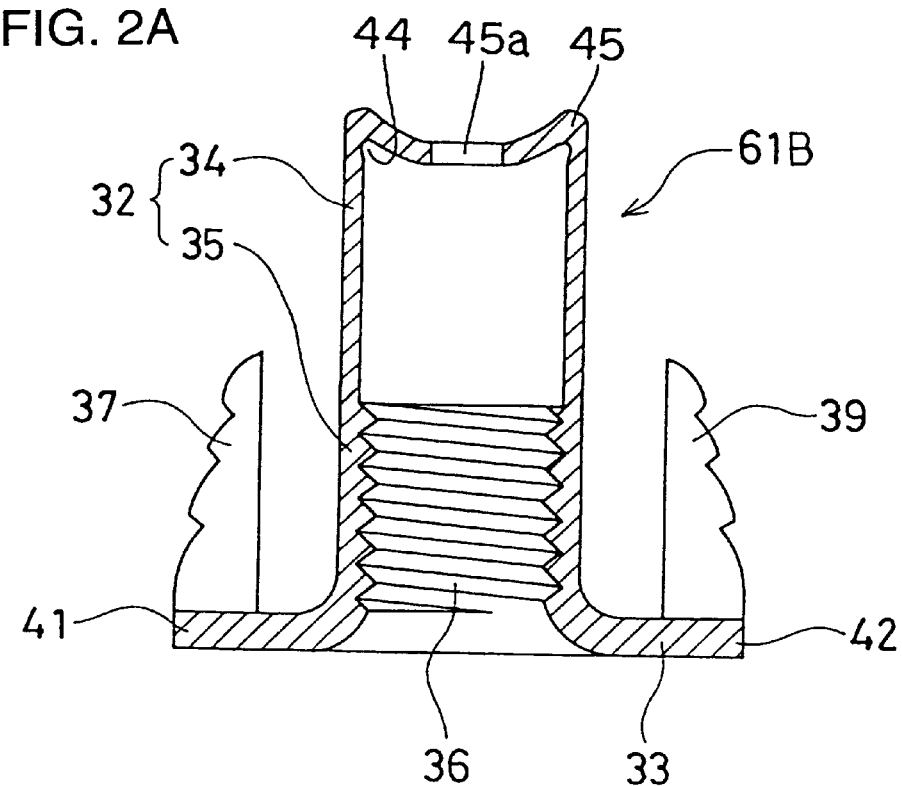
FIG. 2A is a central vertical section of a T nut 61B in accordance with a second embodiment of the present invention.
Figure 2B:
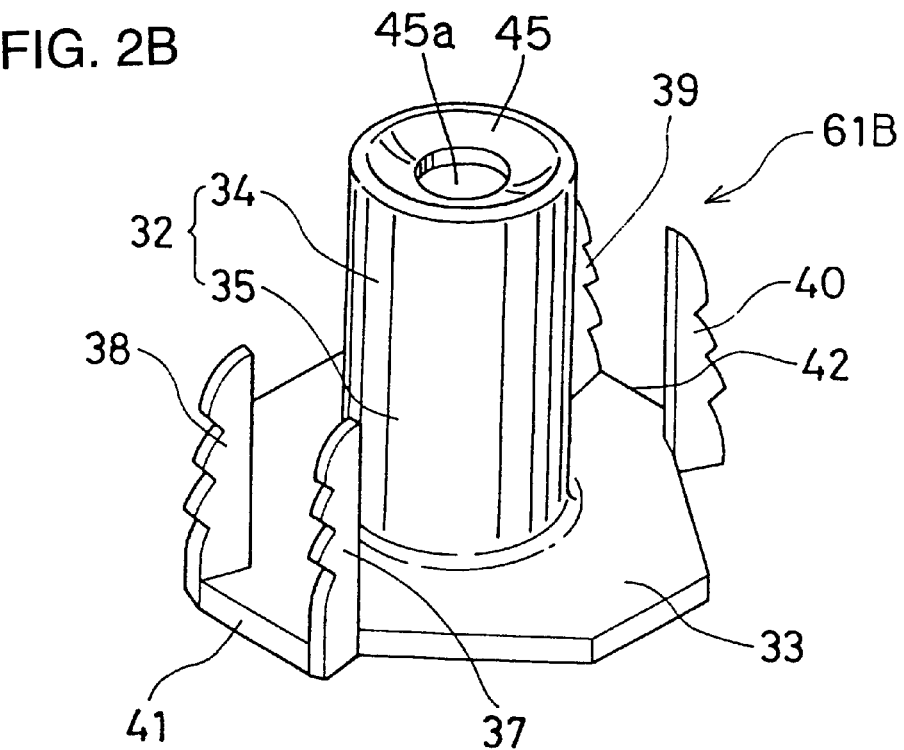
FIG. 2B is a perspective view of T nut 61B.

The shape of a T nut 61B in accordance with the second embodiment of the present invention is basically the same as T nut 61A in accordance with the first embodiment, as can be seen from FIGS. 2A and 2B. Therefore, common components will be denoted by the same reference characters, and detailed description thereof will not be repeated.

T nut 61B in accordance with the present embodiment is different from T nut 61A in accordance with the first embodiment in that annular groove 46 is not provided over the entire periphery of the outer periphery of shaft portion 32 at the interface between flarable portion 34 and female screw forming portion 35. Except this point, the structure is the same.

Third Embodiment: Shape of T Nut 61C

Figure 3A:
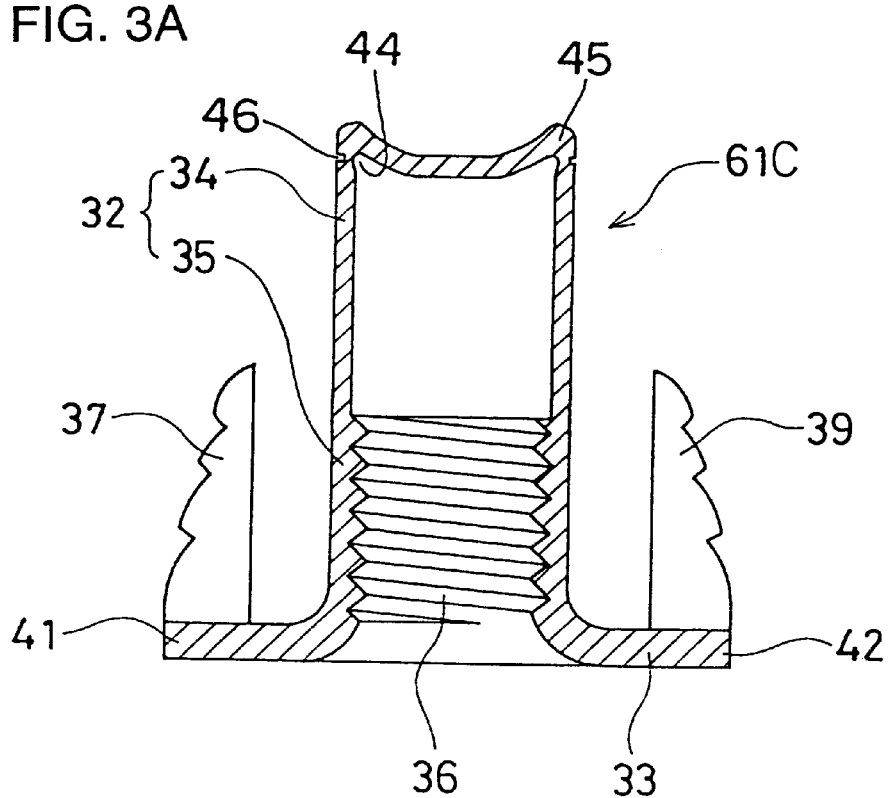
FIG. 3A is a central vertical section of a T nut 61C in accordance with a third embodiment of the present invention.
Figure 3B:
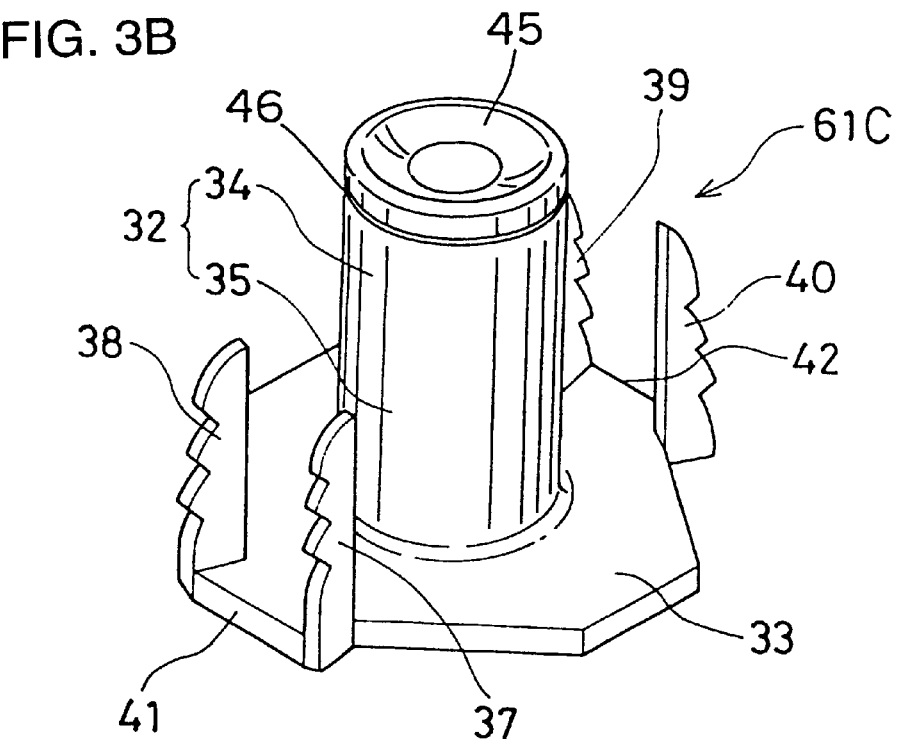
FIG. 3B is a perspective view of T nut 61C.

The shape of a T nut 61C in accordance with the third embodiment of the present invention is basically the same as T nut 61A in accordance with the first embodiment, as can be seen from FIGS. 3A and 3B. Therefore, common components will be denoted by the same reference characters, and detailed description thereof will not be repeated.

T nut 61C of the present embodiment is different from T nut 61A of the first embodiment in that opening 45A is not provided. Except this point, the structure is the same.

Fourth Embodiment: Shape of T Nut 61D

Figure 4A:
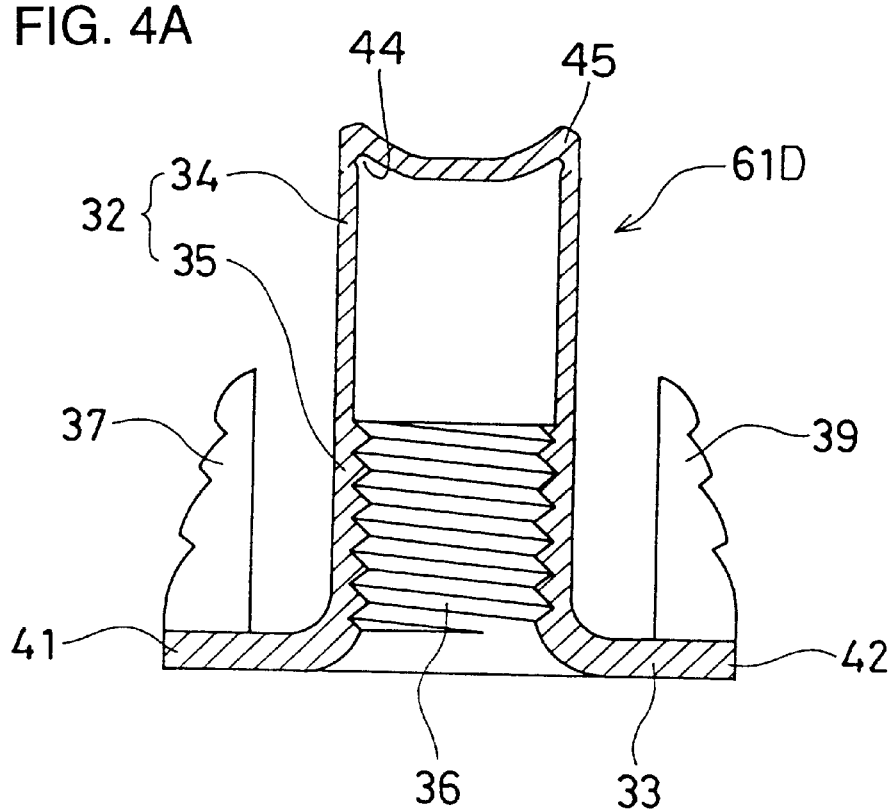
FIG. 4A is a central vertical section of a T nut 61D in accordance with a fourth embodiment of the present invention.
Figure 4B:
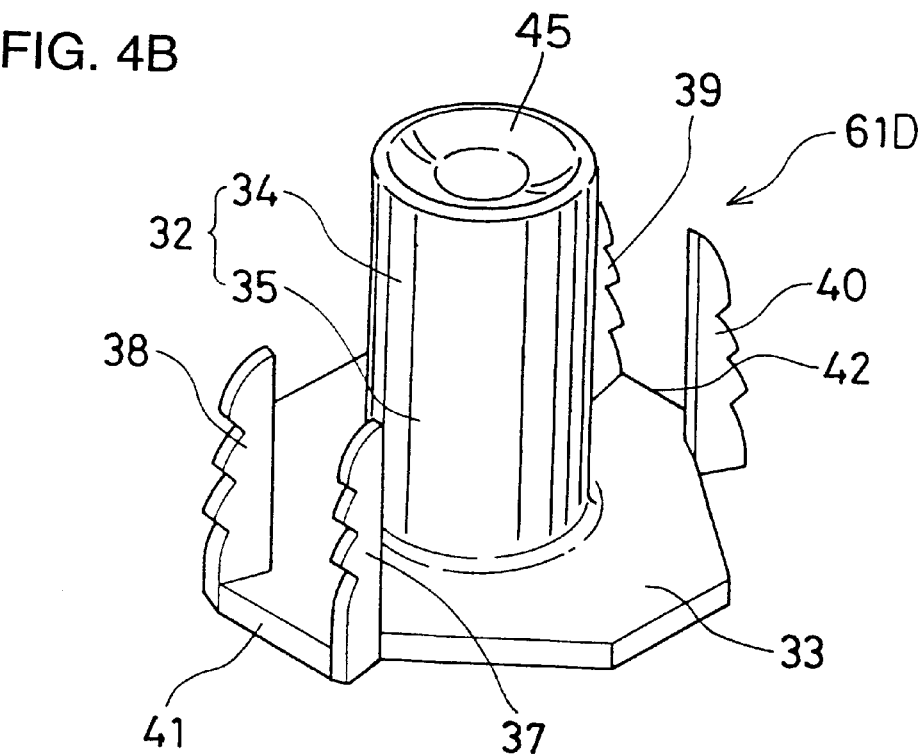
FIG. 4B is a perspective view of T nut 61D.

The shape of a T nut 61D in accordance with the fourth embodiment of the present invention is basically the same as T nut 61A in accordance with the first embodiment, as can be seen from FIGS. 4A and 4B. Therefore, common components will be denoted by the same reference characters, and detailed description thereof will not be repeated.

T nut 61D in accordance with the present embodiment is different from T nut 61A in accordance with the first embodiment in that annular groove 46 is not provided over the entire periphery of the outer periphery of shaft portion 32 at the interface between flarable portion 34 and female screw forming portion 35, and that opening 45a is not provided. Except these points, the structure is the same.

Shape of Connecting Region

The shape of the connection region will be described with reference to FIGS. 5 to 22. The shape shown here is only an example as described above. Essentially, any shape may be employed provided that when a pressing force is applied to a tip end surface of cap portion 45 in a direction from the side of cap portion 45 to flarable portion 34, a force is exerted to bend flarable portion 34 outward, so that cap portion 45 goes off from flarable portion 34 and flarable portion 34 is bent outward.

Figure 5A:
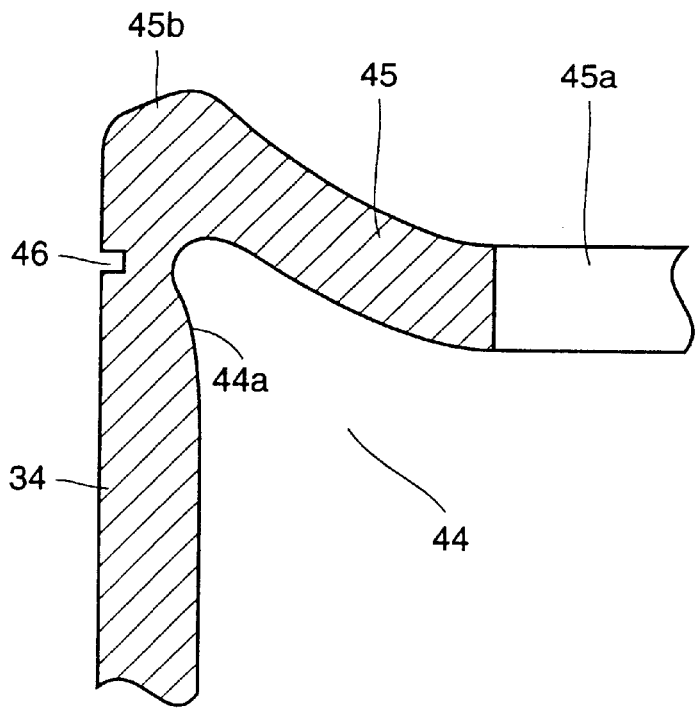
FIG. 5A is a first cross section representing a structure of the connecting region.
Figure 6A:
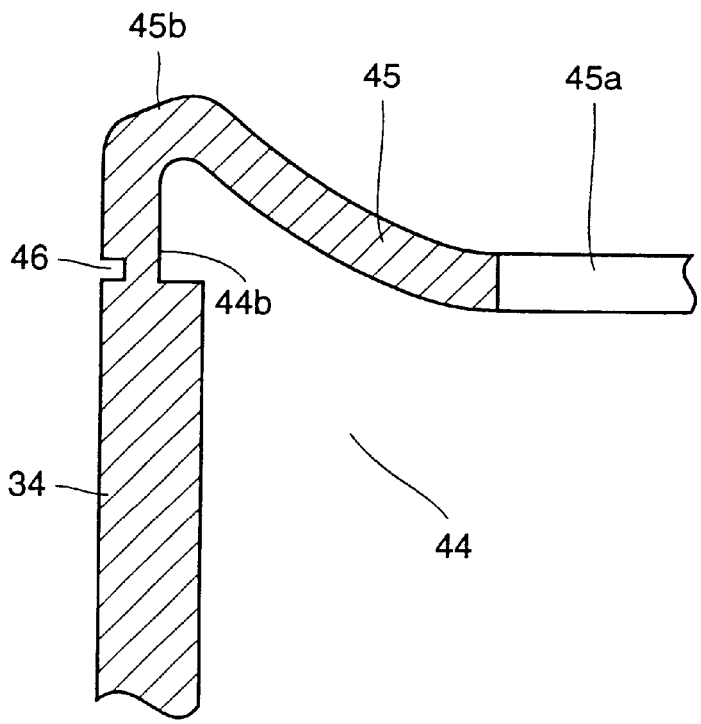
FIG. 6A is a first cross section representing a structure of the connecting region.
Figure 7A:
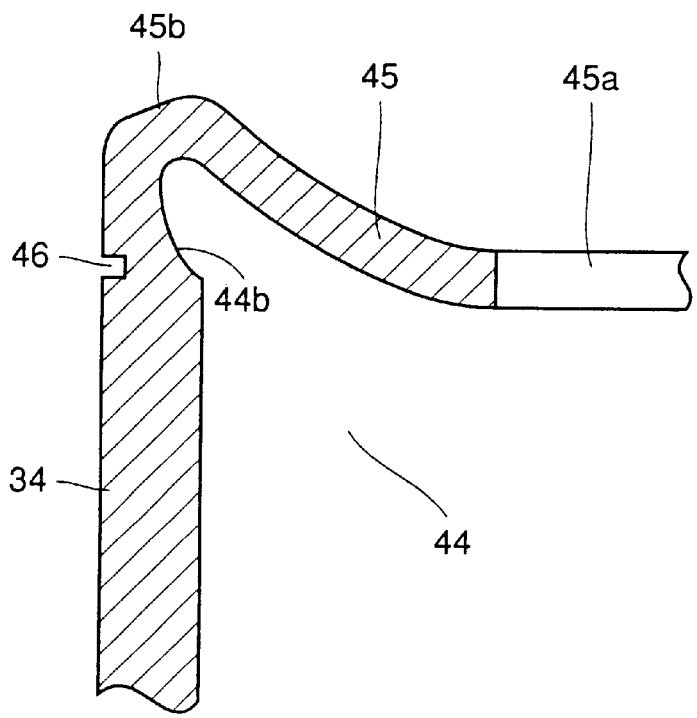
FIG. 7A is a first cross section representing a structure of the connecting region.

A shape such as shown in FIG. 5A in that inner surface 44 of flarable portion 34 has a tapered portion 44a with its thickness gradually made thinner toward cap portion 45, a shape such as shown in FIG. 6A in which a step portion 44b is provided, or a shape such as shown in FIG. 7A in that a curved surface 44b with its thickness gradually reduced may be employed. On an outer peripheral portion of cap portion 45 at the connecting region between flarable portion 34 and cap portion 45, an annular portion 45b protruding upward is provided.

Figure 5B:
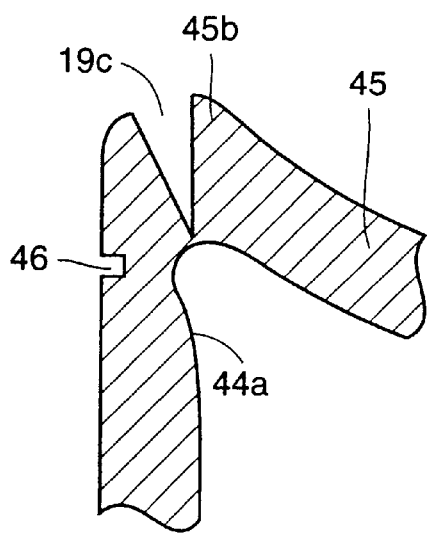
FIG. 5B is a second cross section representing a structure of the connecting region and FIG. 5C is a third cross section representing a structure of the connecting region.
Figure 5C:
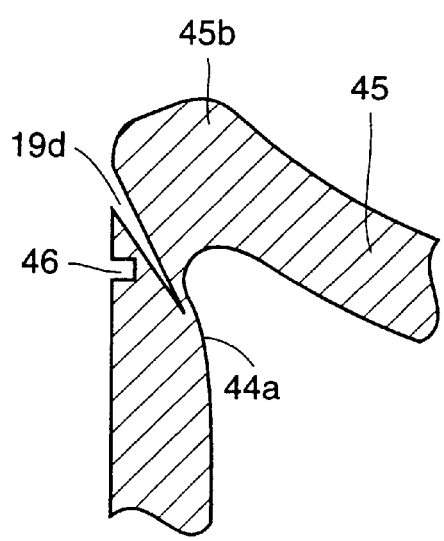
Figure 6B:
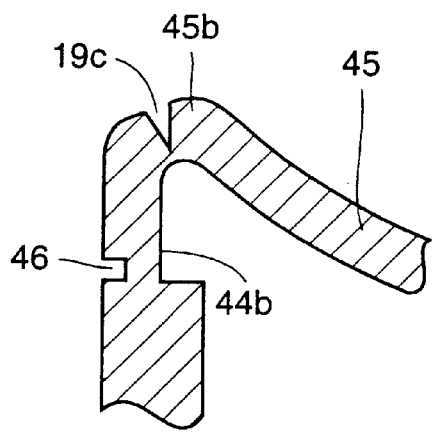
FIG. 6B is a second cross section representing a structure of the connecting region and FIG. 6C is a third cross section representing a structure of the connecting region.
Figure 6C:
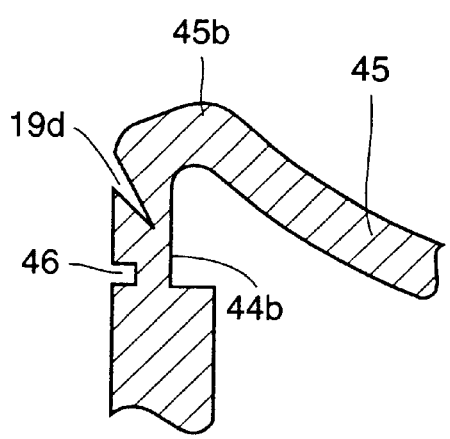
Figure 7B:
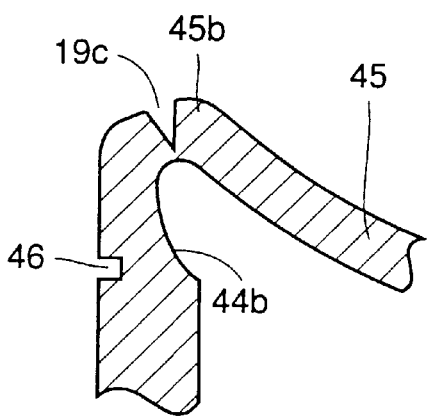
FIG. 7B is a second cross section representing a structure of the connecting region and FIG. 7C is a third cross section representing a structure of the connecting region.
Figure 7C:
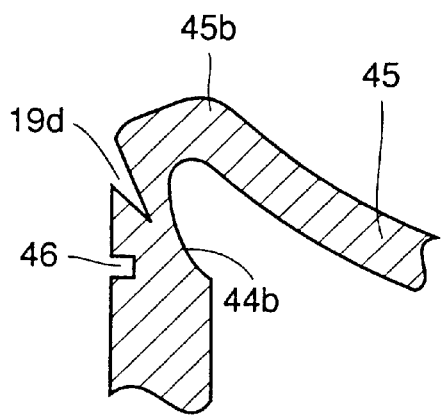

Alternatively, as shown in FIGS. 5B, 6B and 7B, a structure having a notch 19c with an outward oblique side formed at an upper end of the connecting region of cap portion 45, or alternatively, as shown in FIGS. 5C, 6C and 7C, a structure having a notch 19d extending from an upper to lower portion as a side surface of the coupling region of cap portion 45 may be employed.

Figure 8A:
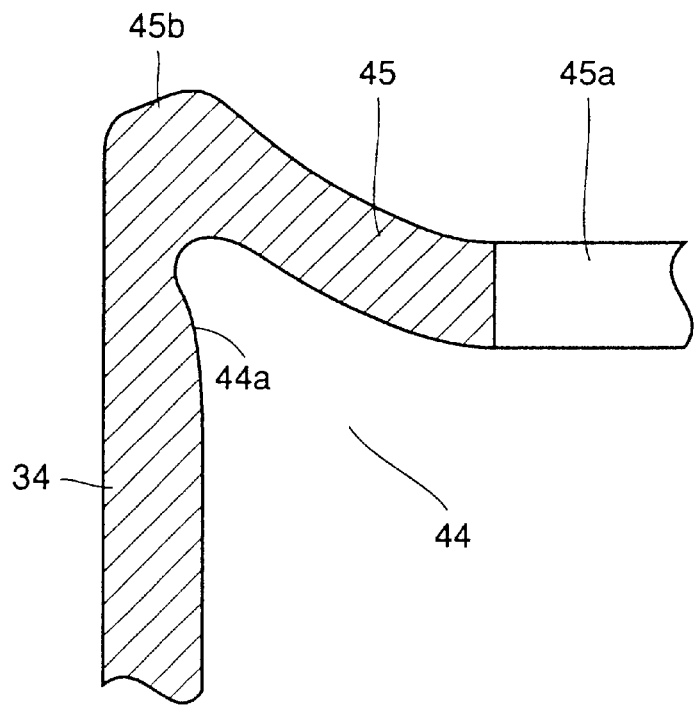
FIG. 8A is a first cross section representing a structure of the connecting region.
Figure 8B:
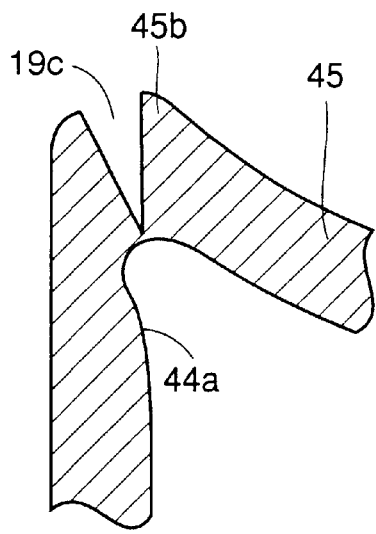
FIG. 8B is a second cross section representing a structure of the connecting region and FIG. 8C is a third cross section representing a structure of the connecting region.
Figure 8C:
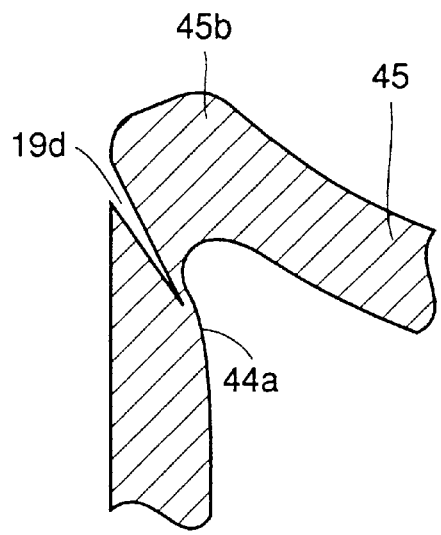
Figure 9A:
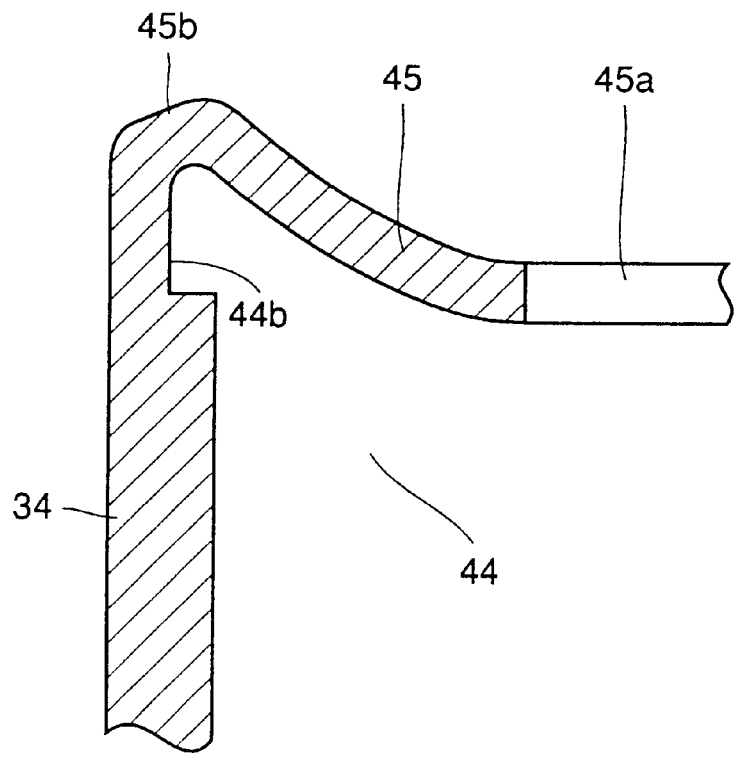
FIG. 9A is a first cross section representing a structure of the connecting region.
Figure 9B:
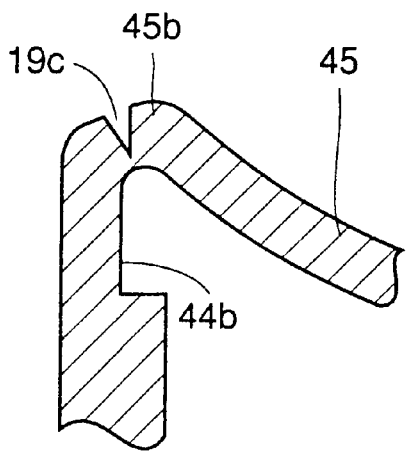
FIG. 9B is a second cross section representing a structure of the connecting region and FIG. 9C is a third cross section representing a structure of the connecting region.
Figure 9C:
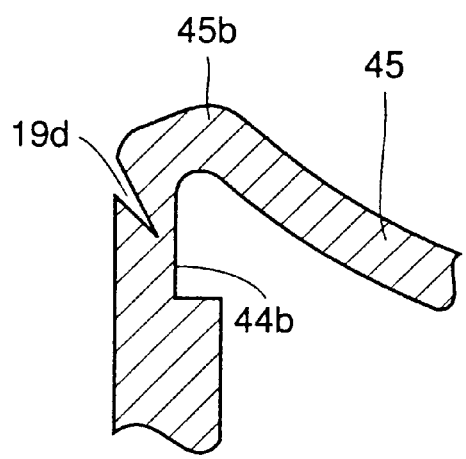
Figure 10A:
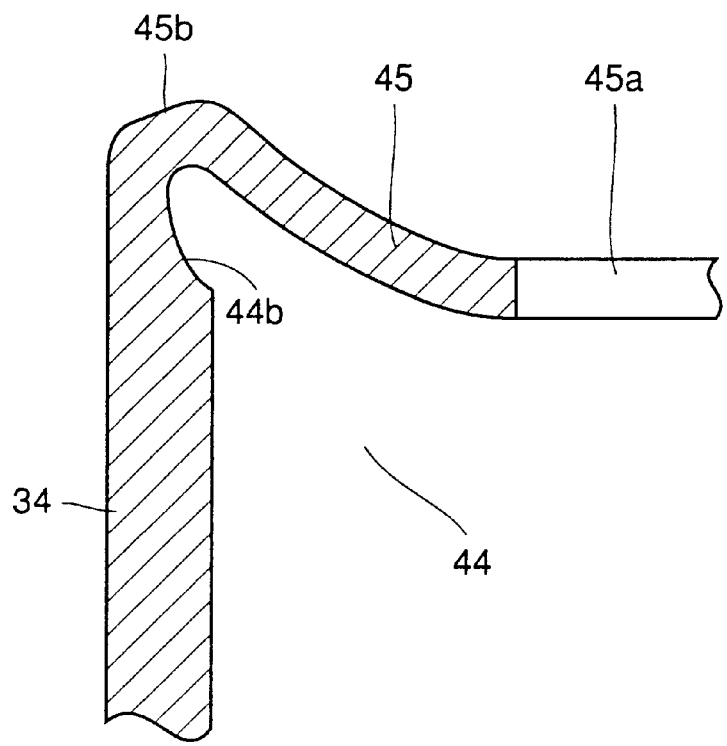
FIG. 10A is a first cross section representing a structure of the connecting region.
Figure 10B:
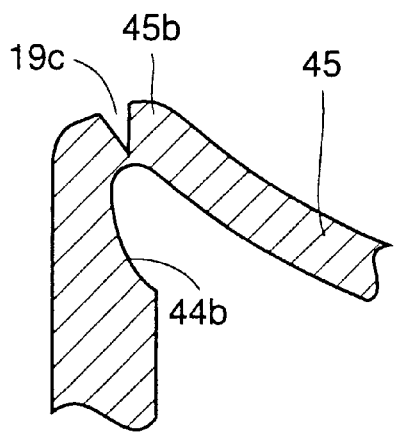
FIG. 10B is a second cross section representing a structure of the connecting region and FIG. 10C is a third cross section representing a structure of the connecting region.
Figure 10C:
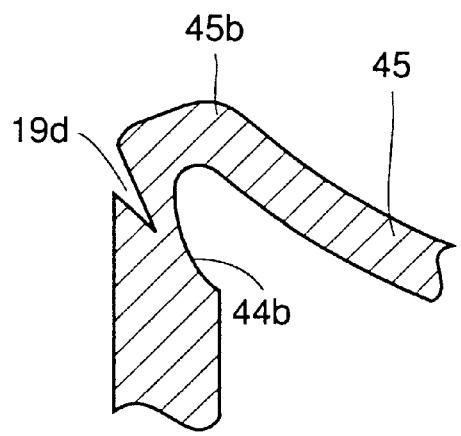
Figure 11A:
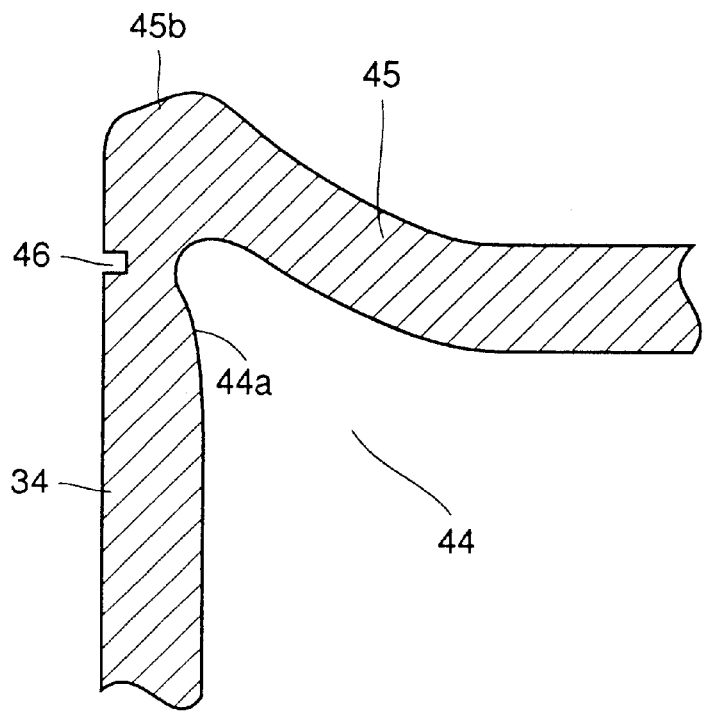
FIG. 11A is a first cross section representing a structure of the connecting region.
Figure 11B:
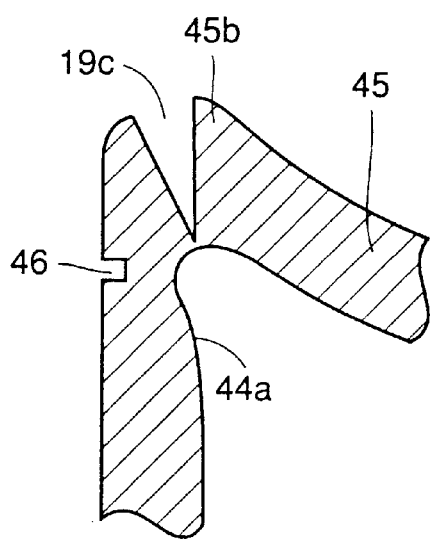
FIG. 11B is a second cross section representing a structure of the connecting region and FIG. 11C is a third cross section representing a structure of the connecting region.
Figure 11C:
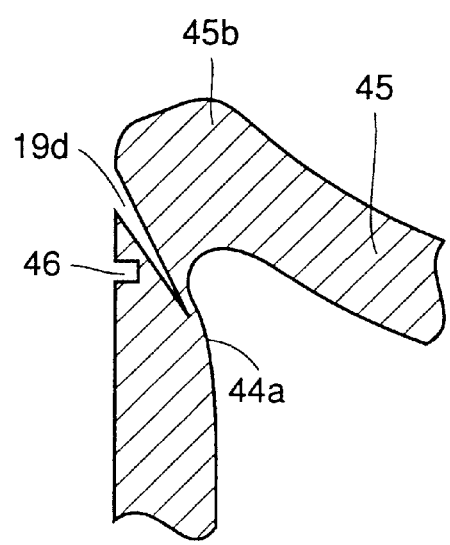
Figure 12A:
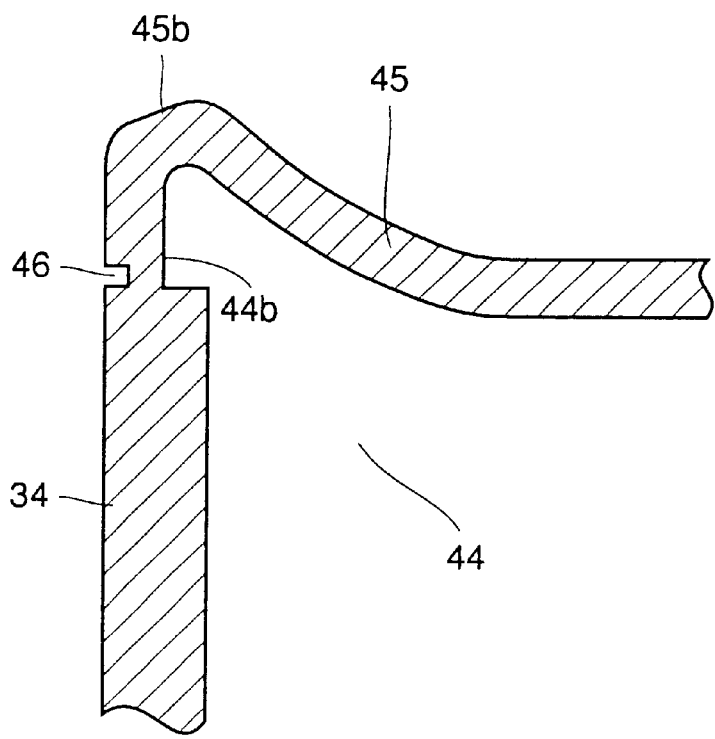
FIG. 12A is a first cross section representing a structure of the connecting region.
Figure 12B:
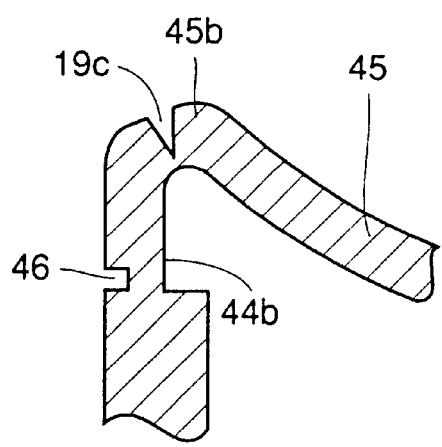
FIG. 12B is a second cross section representing a structure of the connecting region and FIG. 12C is a third cross section representing a structure of the connecting region.
Figure 12C:
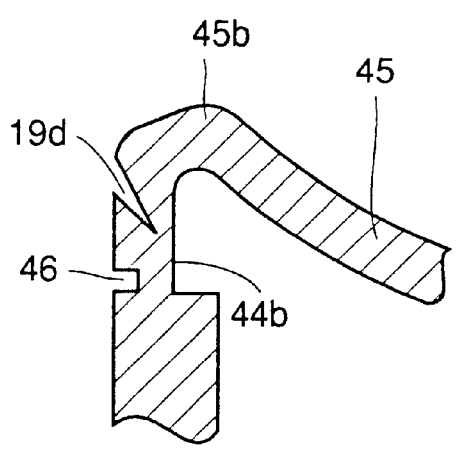
Figure 13A:
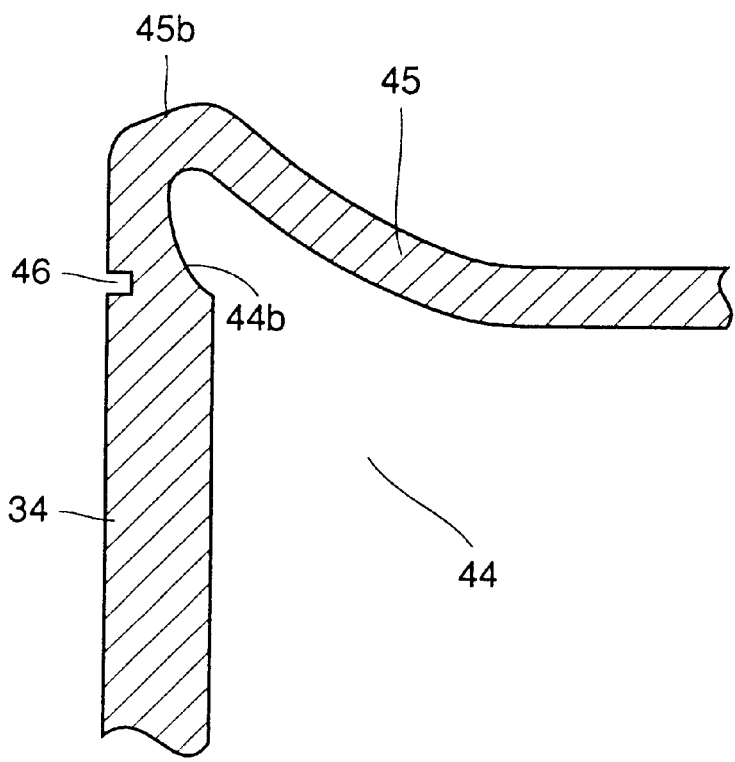
FIG. 13A is a first cross section representing a structure of the connecting region.
Figure 13B:
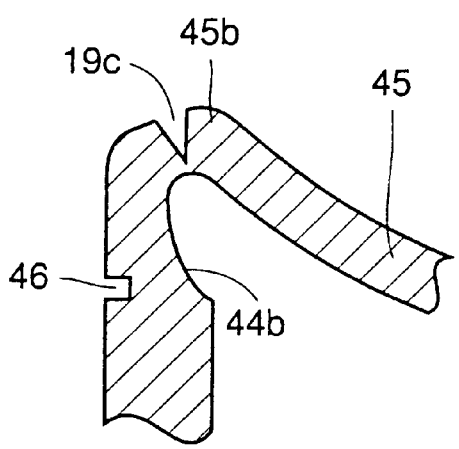
FIG. 13B is a second cross section representing a structure of the connecting region and FIG. 13C is a third cross section representing a structure of the connecting region.
Figure 13C:
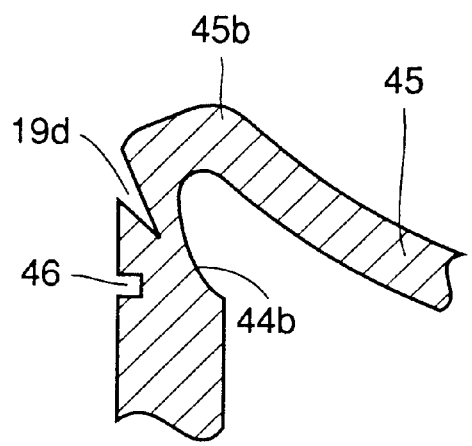
Figure 14A:
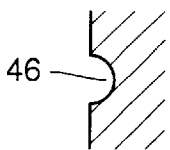
FIGS. 14A to 14C represent cross sectional shapes of the groove.
Figure 14B:
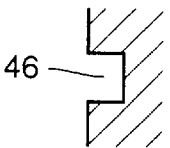
Figure 14C:
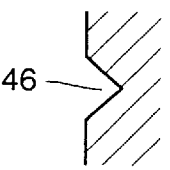
Figure 15A:
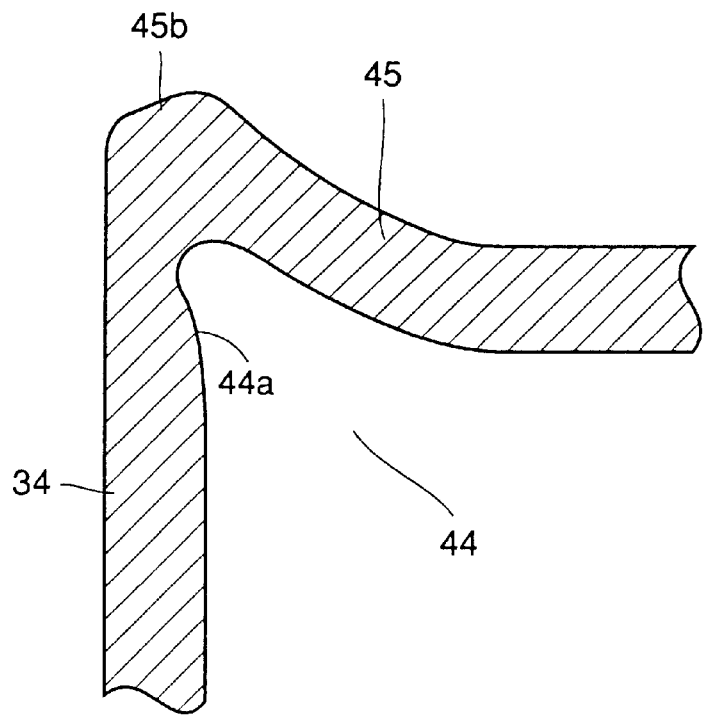
FIG. 15A is a first cross section representing a structure of the connecting region.
Figure 15B:
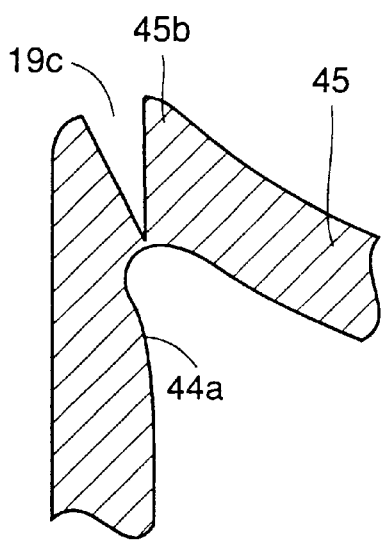
FIG. 15B is a second cross section representing a structure of the connecting region and FIG. 15C is a third cross section representing a structure of the connecting region.
Figure 15C:
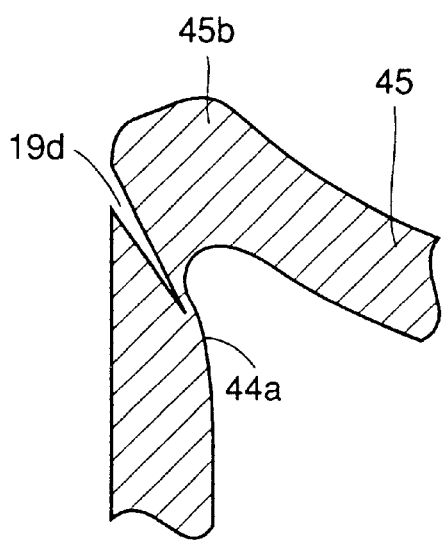
Figure 16A:
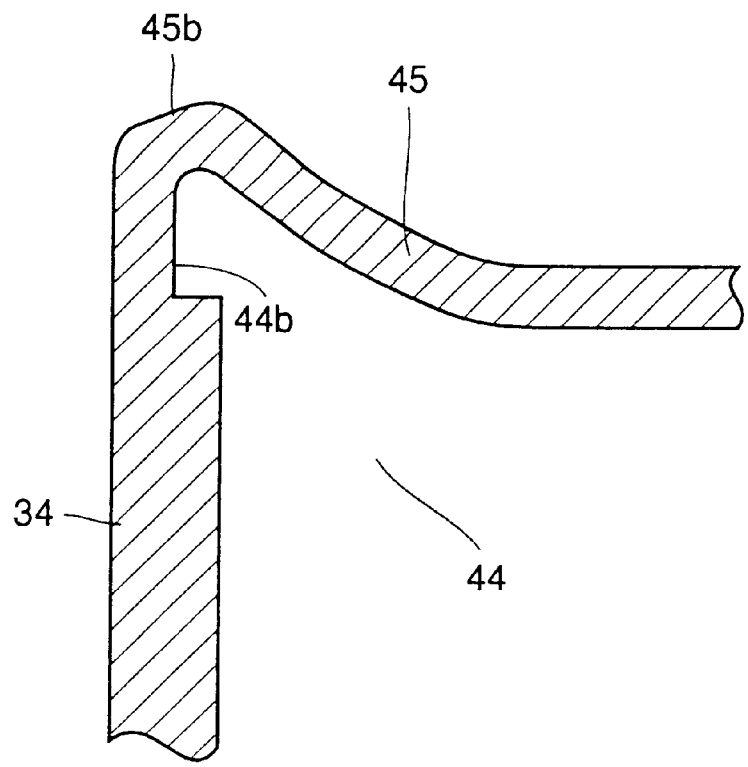
FIG. 16A is a first cross section representing a structure of the connecting region.
Figure 16B:
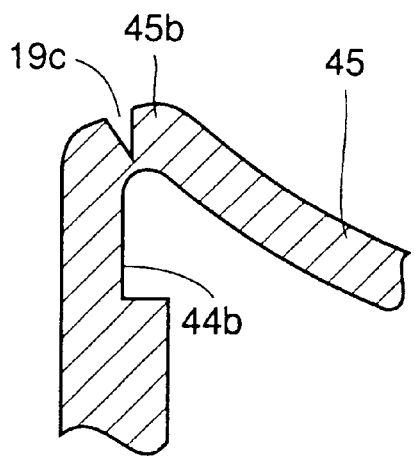
FIG. 16B is a second cross section representing a structure of the connecting region and FIG. 16C is a third cross section representing a structure of the connecting region.
Figure 16C:
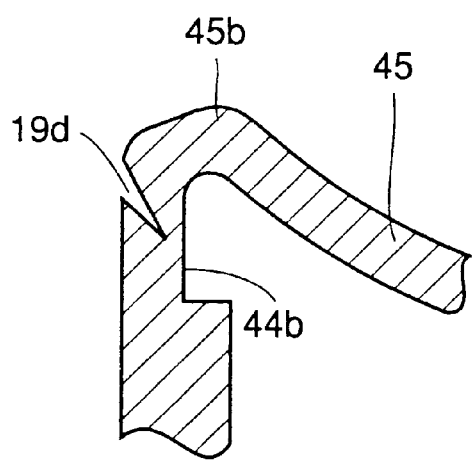
Figure 17A:
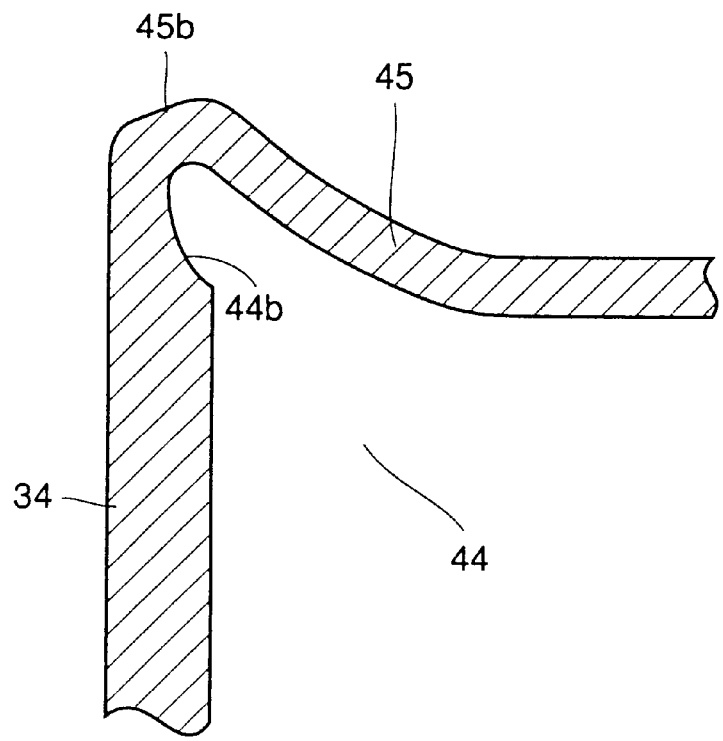
FIG. 17A is a first cross section representing a structure of the connecting region.
Figure 17B:
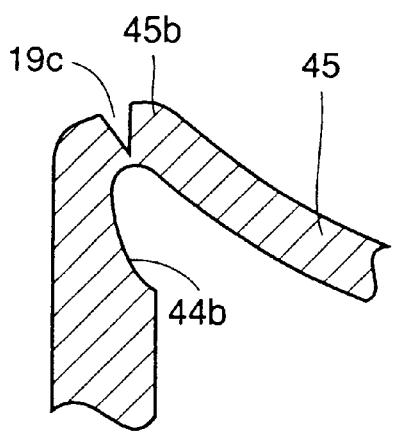
FIG. 17B is a second cross section representing a structure of the connecting region and FIG. 17C is a third cross section representing a structure of the connecting region.
Figure 17C:
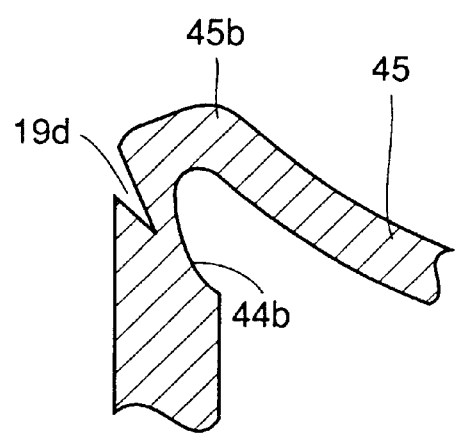
Figure 19:
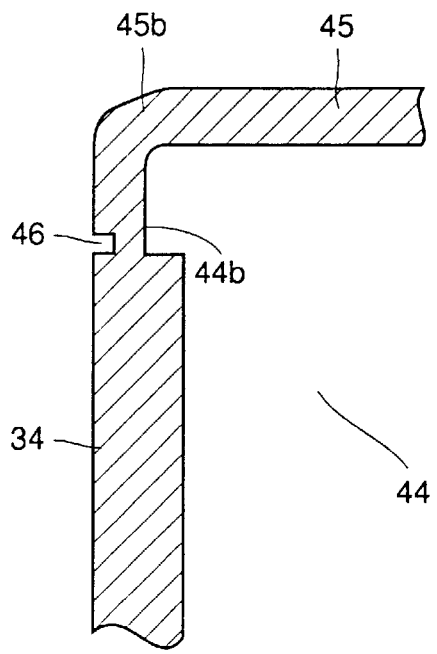
Figure 20:
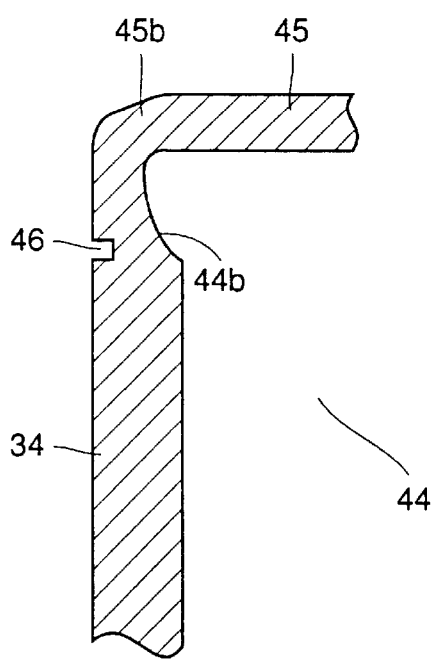

As modifications of the structures shown in FIGS. 5 to 7, a structure not provided with the annular groove 46 shown in FIGS. 8 to 10, a structure not provided with an opening 45a shown in FIGS. 11 to 13, and the structure not provided with neither annular groove 46 nor opening 45a shown in FIGS. 15 to 17 may be employed. Cross sectional shape of annular groove 46 may be arbitrarily selected, including a circular shape, a rectangular shape with one side opened or a V shape as shown in FIGS. 14A, 14B and 14C, for example.

Figure 18:
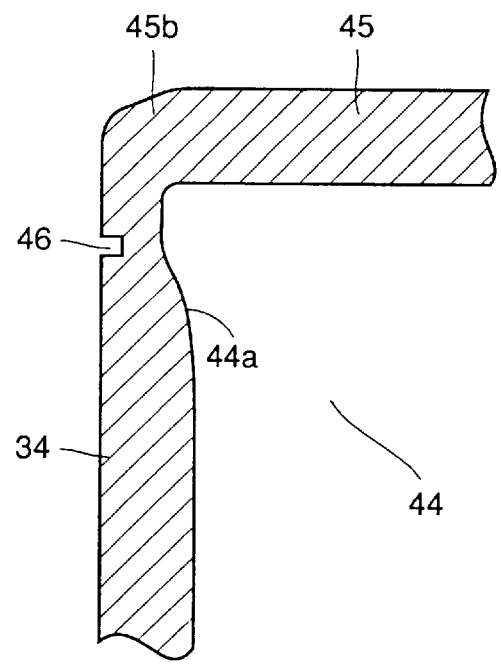
FIGS. 18 to 22 are cross sections representing the structure of the connecting region.

In the structures shown in FIGS. 5 to 13 and 15 to 17, cap portion 45 has a dent at the central portion. Alternatively, cap portion 45 may have almost flat shape, as shown in FIGS. 18 to 22. FIG. 18 shows a shape corresponding to FIG. 5, FIG. 19 corresponds to FIG. 6 and FIG. 20 corresponds to FIG. 7.

Figure 21:
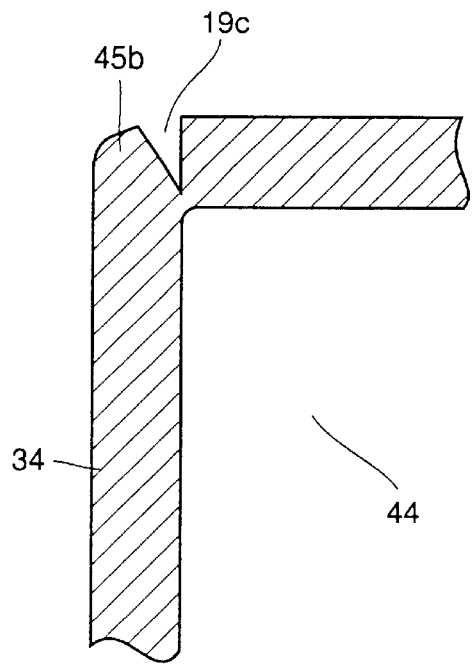
Figure 22:
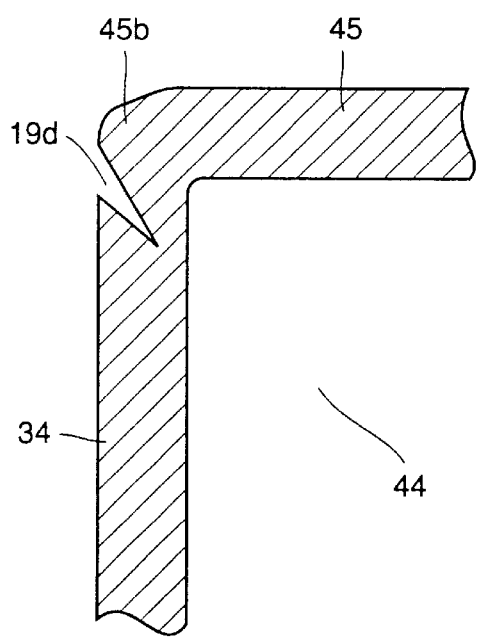

As to the shape of the connecting region, when the essence of the present invention only is to be implemented, a structure such as shown in FIG. 21 in that a notch 19c having an outward oblique side provided at an upper end portion of the connecting region of cap portion 45, or a structure such as shown in FIG. 22 in which a notch 19d extending from an upper to lower portion on a side surface of the connecting region of cap portion 45 may be employed.

Fifth Embodiment: Shape of T Nut 61E

Figure 23:
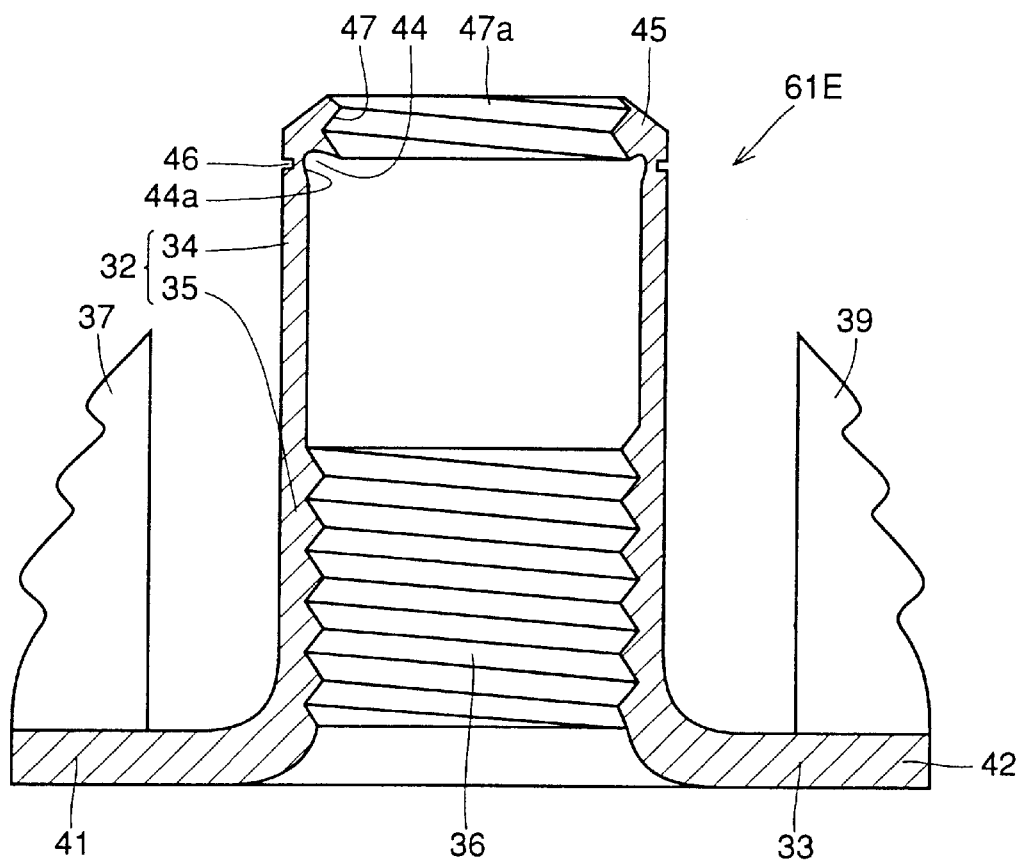
FIG. 23 is a central vertical section of a T nut 61E in accordance with a fifth embodiment of the present invention.

The shape of T nut 61E in accordance with the fifth embodiment of the present invention is basically the same as that of T nut 61A in accordance with the first embodiment, as can be seen from FIG. 23, except that a female screw 47a is provided on an end surface 47 of an opening 45a of cap portion 45.

Female screw 47a is a female screw in accordance with the same standard as female screw 36 formed simultaneously by a ball tap, a bent shank tap or the like. The female screw may be of different standard, or may be formed in a separate step.

Figure 24:
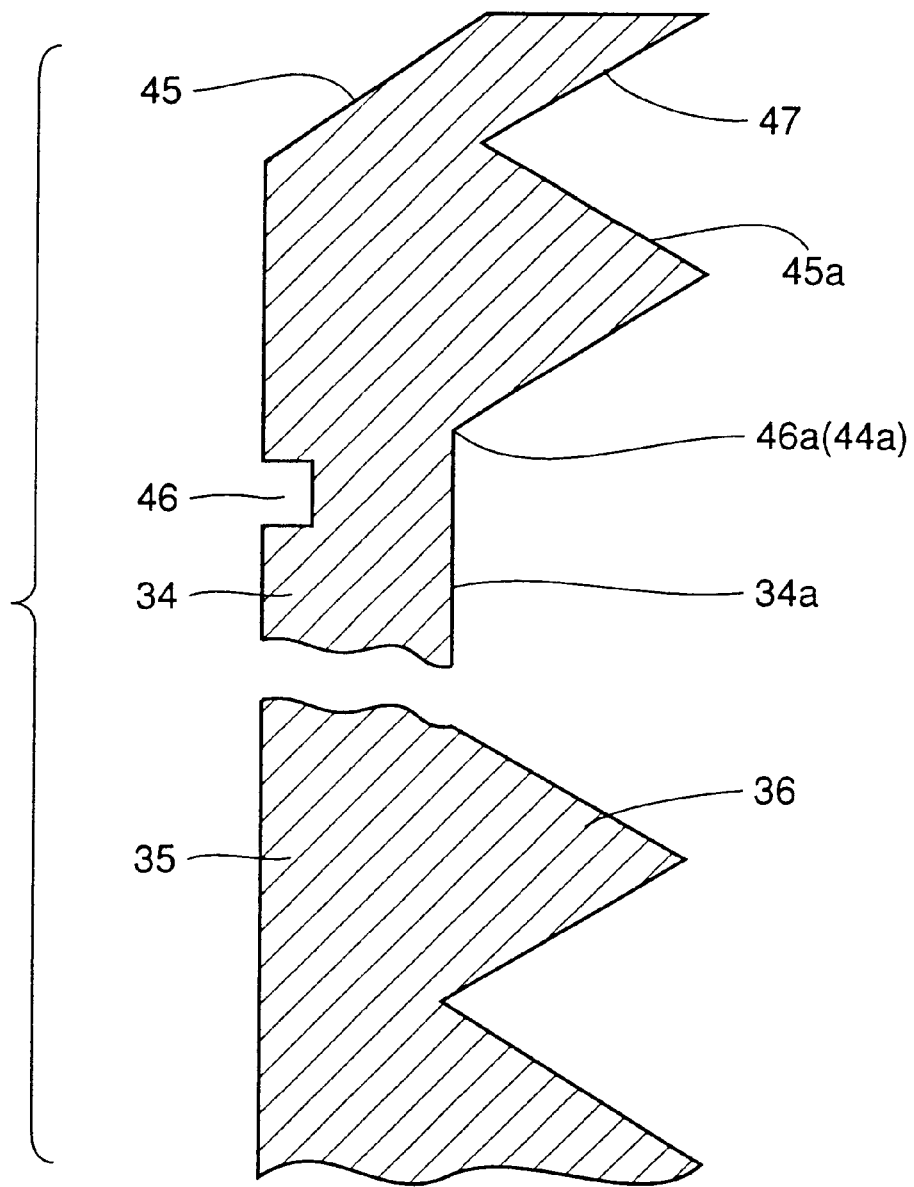
FIG. 24 is an enlarged cross section representing a structure of the connecting region of T nut 61E in accordance with the fifth embodiment.

As can be seen from an enlarged cross section of FIG. 24, when the size of female screw 47a is large (for example, in case of an inch standard screw), it is possible that the position of the bottom of female screw 47a is almost equal to the inner surface 34a of flarable portion 34. In such a case, stress concentration is likely at an intersecting point 46a between the bottom of female screw 47a and inner surface 34a. Therefore, similar effects can be attained without the necessity of forming a special shape at the connecting region in advance.

Not only the structure shown in FIGS. 23 and 24 but also structures shown in FIGS. 5 to 22 may be applied to the shape of the connecting region.

Sixth Embodiment: Method of Driving T Nut

The method of driving T nuts 61A, 61B, 61C and 61D having the above described structures into an object 19 of fixing formed of resin or wood will be described with reference to FIGS. 25 to 28, taking T nut 61A as an example. The method of driving T nuts 61B, 61C and 61D is the same as that of T nut 61A, and therefore, description thereof is not repeated.

Figure 25:
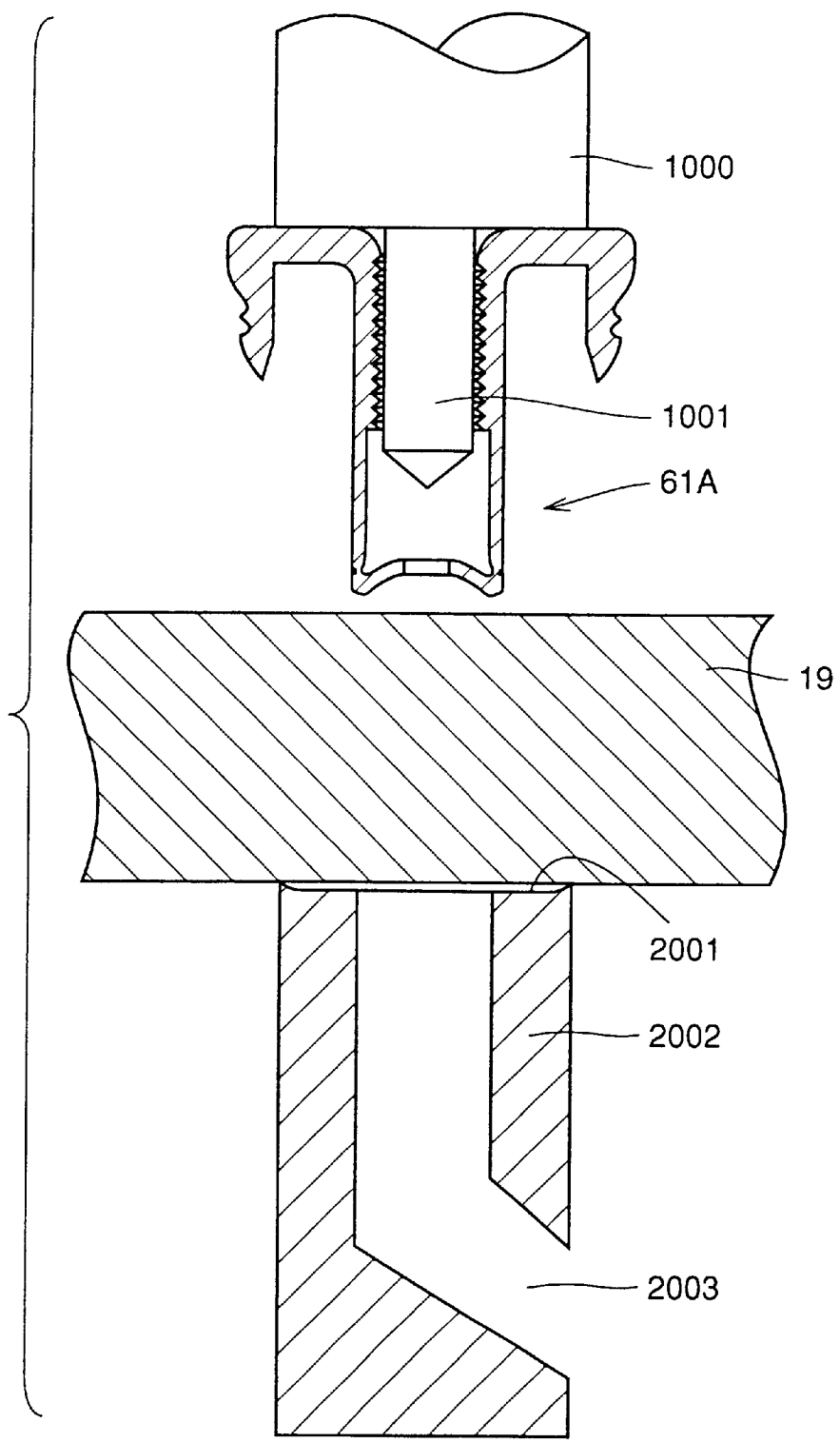
FIGS. 25 to 27 represent first to third steps of the process of driving T nut 61A into an object 19 of fixing, in accordance with a sixth embodiment of the present invention.

T nut 61A in accordance with the present invention is held by a driving head 1000 as can be seen from FIG. 25, with a positioning shaft 1001 of driving head 1000 of a caulker inserted to the shaft 32 of T nut 61A. At a position opposite to driving head 1000 of the object 19 of fixing, an abutting member 2000 is arranged, provided on the caulker. The abutting member 2000 is provided with guide grooves 2002 and 2003 for externally discharging broken pieces of the fractured object 19. Further, a recessed portion 2001 for guiding flarable portion 34 when T nut 61A is driven is provided at the contact surface with the object 19.

Figure 26:
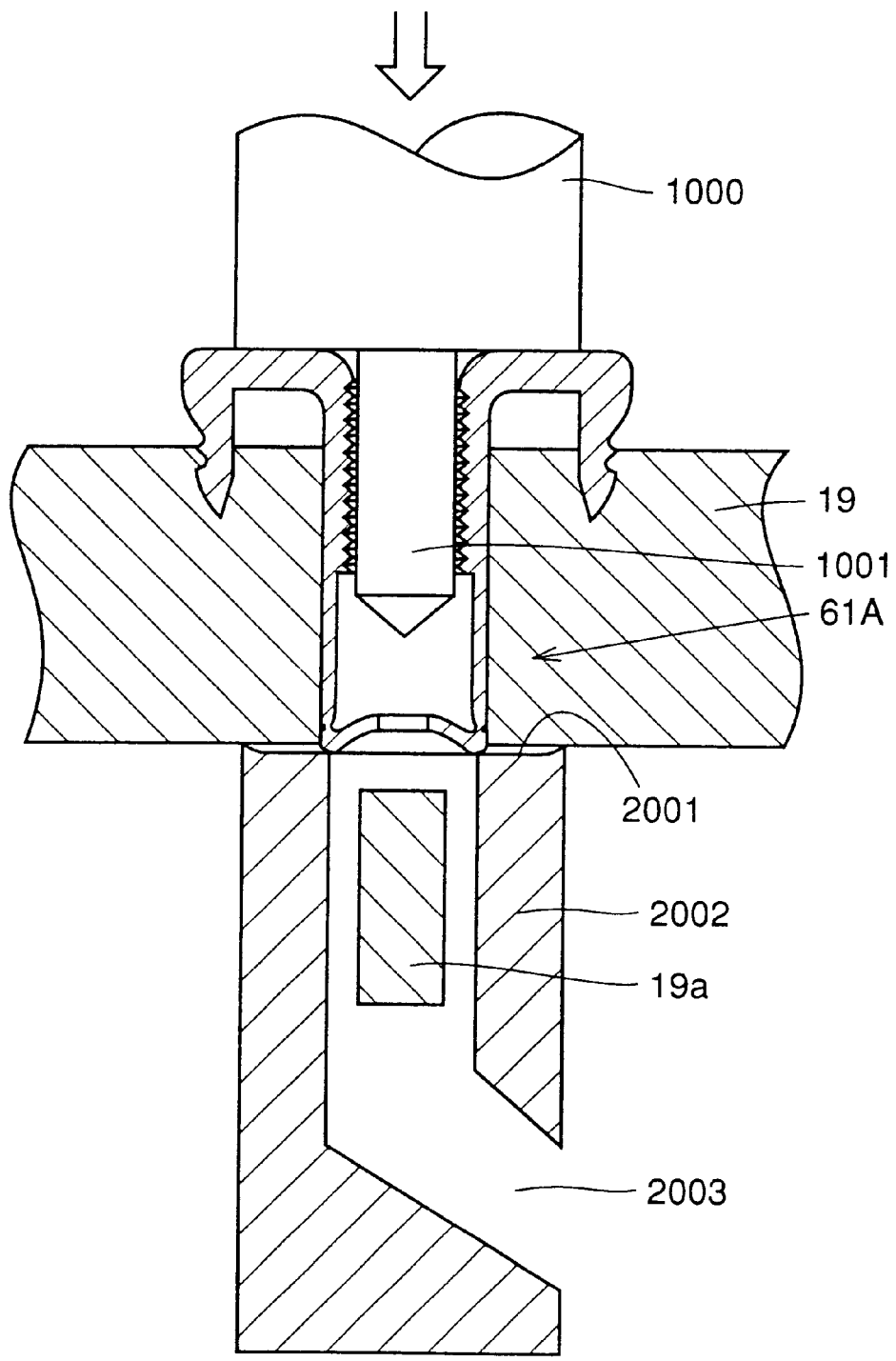

When T nut 61A is driven into object 19 of fixing by driving head 1000 in the above described state, cap portion 45 bites the object 19 of fixing as shown in FIG. 26, so that a piece of object 19 ejected by cap portion 45. The ejected broken piece 19a of the object of fixing is discharged externally by guide grooves 2002 and 2003. In this manner, when T nut 61A in accordance with the present embodiment is used, it is unnecessary to provide a receiving hole for driving T nut 61A in object 19 in advance.

Further, the connecting region between flarable portion 34 and cap portion 45 has such a shape in that when a pressing force is applied to the tip end surface of cap portion 45 in a direction from the side of cap portion 45 to flarable portion 34, a force is exerted to bend flarable portion 34 outward so that cap portion 45 separates or goes off from flarable portion 34 and flarable portion 34 is bent outward by the force. Therefore, immediately after T nut 61A is driven into object 19, when cap portion 45 collides with the recessed portion 2001 of abutting member 2000 provided outside, cap portion 45 is kept pressing against recessed portion 2001 of abutting member 2000, while an external force for caulking is applied to flarable portion 34 from driving head 1000.

Figure 27:
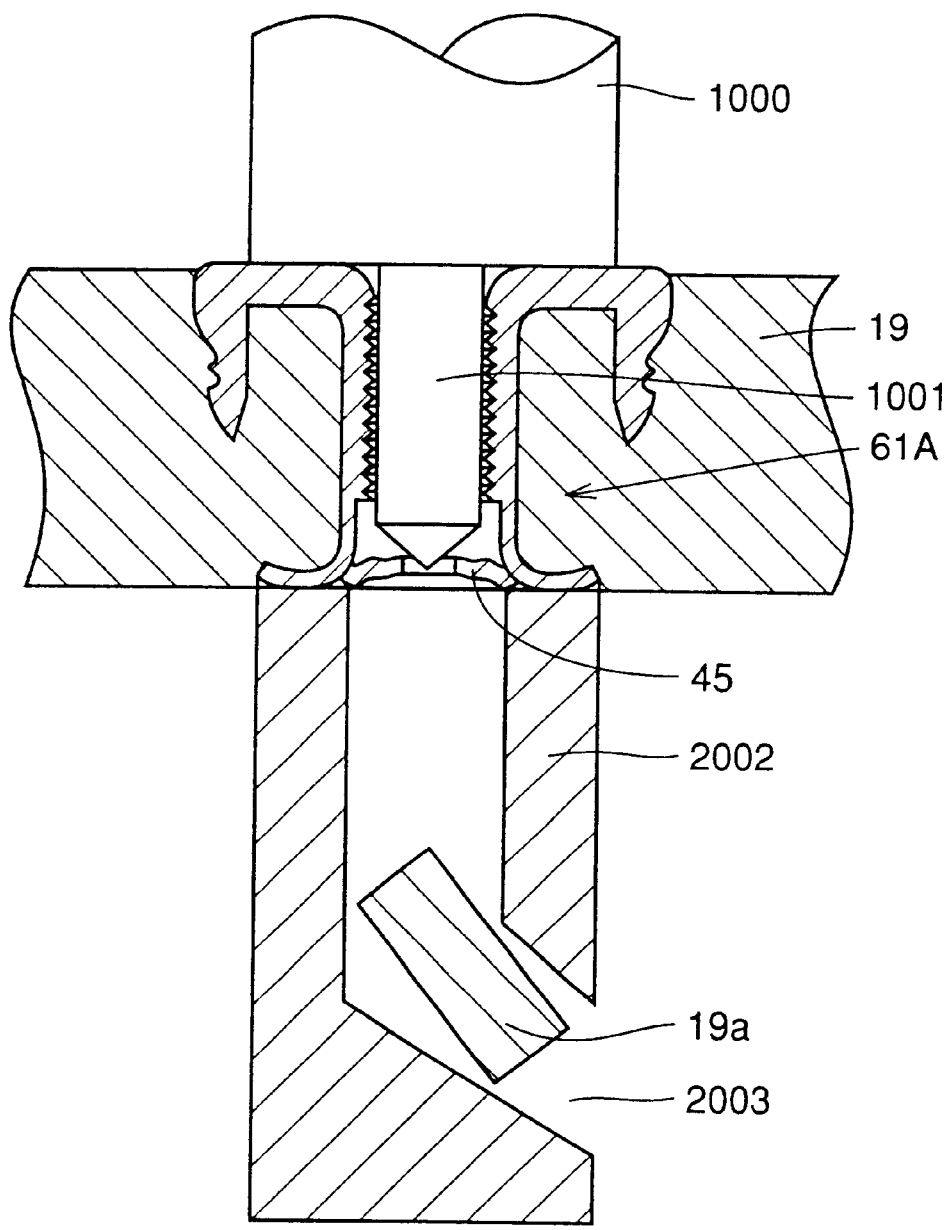
Figure 28A:
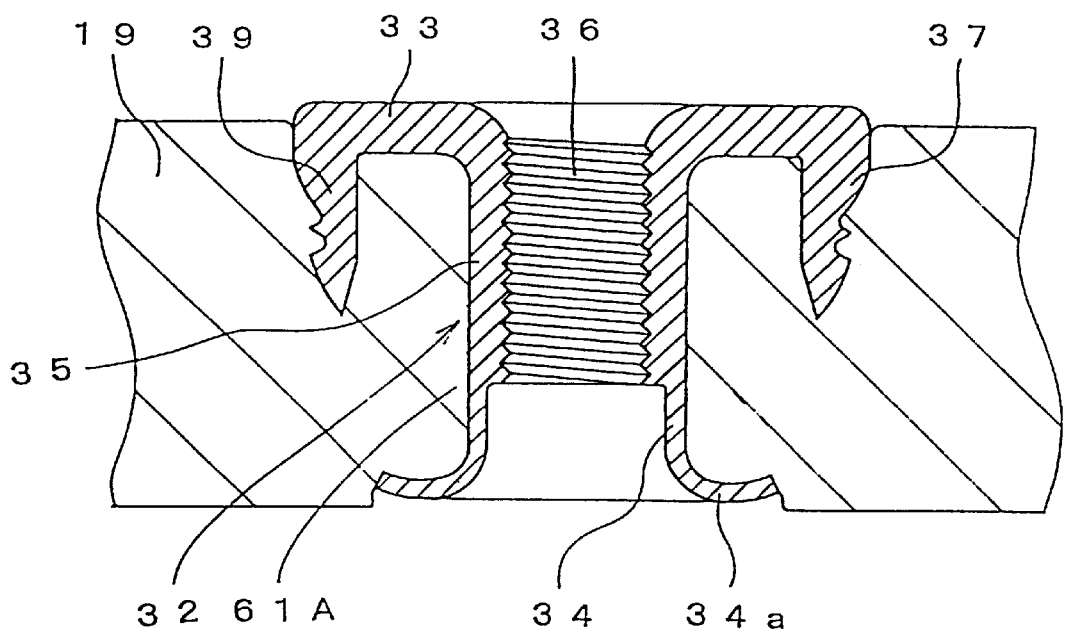
FIG. 28A is a cross sectional view showing T nut 61A driven into object 19 in accordance with the sixth embodiment.

At this time, as the inner surface of flarable portion 34 has a tapered portion 44a recessed outward, the external force for caulking is directed outward. As a result, cap portion 45 is torn off from flarable portion 34, so that flarable portion 34 is flared outward smoothly, and caulking of flarable portion 34 is reliably achieved as shown in FIG. 27. As seen in FIGS. 27 and 28A, the caulked flarable portion 34 consists of a radially outwardly bent single layer of the integral metal material of the T nut, with a broken radially outer terminal edge where the cap portion 45 separated from flarable portion 34. At the same time, pawls 37 and 39 are driven into the other surface of object 19 to be fixed, so that T nut 61A is firmly fixed on object 19.

Though a groove 46 extending in the peripheral direction is provided on an outer peripheral surface of shaft portion 32 at the connecting region between flarable portion 34 and cap portion 45, the groove 46 is to facilitate tearing of cap portion 45 at the time of driving, and therefore it is not essential.

Figure 28B:
FIG. 28B is a cross section representing a cap portion 45 and FIG. 28C is a cross section representing a broken piece 19A of the object.
Figure 28C:
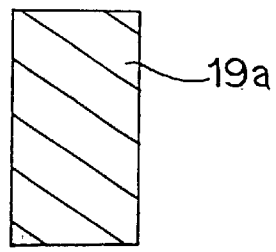

As described above, when T nut 61A is driven into object 19 of fixing, T nut 61A is driven into object 19 as shown in FIG. 28A, and torn cap portion 45 and broken piece 19a of the object remain as shown in FIGS. 28B and 28C.

In a product in which object 19 is a component, another member can be joined to object 19 by screwing a male screw into the female screw 36 of female screw forming portion 35, with T nut 61A being caulked and fixed in the object 19. When the male screw is fastened to female screw at female screw forming portion 35, the fastening force of the male screw mainly acts as a compressive force on female screw forming portion 35. Therefore, large tensile stress is not generated on the shaft portion of the T nut. Therefore, even when strength is decreased because of the provision of annular groove 46 at the shaft portion 32, the substantial strength of fixing is not degraded.

Figure 29:
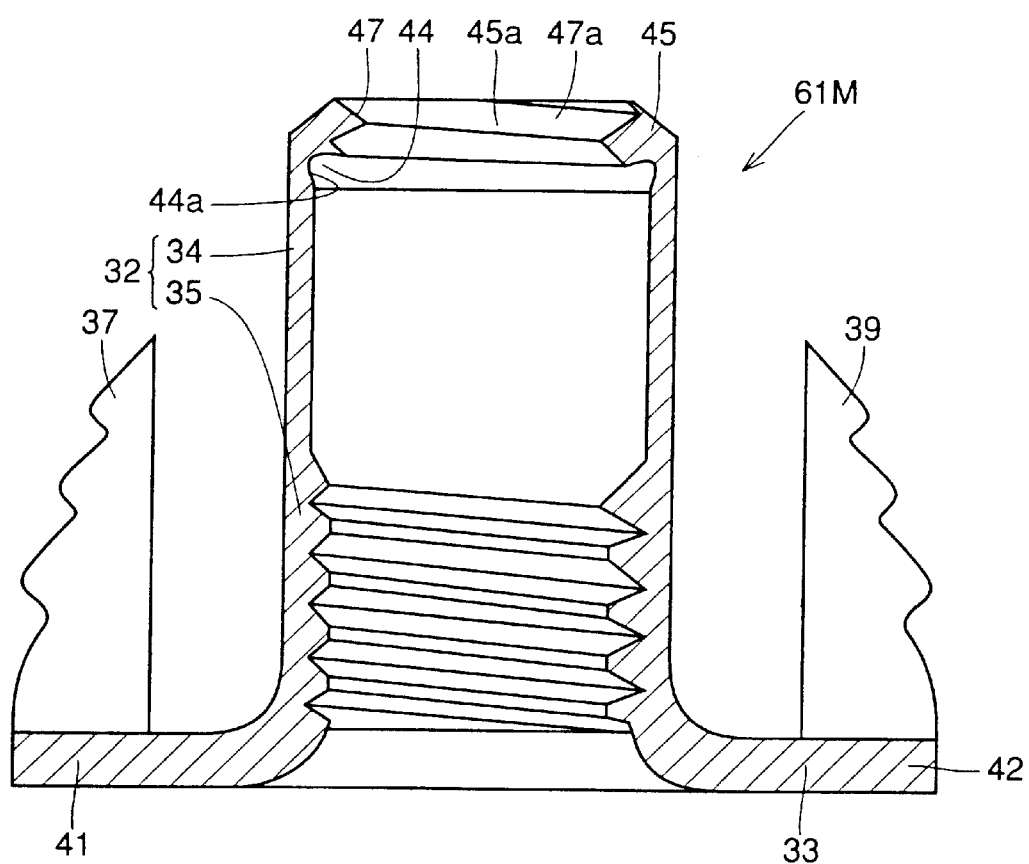
FIG. 29 is a central vertical section of a T nut 61M in accordance with a modification of the sixth embodiment of the present invention.

Though an annular groove 46 is provided on T nut 61E shown in FIG. 23, a structure not provided with the annular groove 46 such as the T nut 61M shown in FIG. 29 may be employed.

The method of driving T nut 61M having the above described structure into an object 19 of fixing formed of resin or wood will be described with reference to FIGS. 30 to 33.

Figure 30:
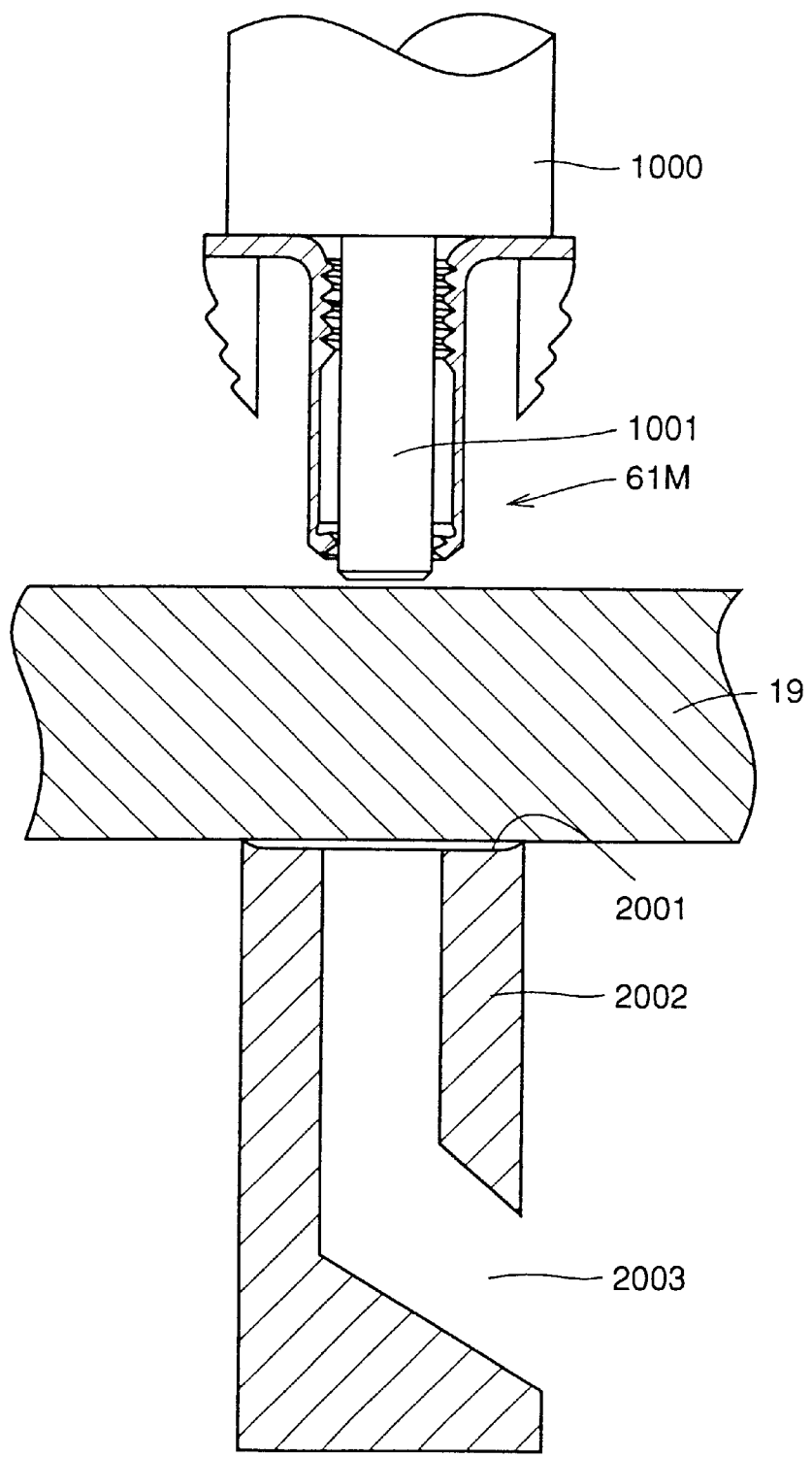
FIGS. 30 to 32 show the first to third steps representing driving of the T nut 61M in accordance with the modification of the sixth embodiment of the present invention, into an object of fixing 19.

T nut 61M is held by a driving head 1000, as can be seen from FIG. 30, with a positioning shaft 1001 of driving head 1000 of a caulker inserted to the shaft 32 of T nut 61M. At a position opposite to driving head 1000 of the object 19 of fixing, an abutting member 2000 is arranged, provided on the caulker. The abutting member 2000 is provided with guide grooves 2002 and 2003 for externally discharging broken pieces of the fractured object 19. Further, a recessed portion 2001 for guiding flarable portion 34 when T nut 61M is driven is provided at the contact surface with the object 19.

Figure 31:
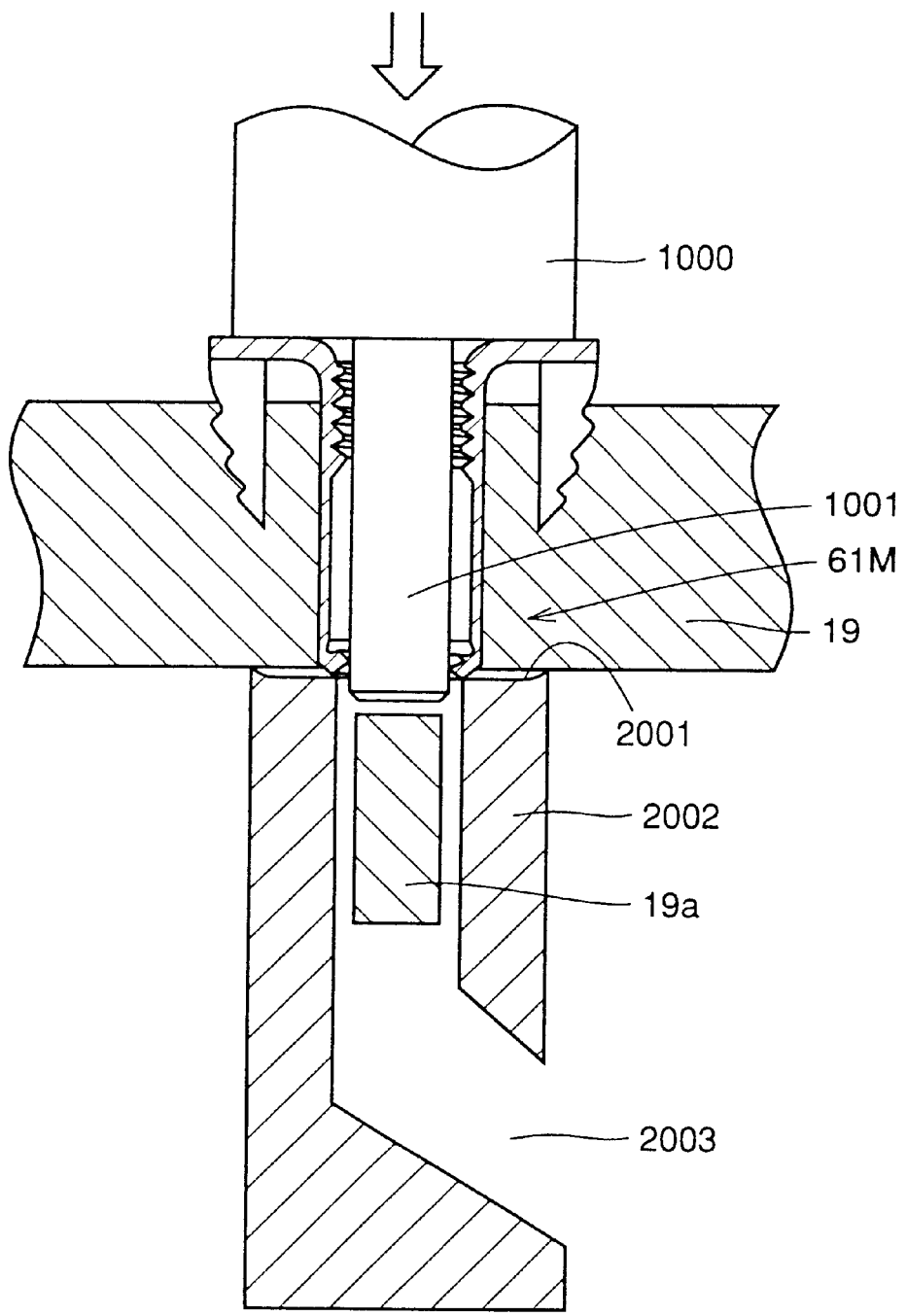

When T nut 61M is driven into object 19 of fixing by driving head 1000 in the above described state, cap portion 45 bites the object 19 of fixing as shown in FIG. 31, so that a piece of object 19 is ejected by cap portion 45. The ejected broken piece 19a of the object of fixing is discharged externally by guide grooves 2002 and 2003. In this manner, when T nut 61M is used, it is unnecessary to provide a receiving hole for driving T nut 61M in object 19 in advance.

Further, the connecting region between flarable portion 34 and cap portion 45 has such a shape in that when a pressing force is applied to the tip end surface of cap portion 45 in a direction from the side of cap portion 45 to flarable portion 34, a force is exerted to bend flarable portion 34 outward so that cap portion 45 goes off from flarable portion 34 and flarable portion 34 is bent outward by the force. Therefore, immediately after T nut 61M is driven into object 19 of fixing, when cap portion 45 collides with the recessed portion 2001 of abutting member 2000 provided outside, cap portion 45 is kept pressing against recessed portion 2001 of abutting member 2000, while an external force for caulking is applied to flarable portion 34 from driving head 1000.

Figure 32:
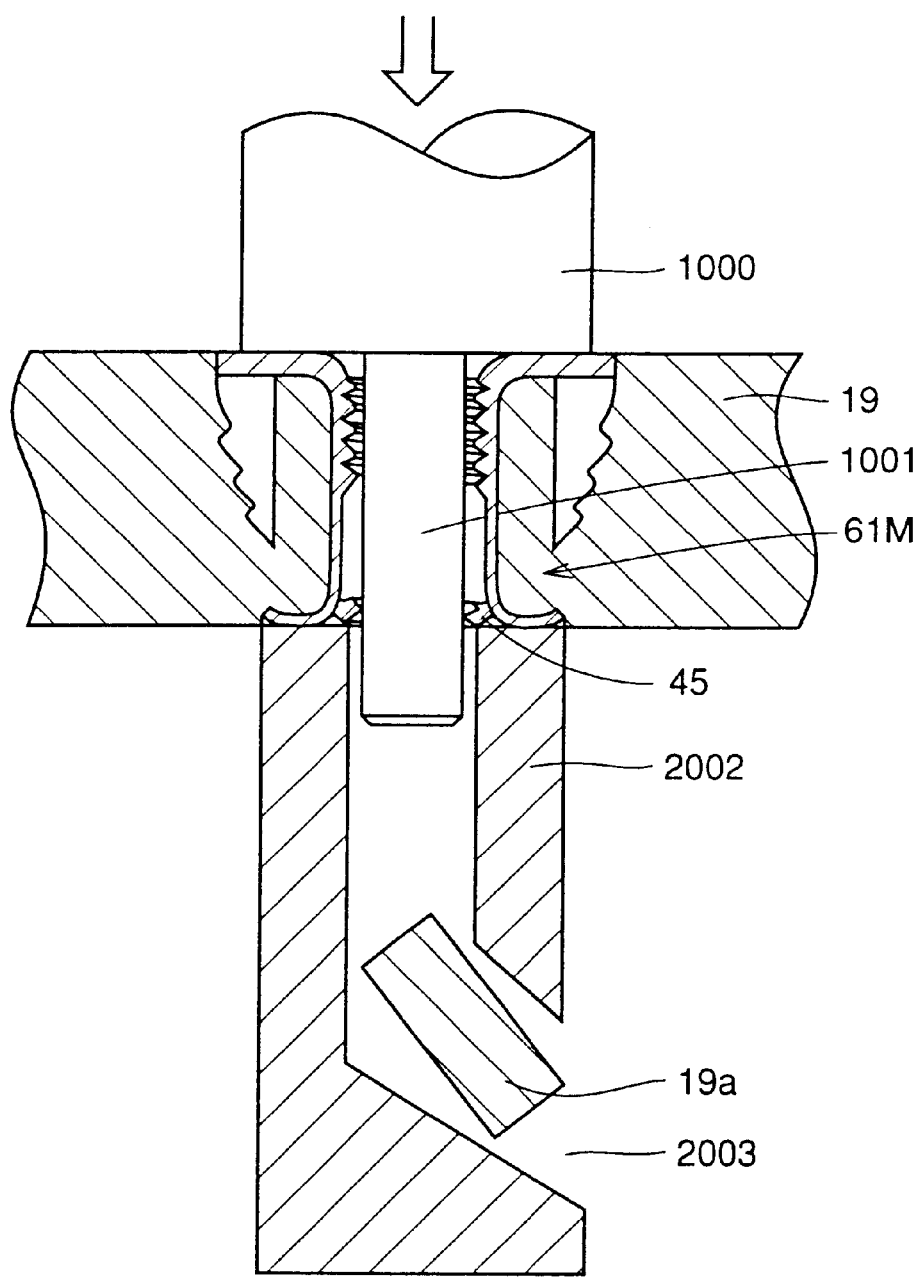

At this time, as the inner surface of flarable portion 34 has a tapered portion 44a recessed outward, the external force for caulking goes outward. As a result, cap portion 45 is torn off from flarable portion 34, so that flarable portion 34 is flared outward smooth, and caulking of flarable portion 34 is surely done as shown in FIG. 32. At the same time, pawls 37 and 39 are driven into the other surface of object 19 of fixing, so that T nut 61M is firmly fixed on object 19.

Figure 33A:
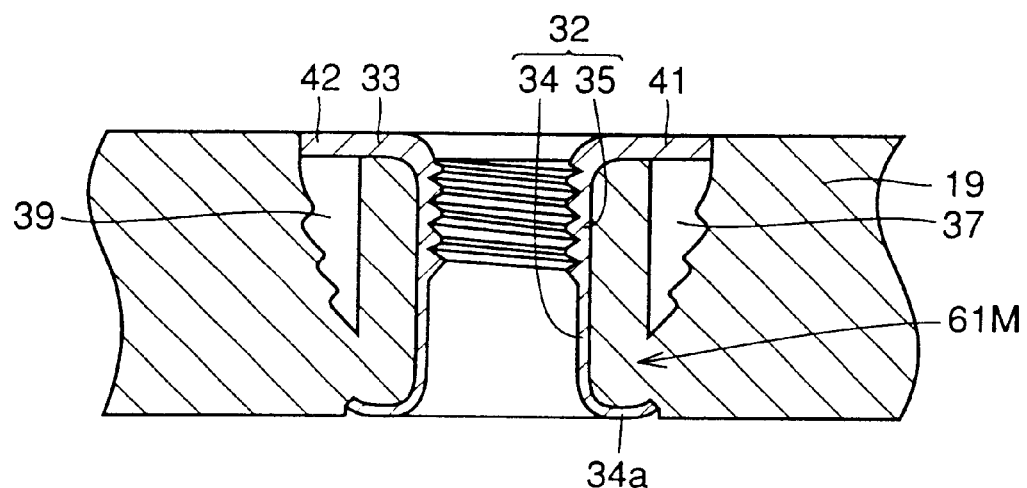
FIG. 33A is a cross section showing a state in which the T nut 61M in accordance with the modification of the sixth embodiment of the present invention is driven into the object of fixing 19.
Figure 33B:
FIG. 33B is a cross section showing a cap portion 45.
Figure 33C:
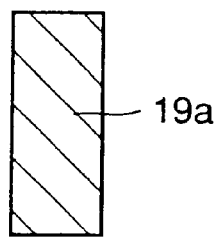
FIG. 33C is a cross section showing a broken piece 19a of the object.

As described above, when T nut 61M is driven into object 19 of fixing, T nut 61M is driven into object 19 as shown in FIG. 33A, and torn cap portion 45 and broken piece 19a of the object remain as shown in FIGS. 33B and 33C.

In a product in which object 19 of fixing is a component, another member can be joined to object 19 of fixing by screwing a male screw into the female screw of female screw forming portion 35, with T nut 61M caulked and fixed. When the male screw is fastened to female screw at female screw forming portion 35, the fastening force of the male screw mainly acts as a compressive force on female screw forming portion 35. Therefore, large tensile stress is not generated on the shaft portion of the T nut. Therefore, even when strength is decreased because of the provision of annular groove at the shaft portion, substantial strength of fixing is not degraded.

Figure 34:
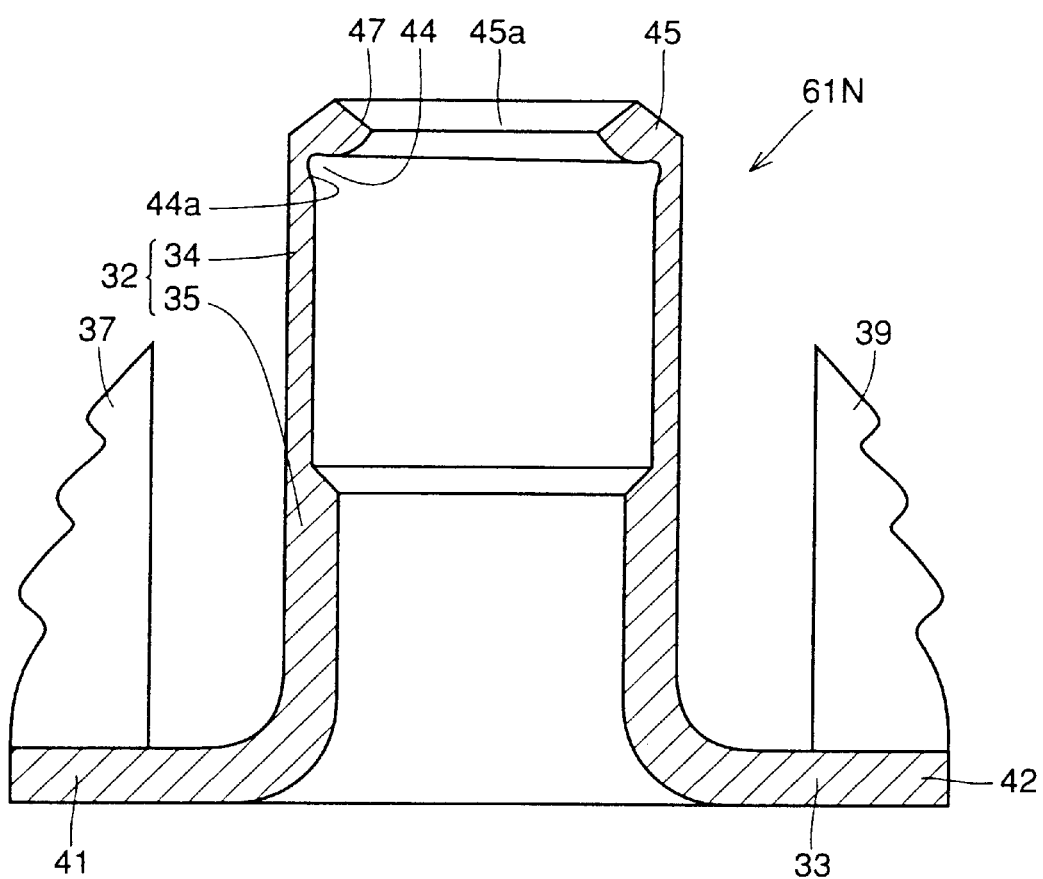
FIG. 34 is a central vertical section of T nut 61N in accordance with a modification of the sixth embodiment of the present invention.

Further, as a T nut intended solely for caulking, a T nut 61N not having the female screw in the inner periphery of shaft portion 32 or on an end surface 47 of opening 45a, as shown in FIG. 34, may be employed.

The shape of an end surface 47 of T nut 61M shown in FIG. 29 is different from the shape of an end surface 47 of T nut 61E shown in FIG. 23. The reason for this is that in T nut 61M, thickness of end surface 47 is reduced, so as to reduce threading torque on end surface 47 generated when the female screw is formed.

Seventh Embodiment: Shape of Recycle T Nut 61F

Figure 35A:
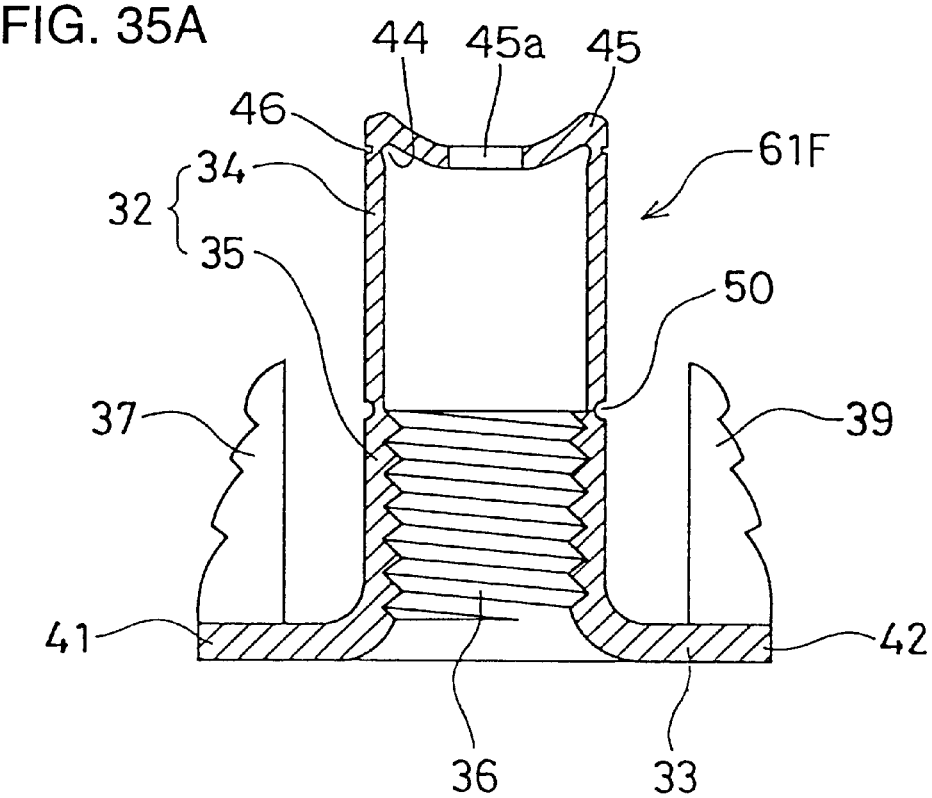
FIG. 35A is a central vertical section of a T nut 61F in accordance with a seventh embodiment of the present invention and FIG. 35B is a perspective view of T nut 61F.
Figure 35B:
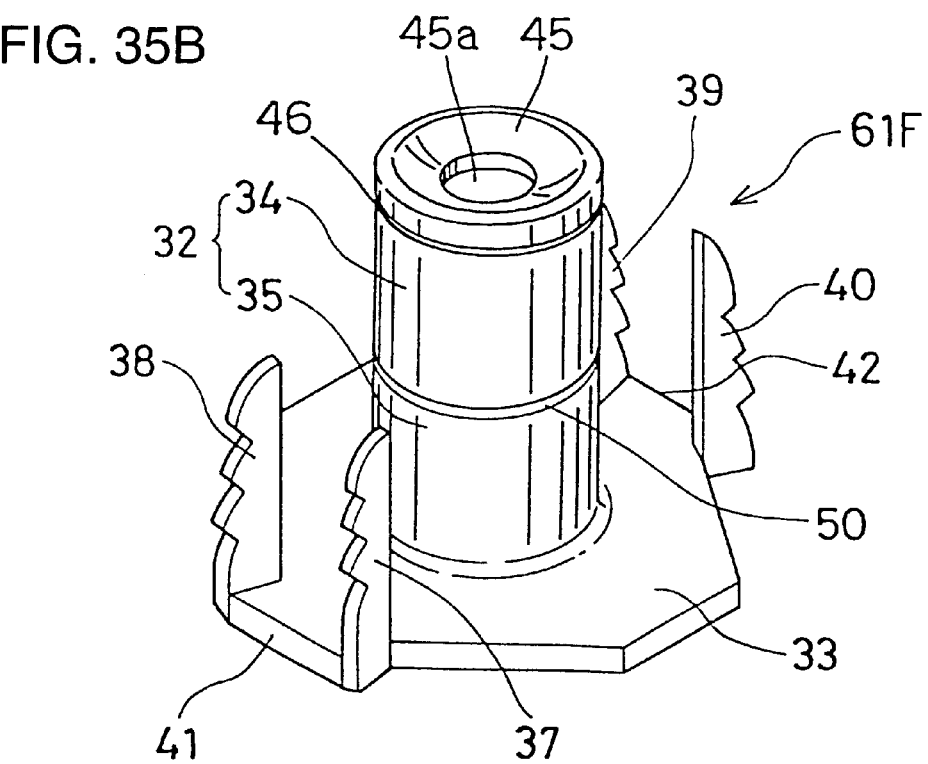

The shape of a T nut 61F in accordance with the seventh embodiment of the present invention is basically the same as T nut 61A in accordance with the first embodiment, as can be seen from FIGS. 35A and 35B. Therefore, common components will be denoted by the same reference characters, and detailed description thereof will not be repeated.

T nut 61F in accordance with the present embodiment differs from T nut 61A in accordance with the first embodiment described above in that an annular groove 50 is provided over the entire periphery of the outer periphery of shaft portion 32 at the interface between flarable portion 34 and female screw forming portion 35. Cross section of annular groove 50 may be arbitrarily selected to be U shape, V shape or a rectangular shape with one side opened as shown in FIG. 40, dependent on the material of the T nut and associated processing property or mechanical property such as tensile strength. Annular groove 50 is provided for the purpose of promoting recycling of object 19 of fixing, as it facilitates separation and recovery of the object which is the part of a product, after the product on which T nut 61F has been fixed by caulking is finished. The method of recovery for recycling will be described later.

Eighth Embodiment: Shape of Recycle T Nut 61G

Figure 36A:
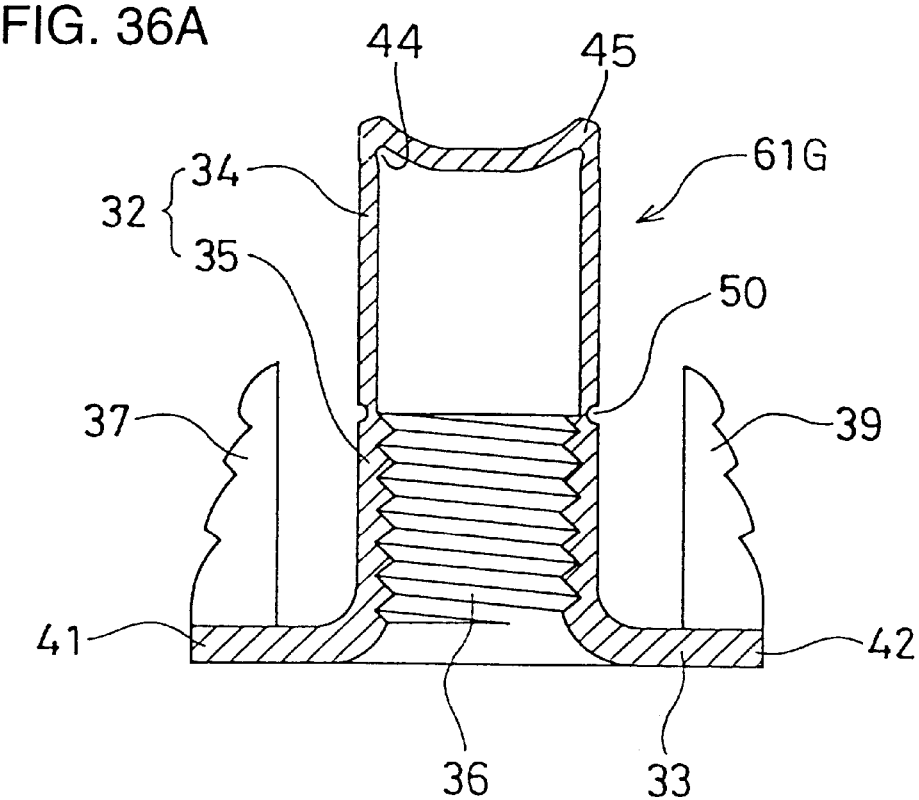
FIG. 36A is a central vertical section of a T nut 61G in accordance with an eighth embodiment of the present invention and FIG. 36B is a perspective view of T nut 61G.
Figure 36B:
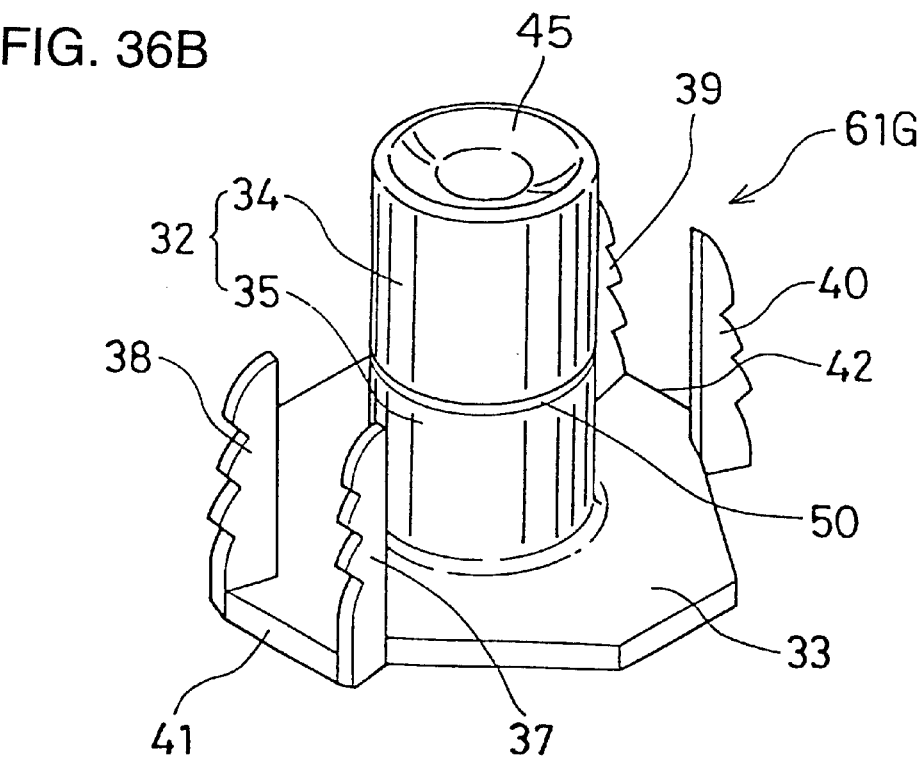

The shape of a T nut 61G in accordance with the eighth embodiment of the present invention is basically the same as T nut 61D in accordance with the fourth embodiment, as can be seen from FIGS. 36A and 36B.

Therefore, common components will be denoted by the same reference characters, and detailed description thereof will not be repeated.

T nut 61G in accordance with the present embodiment differs from T nut 61D in accordance with the fourth embodiment described above in that an annular groove 50 is provided over the entire periphery of the outer periphery of shaft portion 32 at the interface between flarable portion 34 and female screw forming portion 35. Cross section of annular groove 50 may be arbitrarily selected to be U shape, V shape or a rectangular shape with one side opened as shown in FIG. 40, dependent on the material of the T nut and associated processing property or mechanical property such as tensile strength. Annular groove 50 is provided for the purpose of promoting recycling of object 19 of fixing, as it facilitates separation and recovery of the object which is the part of a product, after the product on which T nut 61G has been fixed by caulking is finished. The method of recovery for recycling will be described later.

The structure for the purpose of recycling is also applicable to T nut 61B in accordance with the second embodiment and to T nut 61C in accordance with the third embodiment.

Ninth Embodiment: Method of Recovering Object of Fixing

The method of recycling when recycle T nuts 61F and 61G in accordance with the seventh and eighth embodiments are used will be described, taking recycle T nut 61F as an example. T nut 61G can be recycled in the similar manner.

Figure 37A:
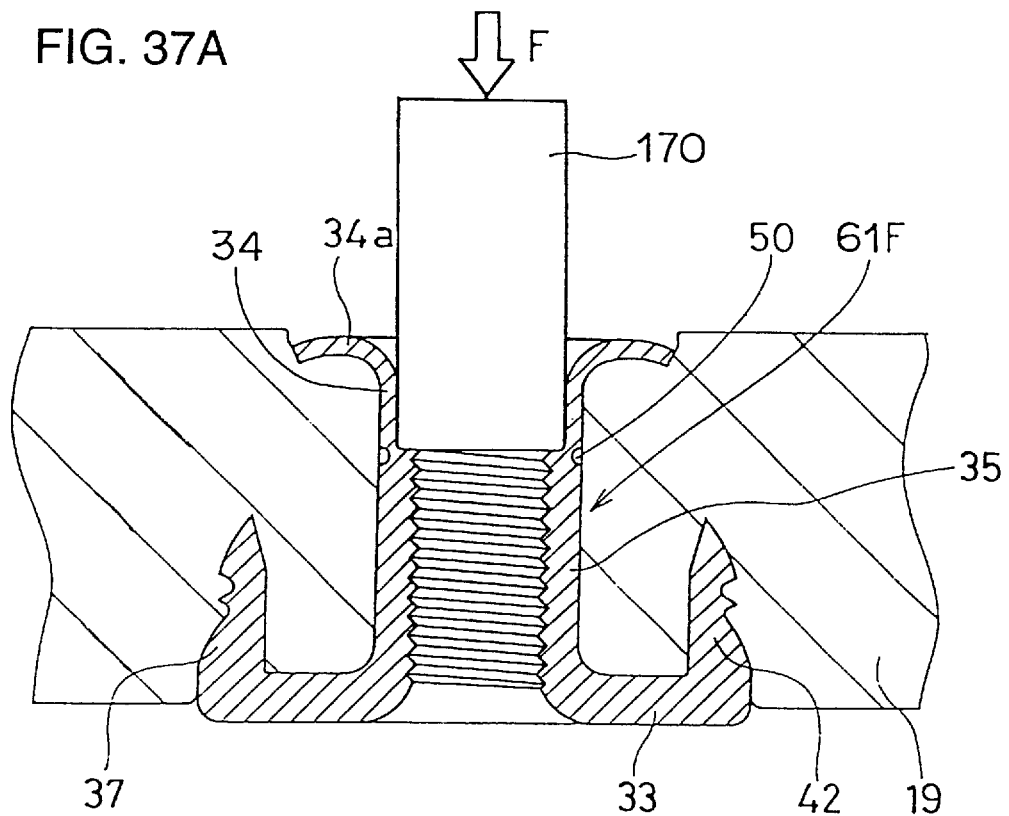
FIG. 37A is a cross section showing a state in which a jig 170 is pressed from caulked portion 34, in accordance with a method of removing T nut 61F caulked and fixed in object 19, from object 19 in accordance with a ninth embodiment of the present invention.

First, referring to FIG. 37A, a lower end of a columner jig 170 having slightly larger outer shape than the inner diameter of flarable portion 34 before caulking is pressed in from the side of flarable portion 34a of T nut 61G. With the lower end of jig 170 abutting a stepped portion at the boundary between flarable portion 34 and female screw forming portion 35, an upper end of jig 170 is hit by a hammer or the like, so that a force F shown in FIG. 37A is generated.

By the force F, a portion having the smallest thickness at the outer periphery of the shaft portion provided with the annular groove 50 at the interface between flarable portion 34 and female screw forming portion 35, stress is concentrated, resulting in large tensile stress.

Figure 37B:
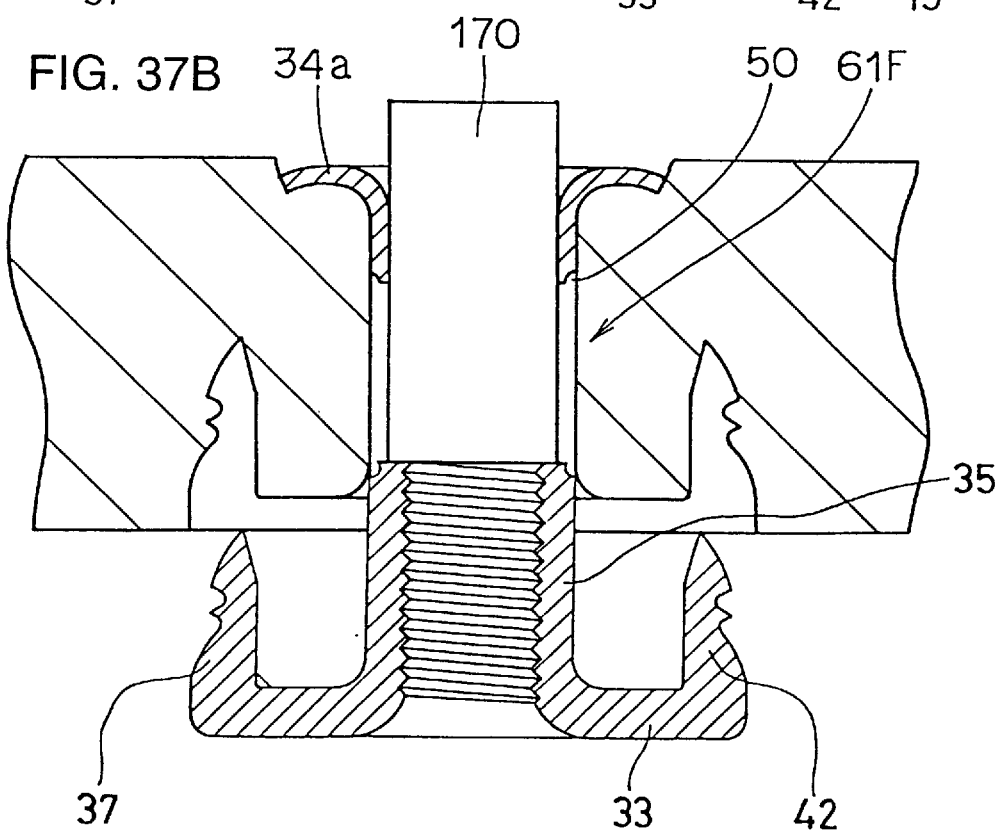
FIG. 37B is a cross section showing a state in which by the method of removal shown in FIG. 37A, T nut 61F is separated into upper and lower two parts, torn at the annular groove 50 by the pressing force F of jig 170.

As a result, annular groove 50 is torn, so that T nut 61F is divided into two as shown in FIG. 37B. By the lower end of jig 170, lower half of T nut 61F including female screw forming portion 35 and flange portion 33 is pushed downward, and removed from object 19 of fixing. As a result, referring to FIG. 38, the upper half of T nut 61F including the caulked portion 34a is removed from the through hole of object 19 of fixing, fitted in jig 170, when the jig 170 is pulled upward.

In this manner, recycle T nuts 61F and 61G in accordance with the seventh and eighth embodiments allow easy removal from object 19 of fixing. Therefore, when the product on which the T nut has been caulked and fixed is used and finished, the object of fixing constituting the product can be easily separated and recovered. Therefore, recycling of object 19 of fixing is promoted.

In T nuts 61F and 61G in accordance with the seventh and eighth embodiments, annular groove 50 is provided at the interface between flarable portion 34 and female screw forming portion 35. Therefore, even when the flarable portion 34 is subjected to caulking over almost entire length, the method of removal using jig 170 described above is applicable.

Further, as the portion of minimum thickness is formed at the step at the interface between the flarable portion and the female screw forming portion, stress concentration at that portion becomes higher, relatively facilitating tearing at the time of removal from the object. Therefore, conveniently, the process of separation at the time of recovery for recycle is facilitated. Such recovery for recycling is strongly desired when object 19 of fixing is formed of plastics.

Tenth Embodiment

In recycle T nuts 61G and 61F in accordance with the seventh and eighth embodiments, annular groove 50 is provided on an outer periphery of shaft portion 32 near the interface between flarable portion 34 and female screw forming portion 35. The position where annular groove 50 is provided is not limited thereto. More specifically, as represented by two dotted line in FIGS. 39A to 39C, when only a part of the opening side of flarable portion 34 is to be bent by caulking, annular groove 50 may be provided closer to the side of flarable portion 34 than the interface between flarable portion 34 and female screw forming portion 35. Even when the annular groove is provided at such a position, removal from object 19 of fixing is possible by the method described with reference to FIGS. 37 and 38.

Figure 39A:
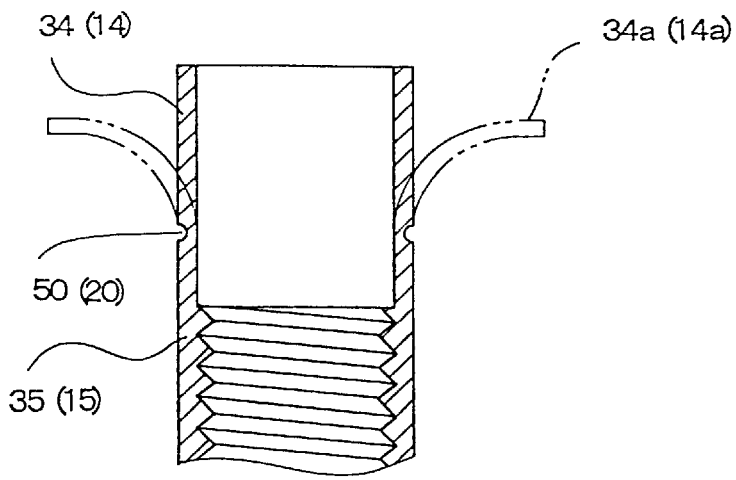
FIG. 39A is a partial cross section representing the manner of forming annular grooves 20, 50 of T nut in accordance with a tenth embodiment of the present invention.
Figure 39B:
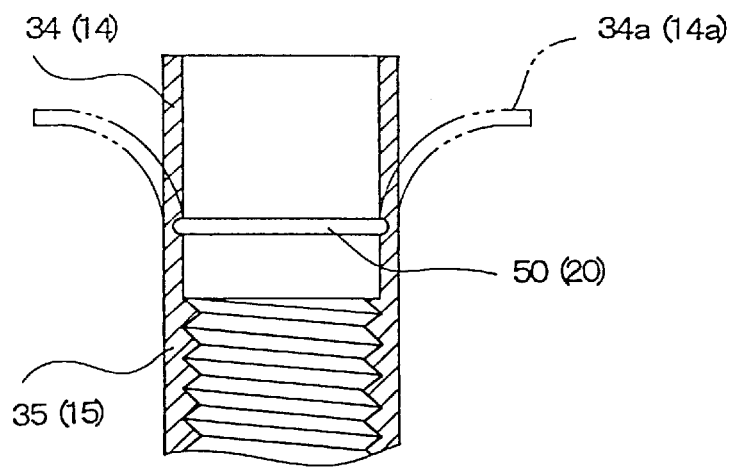
FIGS. 39B and 39C are cross sections representing two modifications of the manner of forming annular grooves 20, 50 of the T nut in accordance with the tenth embodiment.
Figure 39C:
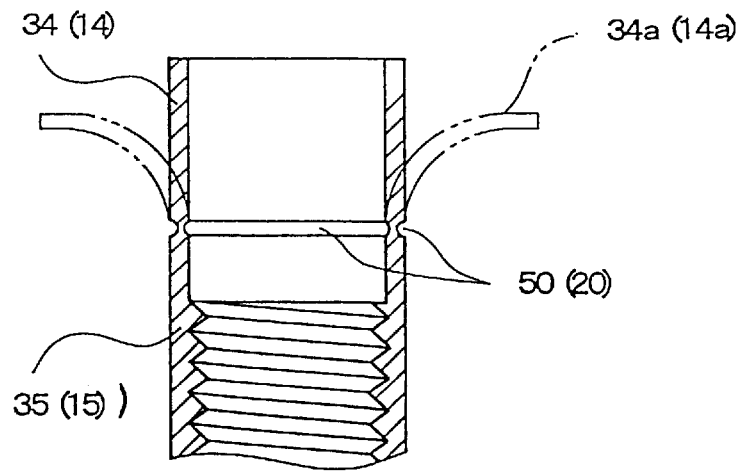

Further, when the annular groove is to be provided on flarable portion 34, the groove may be formed not on the outer periphery of shaft portion 32 but on an inner periphery of shaft portion 32 as shown in FIG. 39B, or grooves may be provided both on the inner and outer peripheries of shaft portion 32 as shown in FIG. 39C, attain similar effects.

Figure 40A:
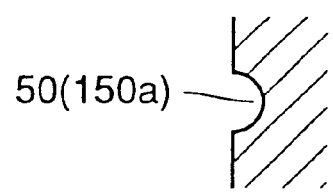
FIGS. 40A to 40C represent cross sectional shapes of annular grooves 20, 50.
Figure 40B:
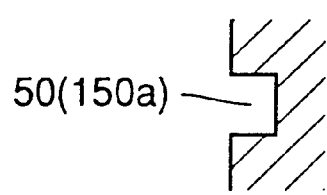
Figure 40C:
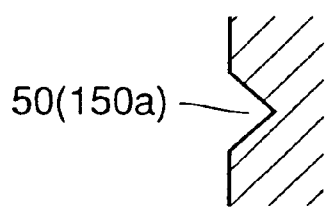

The shape of annular groove 50 may be arbitrarily selected to be U shape, V shape or a rectangular shape with one side opened as shown in FIGS. 40A, 40B and 40C, in accordance with the material of the T nut and associated processing property or mechanical property such as tensile strength. The same applies to the following embodiments.

Eleventh Embodiment: Modification of Recycle T Nut

Figure 41A:
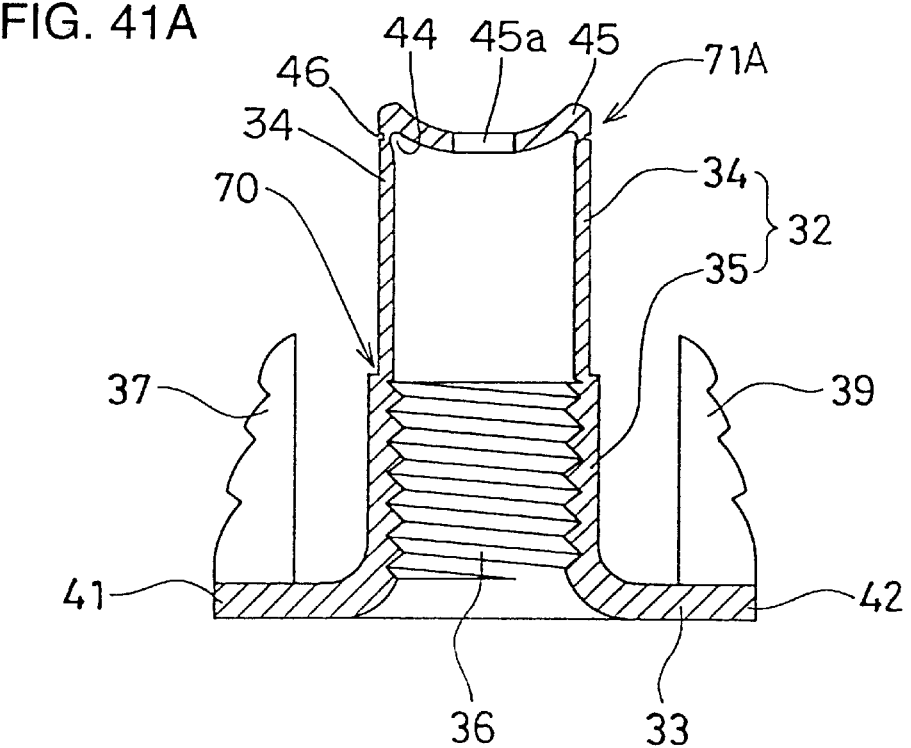
FIG. 41A is a partial cross section showing the manner of forming an annular thin portion 70 in a T nut 71A in accordance with an eleventh embodiment of the present invention.
Figure 41B:
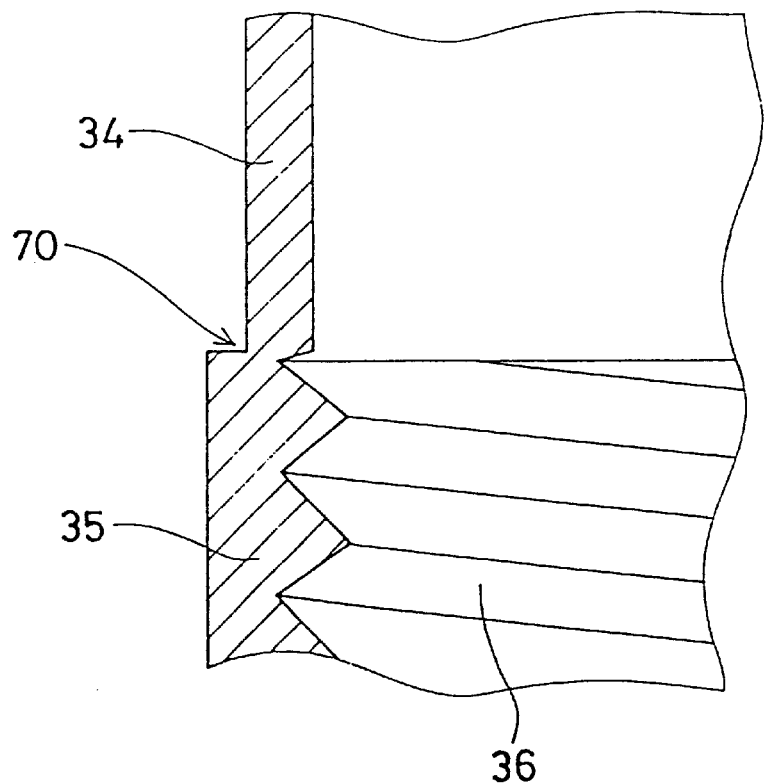
FIG. 41B is a cross sectional view showing, in enlargement, the vicinity of annular thin portion 70 of the T nut of FIG. 41A.

In each of the above described embodiments, annular groove 50 is formed on the shaft portion 32 so as to form an annular thin portion partially for the purpose of recycling. As means for forming annular thin portion, it is possible to contract to reduce inner and outer diameters of flarable portion 34 as shown in FIGS. 41A and 41B, whereby a T nut 71A is provided which has an annular thin portion 70 extending over the entire periphery at the interface between flarable portion 34 and female screw forming portion 35.

T nut 71A having such a structure caulked and fixed on the object of fixing can also be divided into two and removed from the object of fixing, by driving a wedge shaped jig or the like into the contact portion between the caulked portion or the flange portion and the object of fixing, causing tensile stress at the shaft portion and tearing the annular thin portion.

In the structure shown in FIG. 41, the inner and outer diameters of flarable portion 34 are contracted to be reduced and extended in the radial direction of shaft portion 32. Alternatively, the inner and outer diameters of flarable portion 34 may be formed to be enlarged and drawn in the radial direction of shaft portion 32 to form the annular thin portion to attain similar object. More specifically, what is necessary is to form the inner and outer diameters of flarable portion 34 reduced or enlarged relative to the female screw forming portion 35 so that an annular thin portion drawn in the radial direction of shaft portion 32 is formed over the entire periphery of the interface between flarable portion 34 and female screw forming portion 35.

FIG. 42 shows a T nut 71B as a modification of T nut 71A. T nut 71B is different in that cap portion 44 does not have opening 45a and flarable portion 34 is not provided with groove 46. Except these points, the structure and function are the same.

Though T nuts 71A and 71B shown in FIGS. 41 and 42 have approximately octagonal relatively large flanges with pawls provided on the outer periphery of the flange, the flange is not limited to the relatively large sized ones, and pawls may not be provided. Further, circular flange may be used. Driving into the object of fixing is performed in the similar manner as described with reference to FIGS. 25 to 28 and FIGS. 30 to 33

As to the shape of the connecting region, not only the structure shown in FIGS. 41 and 42 but also the structure shown in FIGS. 5 to 24 and FIG. 29 may be applicable.

As to the position and cross sectional shape of annular groove 50, the structure shown in FIGS. 39 and 40 may be employed.

Twelfth Embodiment: Modification of Recycle T Nut

A structure of T nut 81A in accordance with the twelfth embodiment of the present invention will be described with reference to FIG. 43A. In FIG. 43A, portions which are the same as or correspond to those of T nut 61A in accordance with the first embodiment shown in FIG. 1 will be denoted by the same reference characters, and description thereof will not be repeated.

In the present embodiment, the present invention is applied to the T nut disclosed in U.S. Pat. No. 5,618,144. T nut 81A in accordance with the present embodiment is common to the T nuts of the embodiments described above in that it is a so called rivet type T nut. The T nut of the present embodiment, however, is different from other embodiments in the shape of the flarable portion. More specifically, as can be seen from FIG. 43A, flarable portion 134 of shaft portion 32 of T nut 81A in accordance with the present invention has an inner diameter larger than the inner diameter of female screw forming portion 35 and an outer diameter larger than the outer diameter of female screw forming portion 35.

On the outer periphery of shaft portion 32 near the interface between flarable portion 134 and female screw forming portion 35, a cap member 145 having an opening 145a, an inner surface 144 provided recessed outward, a groove 146 and an annular groove 50 are formed, as in the ninth embodiment. The purpose, specific shapes and the method of removal for recycling of opening 145a, cap member 145, inner surface 144, groove 146 and annular groove 50 are similar to those described with respect to the first embodiment.

FIG. 43B represents a structure of T nut 91A in accordance with a modification of the present embodiment. T nut 91A of the modification is common to T nut 81A shown in FIG. 43A in that flarable portion 134 of shaft portion 32 has an inner diameter larger than the inner diameter of female screw forming portion 35 and an outer diameter larger than the outer diameter of female screw forming portion 35. T nut 91A differs from T nut 81A in that in place of annular groove 50, an annular thin portion 70 similar to that of the first embodiment described above is provided on the outer periphery of shaft portion 32 near the interface between flarable portion 134 and female screw forming portion 35.

Annular thin portion 70 of T nut 91A can be formed by drawing and enlarging in the radial direction of shaft 32 so that inner and outer diameters of flarable portion 34 are enlarged. The function attained by the provision of annular thin portion 70 is similar to that attained by the annular thin portion 70 of T nut 71 described with respect to the eleventh embodiment.

Figure 44A:
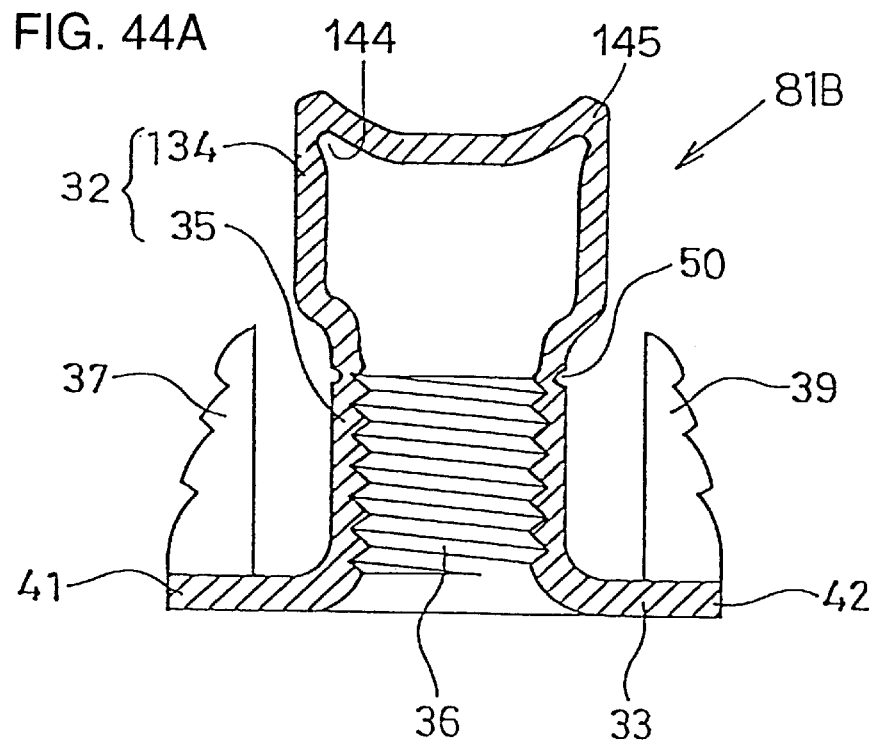
FIG. 44A is a central vertical section of a T nut 81B which is a modification of the twelfth embodiment of the present invention.
Figure 44B:
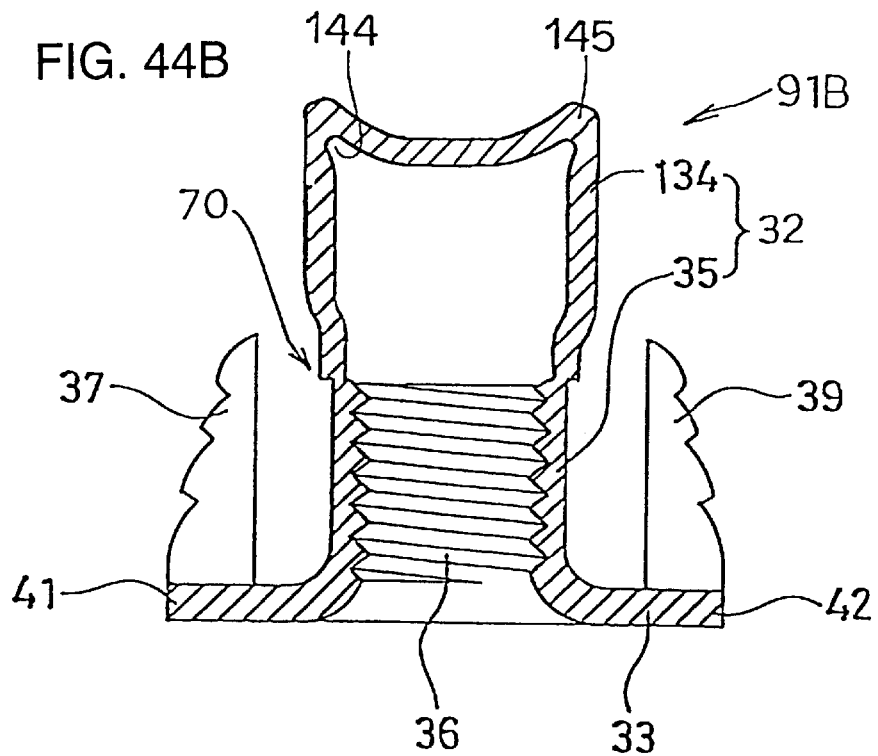
FIG. 44B is a central vertical section of a T nut 91B in accordance with a modification of the twelfth embodiment of the present invention.

T nuts 81B and 91B shown in FIGS. 44A and 44B are further modifications of T nuts 81A and 91A. T nuts 81B and 91B are different in that cap portion 145 does not have opening 145a and that flarable portion 134 is not provided with groove 146. Other structure and function are the same. If recycling is not intended, annular groove 50 and thin portion 70 are unnecessary.

Though T nuts shown in FIGS. 43 and 44 have approximately octagonal relatively large flanges with pawls provided on the outer periphery of the flange, the flange is not limited to the relatively large sized ones, and pawls may not be provided. Further, circular flange may be used. Driving into the object of fixing is performed in the similar manner as described with reference to FIGS. 25 to 28 and FIGS. 30 to 33. As to the shape of the connecting region, not only the structure shown in FIGS. 43 and 44 but also the structure shown in FIGS. 5 to 24 and FIG. 29 may be applicable.

In the first to twelfth embodiments described above, examples in which the present invention is applied to a T nut having a female screw formed on an inner peripheral surface of the shaft portion have been described. In any of the embodiments, the structure may be used as a rivet, with the female screw not formed on the inner periphery of the shaft body portion, except for the flarable portion.

As to the position and cross sectional shape of annular groove 50, the structure shown in FIGS. 39 and 40 may be employed.

Thirteenth Embodiment: Modification of Recycle T Nut

The structure of a T nut 101A in accordance with the thirteenth embodiment of the present invention will be described with reference to FIG. 45A. In T nut 101A of the present embodiment, the shapes of shaft portion 32 and flange portion 33 are basically the same as those of T nut 61A in accordance with the first embodiment, as can be seen from FIG. 45A. Therefore, in FIG. 45A, portions the same as or corresponding to those of T nut 61A in accordance with the first embodiment described above will be denoted by the same reference characters as FIG. 1A, and description thereof will not be repeated.

T nut 101A in accordance with the present embodiment differs from T nut 61A in accordance with the first embodiment in that in addition to an annular groove 150a provided on an outer periphery of shaft portion 32, an annular groove 150b having an approximately V shape having larger cross sectional area than annular groove 150a is provided on an inner periphery of shaft portion 32 at a position approximately opposing to annular groove 150a. Annular groove 150a is formed at the interface between flarable portion 34 and female screw forming portion 35, and at a position where annular grooves 150a and 150b oppose to each other, shaft 32 has the thinnest thickness. Therefore, when the T nut is to be removed from a panel material in accordance with the methods shown in FIGS. 37A, 37B and 38 from the state fixed and caulked in a receiving hole of the panel material, shaft portion 32 tears at the thinnest portion and separates, so that recovery is easy.

Figure 38:
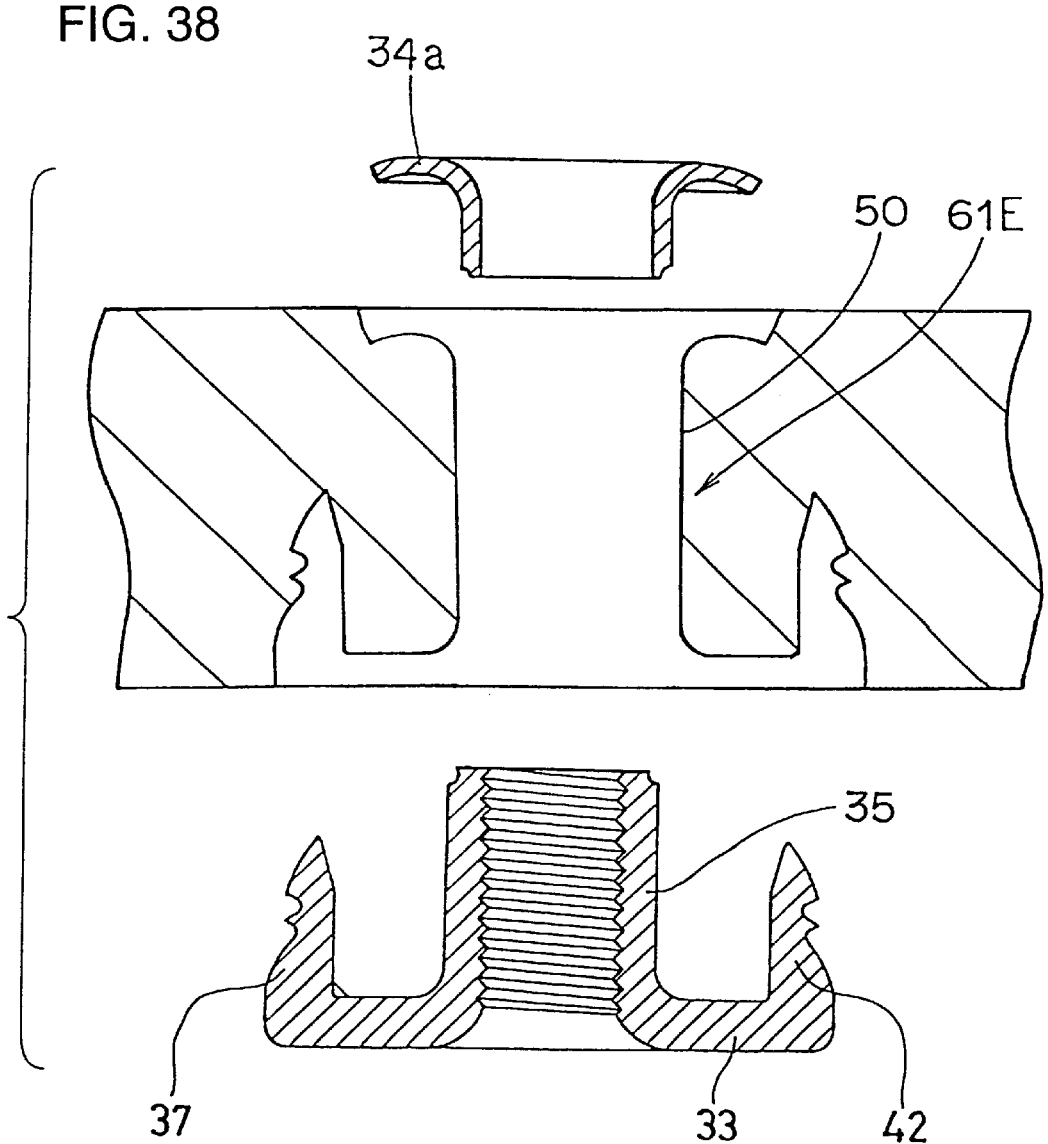
FIG. 38 is a cross section of T nut 61F separated into upper and lower two parts.

FIG. 45B shows a cross section of a rivet 111A having similar structure as T nut 101A except that female screw is not formed on the inner peripheral surface of shaft body portion 135 which corresponds to the female screw forming portion 35 of T nut 101A. Rivet 111A may be used as a reinforced hole to which a bolt is to be inserted, when a plurality of panel materials are stacked and fastened by a bolt. Rivet 111A having such a structure is used caulked and fixed in the panel material in the similar manner as T nut 101A, and for removal, it is torn off in the similar manner as shown in FIGS. 37A, 37B and 38, for easy recovery.

FIGS. 46A and 46B show T nuts 101B and 111B which are further modifications of T nuts 101A and 111A. T nuts 101B and 111B are different in that cap portion 45 does not have opening 45a and that flarable portion 34 is not provided with groove 46. Except these points, the structure and function are the same. If recycling is not intended, annular groove 150a is unnecessary.

Though T nut and rivet shown in FIGS. 45 and 46 have approximately octagonal relatively large flanges with pawls provided on the outer periphery of the flange, the flange is not limited to the relatively large size ones, and pawls may not be provided. Further, circular flange may be used.

As to the shape of the connecting region, not only the structure shown in FIGS. 45 and 46 but also the structure shown in FIGS. 5 to 24 and FIG. 29 may be applicable. Driving into the object of fixing is performed in the similar manner as described with reference to FIGS. 25 to 28 and FIGS. 30 to 33.

As to the position and cross sectional shape of annular groove 150a, the structure shown in FIGS. 39 and 40 may be employed.

Fourteenth Embodiment: Modification of Recycle T Nut

Figure 47:
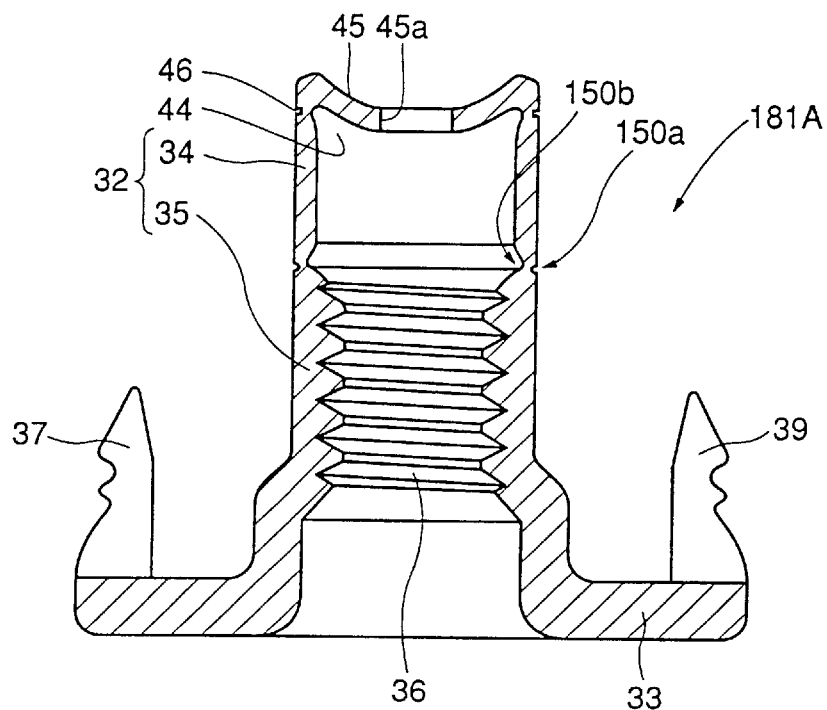
FIG. 47 is a central vertical section of a T nut 181A in accordance with a fourteenth embodiment of the present invention.

The structure of T nut 181A in accordance with the fourteenth embodiment of the present invention will be described with reference to FIG. 47. As shown in FIG. 47, T nut 181A in accordance with the present invention is similar in shape to T nut 101A in accordance with the thirteenth embodiment described with reference to FIG. 45A. Therefore, common components will be denoted by the same reference characters and detailed description thereof will not be repeated.

T nut 181A in accordance with the present embodiment differs from T nut 101A of the above described embodiment in that on the side of flange 33 of female screw forming portion 35 of shaft portion 32, a region is provided which has an inner diameter larger than the inner diameter of flarable portion 34 and an outer diameter larger than the outer diameter of shaft body portion 32.

The T nut having such a structure also attains the similar effects as T nut 101 attained by the provision of annular grooves 150a and 150b at the hollow cylindrical portion at the side of the tip end of shaft portion 32.

Figure 48:
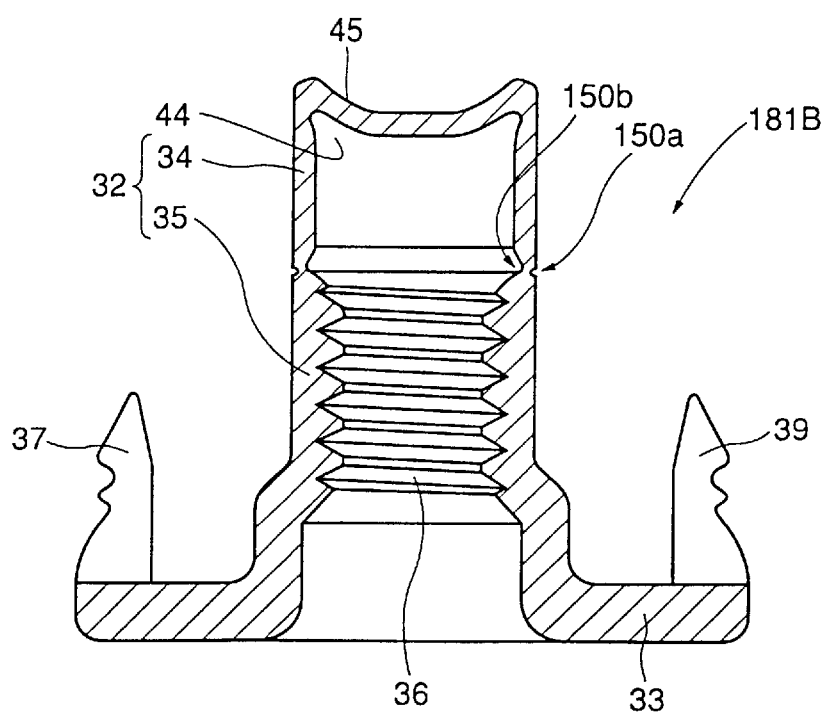
FIG. 48 is a central vertical section of a T nut 181B in accordance with a fourteenth embodiment of the present invention.
Figure 49:
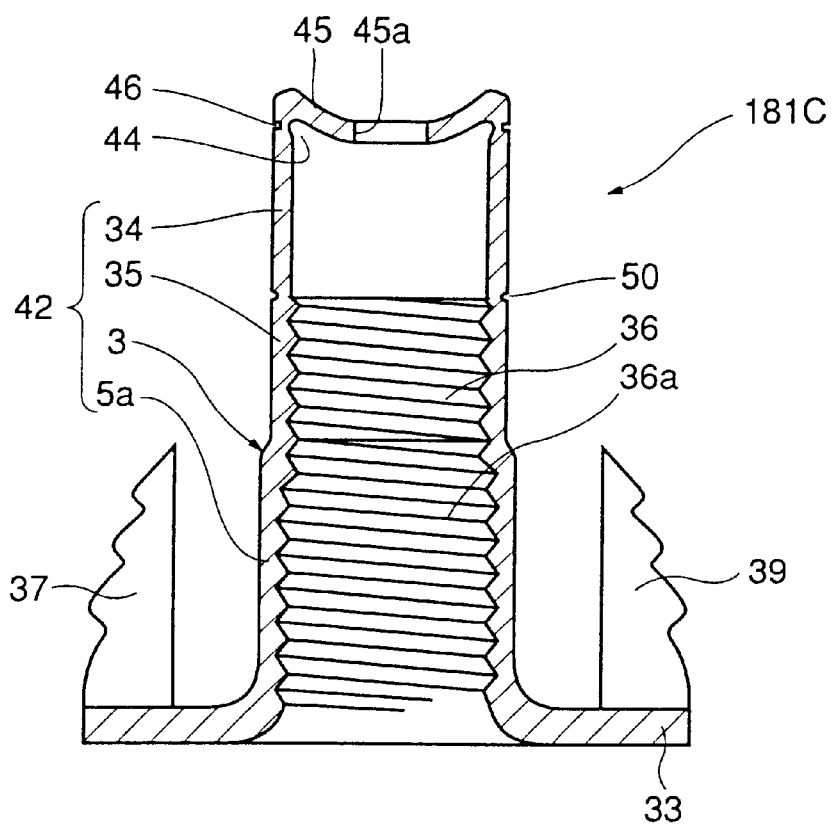
FIG. 49 is a central vertical section of a T nut 181C in accordance with a fourteenth embodiment of the present invention.
Figure 50:
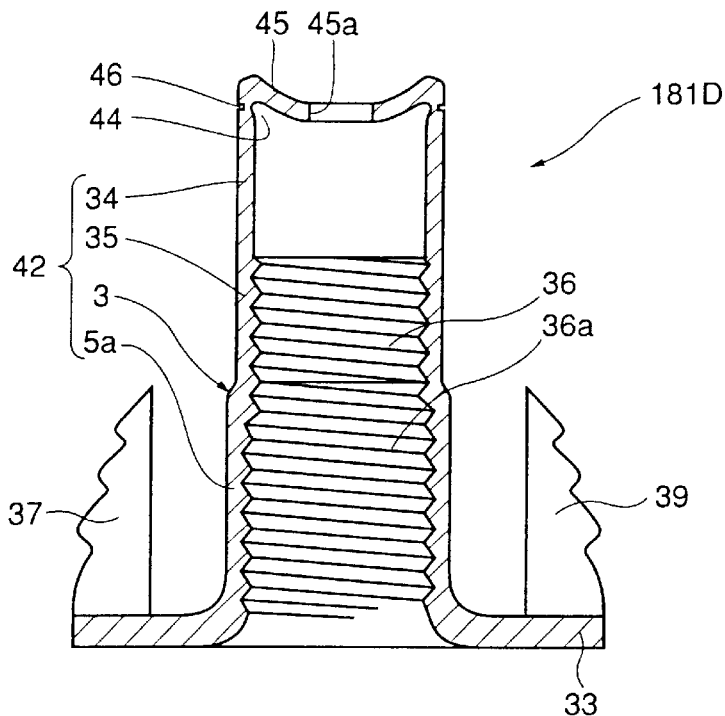
FIG. 50 is a central vertical section of a T nut 181D in accordance with a fourteenth embodiment of the present invention.
Figure 51:
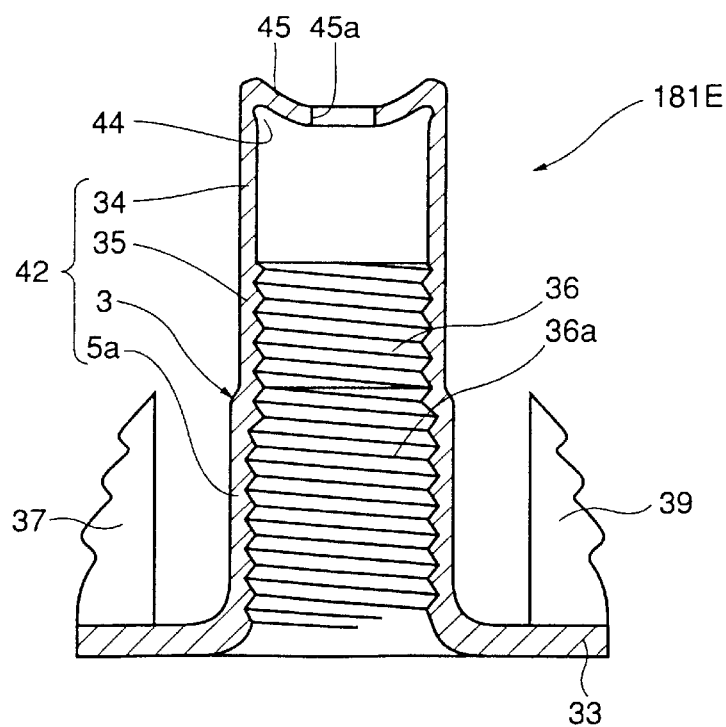
FIG. 51 is a central vertical section of a T nut 181E in accordance with a fourteenth embodiment of the present invention.
Figure 52:
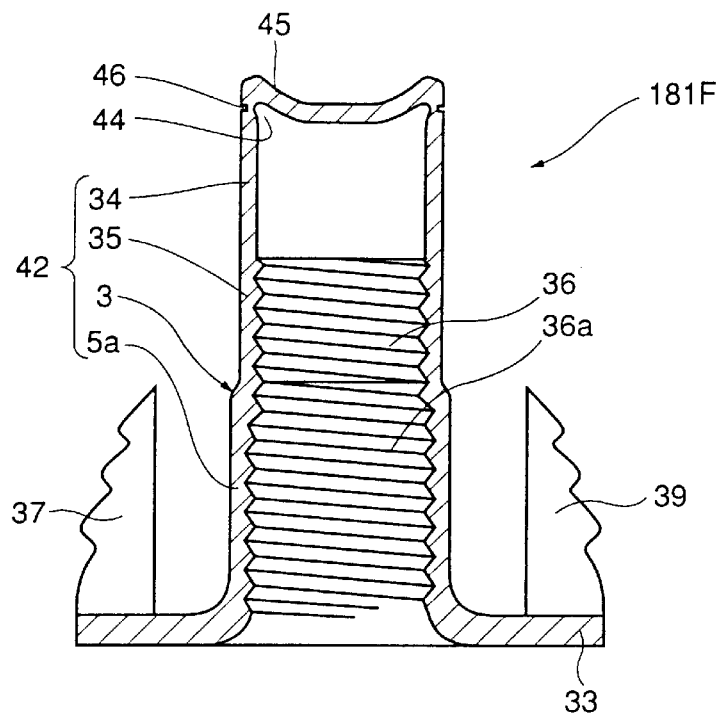
FIG. 52 is a central vertical section of a T nut 181F in accordance with a fourteenth embodiment of the present invention.
Figure 53:
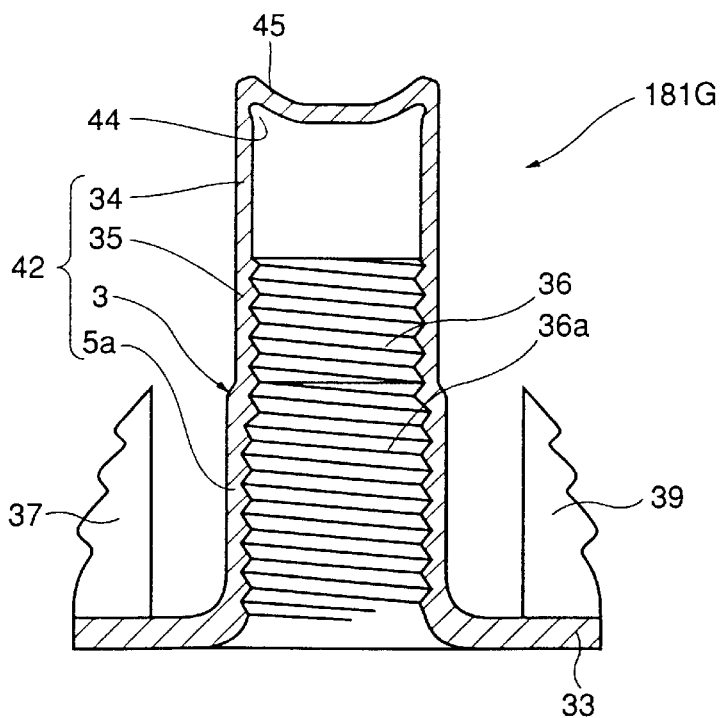
FIG. 53 is a central vertical section of a T nut 181G in accordance with a fourteenth embodiment of the present invention.

FIG. 48 shows a T nut 181B which is a further modification of T nut 181A. T nut 181B is different in that cap portion 45 does not have opening 45a and that flarable portion 34 is not provided with groove 46. Except these points, the structure and function are the same. If recycling is not intended, annular groove 150a is unnecessary.

FIGS. 49 to 53 show T nuts 181C to 181G, as further modifications of T nut 181A. T nut 181C is different from T nut 181A in that female screw 36a is formed additionally on an inner periphery of hollow cylindrical portion 5a on the side of flange 33 and that 150b is not provided. Other structure and function are the same.

T nut 181D is different from T nut 181C in that annular groove 50 is not provided, and other structure and function are the same. T nut 181E is different from T nut 181D in that groove 46 is not provided, and other structure and function are the same.

T nut 181F is different from T nut 181C in that annular groove 50 and opening 45a are not provided, and other structure and function are the same. T nut 181G is different from T nut 181F in that groove 46 is not provided, and other structure and function are the same.

Though T nuts 181A to 181G have approximately octagonal relatively large flanges with pawls provided on the outer periphery of the flange, the flange is not limited to the relatively large sized ones, and pawls may not be provided. Further, circular flange may be used. It is also applicable to a rivet not provided with the female screw.

As to the shape of the connecting region, not only the structure shown in FIGS. 47 to 53 but also the structure shown in FIGS. 5 to 24 and FIG. 29 may be applicable. Driving into the object of fixing is performed in the similar manner as described with reference to FIGS. 25 to 28 and FIGS. 30 to 33.

As to the position and cross sectional shape of annular groove 150a, the structure shown in FIGS. 39 and 40 may be employed.

Fifteenth Embodiment: Modification of T Nut

Figure 54:
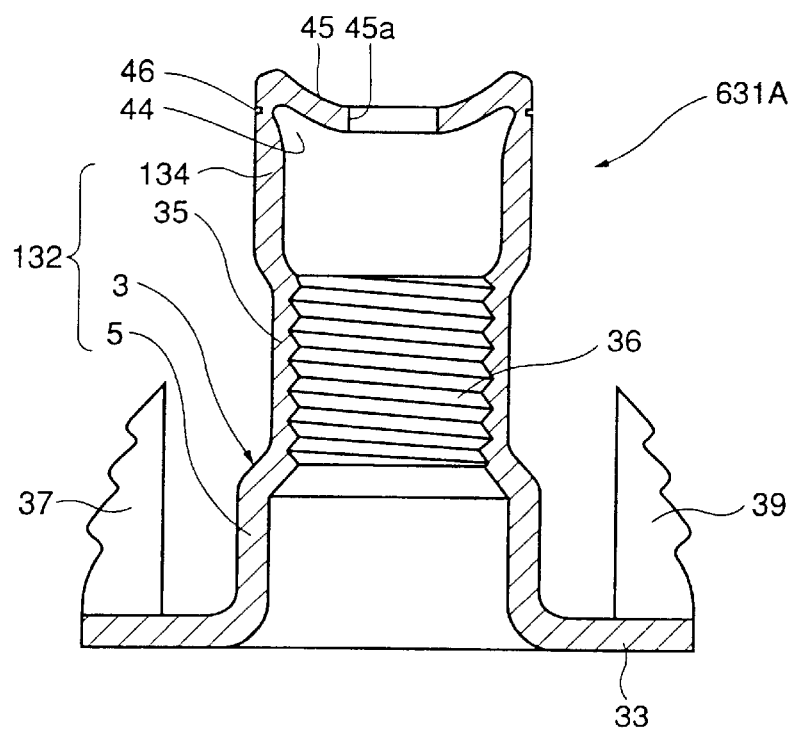
FIG. 54 is a central vertical section of a T nut 631A in accordance with a fifteenth embodiment of the present invention.

The structure of T nut 631A in accordance with the fifteenth embodiment of the present invention will be described with reference to FIG. 54. In the figure, components similar to those of T nut 81A in accordance with the twelfth embodiment will be denoted by the same reference characters and description thereof will not be repeated.

In the present embodiment, the present invention is applied to a T nut described in U.S. Pat. No. 5,618,144. T nut 631A in accordance with the present embodiment is common to the T nuts in accordance with the embodiments described above in that it is a so called rivet type T nut, and most of the structure is similar to that of T nut 81A in accordance with the twelfth embodiment. Therefore, common components will be denoted by the same reference characters as T nut 81A, and detailed description thereof will not be repeated.

T nut 631A in accordance with the present embodiment differs from T nut 81A in that a step 3 having an inner diameter larger than the inner diameter of female screw forming portion 35 and an outer diameter larger than the outer diameter of female screw forming portion 35 is provided on the side of flange 33 of shaft 132.

Figure 55:
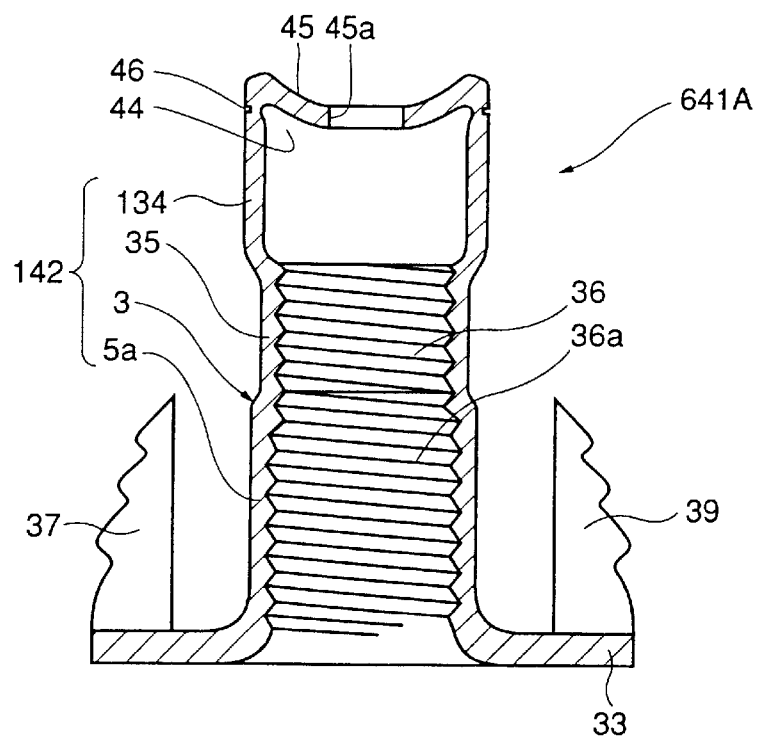
FIG. 55 is a central vertical section of a T nut 641A in accordance with a modification of the fifteenth embodiment of the present invention.

As can be seen from FIG. 55, the present embodiment is also applicable to a T nut 641A in which female screw 36a is formed additionally on the inner periphery of hollow cylindrical portion 5a on the side of the flange, except for the flarable portion 134 of shaft portion 142.

Further, a portion continuous to flange portion 33 at a lower end of the inner periphery of hollow cylindrical portion 5a on the side of the proximal end of T nut 641A shown in FIG. 55 may be made approximately right angle, and the female screw may be formed up to the lower end of the inner periphery of hollow cylindrical portion 5a on the side of the proximal end.

Figure 56:
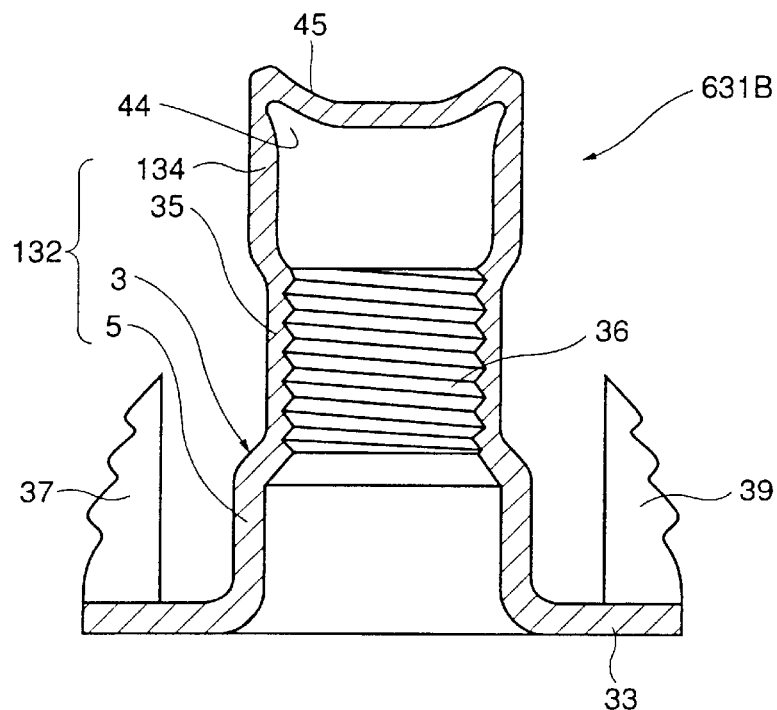
FIG. 56 is a central vertical section of a T nut 631B in accordance with a modification of the fifteenth embodiment of the present invention.
Figure 57:
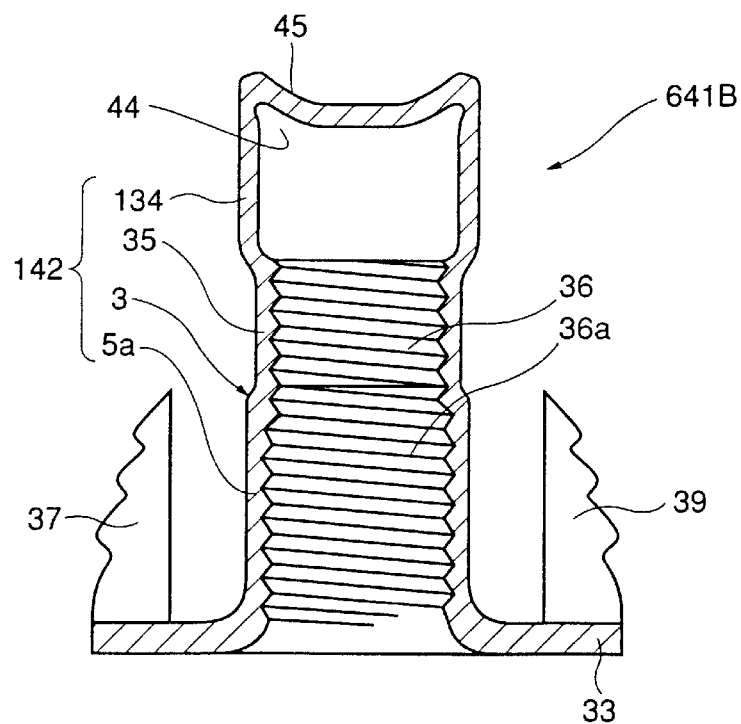
FIG. 57 is a central vertical section of a T nut 641B in accordance with a modification of the fifteenth embodiment of the present invention.

FIGS. 56 and 57 show T nuts 631B and 641B as modifications of T nuts 631A and 641A. T nuts 631B and 641B are different in that cap portion 45 does not have opening 45a and that flarable portion 34 is not provided with groove 46, and other structure and function are the same.

Though T nuts 631A, 641A, 631B and 641B have approximately octagonal relatively large flanges with pawls provided on the outer periphery of the flange, the flange is not limited to the relatively large sized ones, and pawls may not be provided. Further, circular flange may be used.

As to the shape of the connecting region, not only the structure shown in FIGS. 54 to 57 but also the structure shown in FIGS. 5 to 24 and FIG. 29 may be applicable. Driving into the object of fixing is performed in the similar manner as described with reference to FIGS. 25 to 28 and FIGS. 30 to 33.

As to the position and cross sectional shape of annular groove 150a, the structure shown in FIGS. 39 and 40 may be employed.

Sixteenth Embodiment: Modification of T Nut

Examples of T nuts or rivets having an approximately octagonal or circular relatively large flange with pawls provided on the outer periphery of the flange have been described in the embodiments above. The flange is not limited to the relatively large ones, and pawls may not be provided.

Figure 58A:
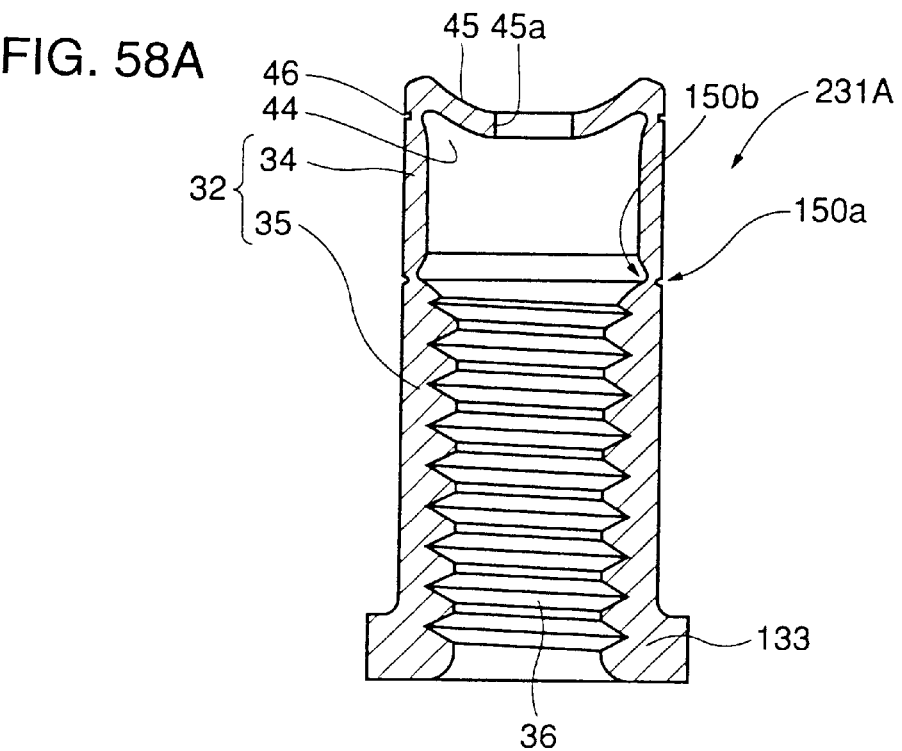
FIG. 58A is a central vertical section of a T nut 231A in accordance with a sixteenth embodiment of the present invention.
Figure 58B:
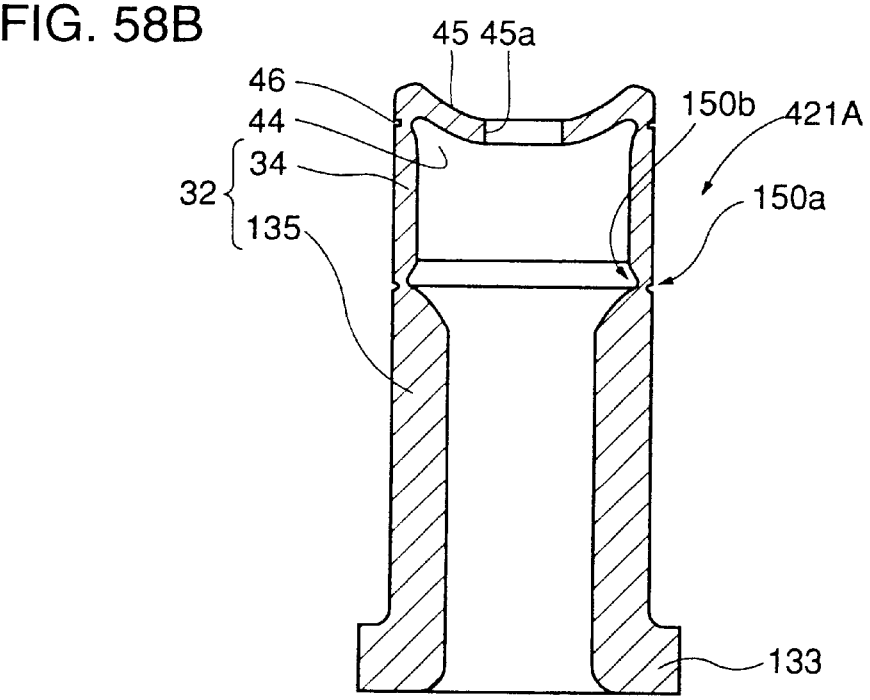
FIG. 58B is a central vertical section of a rivet 421A in accordance with the sixteenth embodiment of the present invention.

More specifically, the concept similar to each of the above described embodiments is applicable to a structure having a relatively small flange 133 with outer diameter slightly larger than shaft portion 32, such as T nut 231A shown in FIG. 58A or a rivet 421A shown in FIG. 58B. In FIGS. 58A and 58B, components common to T nut 101A or rivet 111A shown in FIGS. 39A and 39B are denoted by the same reference characters and detailed description thereof is not repeated.

Figure 59A:
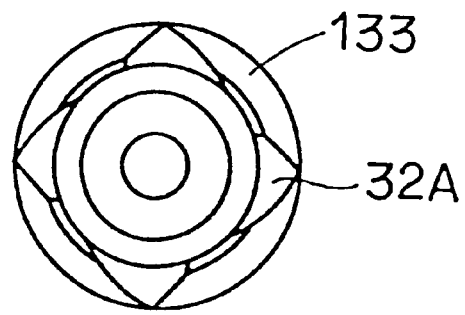
FIG. 59A is a plan view representing a modification of the sixteenth embodiment of the present invention.
Figure 59B:
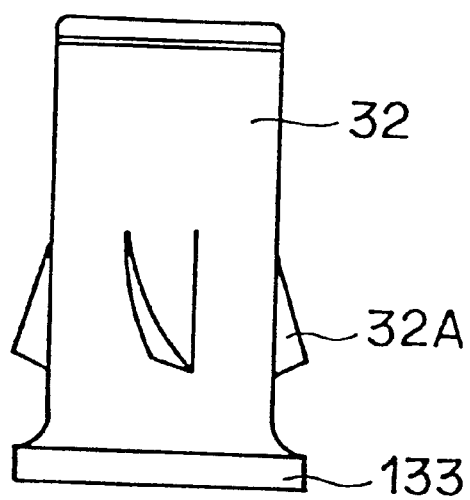
FIG. 59B is a side view representing the modification of the sixteenth embodiment of the present invention.

As a rotation stopper of T nut 231A and rivet 421A, a screw member 32A as a protruding portion extending outward from the outer peripheral surface of shaft 32 may be provided, as shown in FIGS. 59A and 59B. Any shape may be employed provided that the function and effect of a rotation stopper are attained, other than screw member 32A.

Figure 60A:
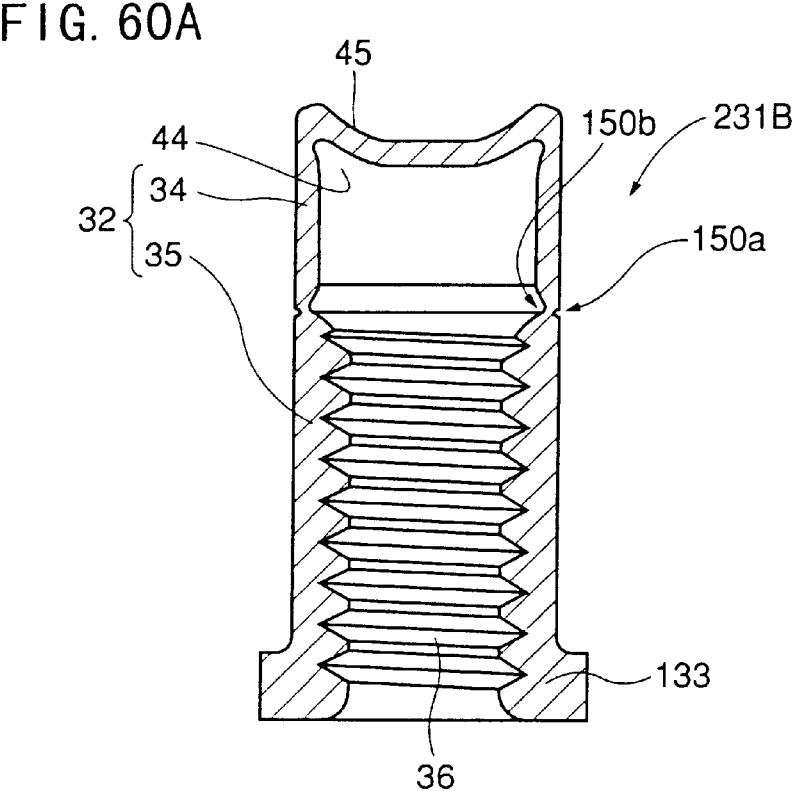
FIG. 60A is a central vertical section of a T nut 231B in accordance with a modification of the sixteenth embodiment of the present invention.
Figure 60B:
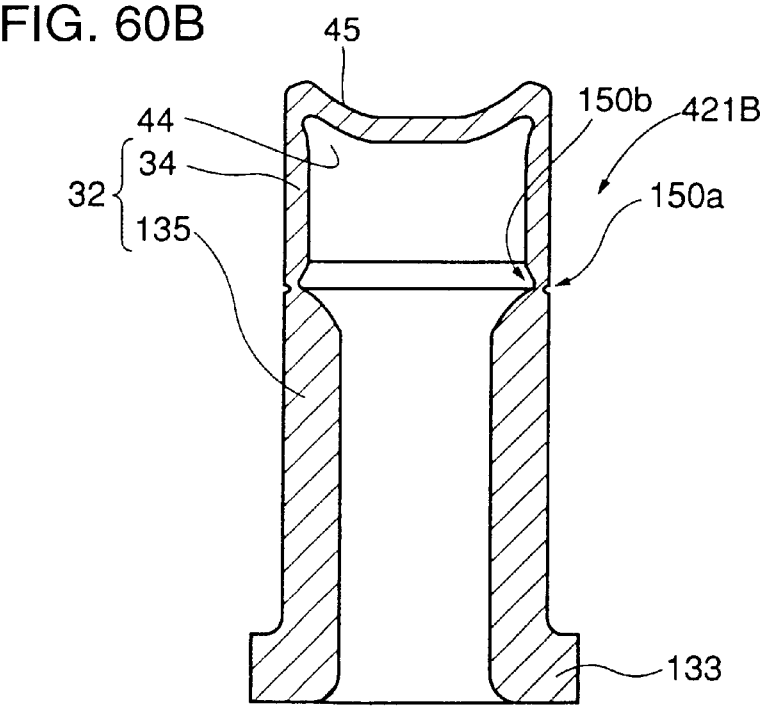
FIG. 60B is a central vertical section of a rivet 421B in accordance with a modification of the sixteenth embodiment of the present invention.

FIGS. 60A and 60B show T nut 231B and rivet 421B which are further modifications of T nut 231A and rivet 421A. T nut 231B and rivet 421B are different in that cap portion 44 does not have opening 45a and that flarable portion 34 is not provided with groove 46. Except these points, the structure and function are the same. If recycle is not intended, annular groove 150a is unnecessary.

Figure 61A:
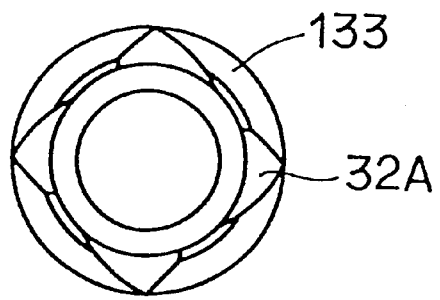
FIG. 61A is a plan view representing a modification of the sixteenth embodiment of the present invention.
Figure 61B:
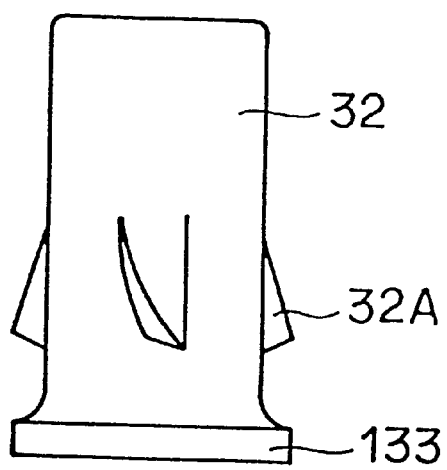
FIG. 61B is a side view representing the modification of the sixteenth embodiment of the present invention.

As a rotation stopper of T nut 231B and rivet 421B, a screw member 32A as a protruding portion extending outward from the outer peripheral surface of shaft 32 may be provided, as shown in FIGS. 61A and 61B. Any shape may be employed provided that the function and effect of a rotation stopper are attained, other than screw member 32A.

Figure 62A:
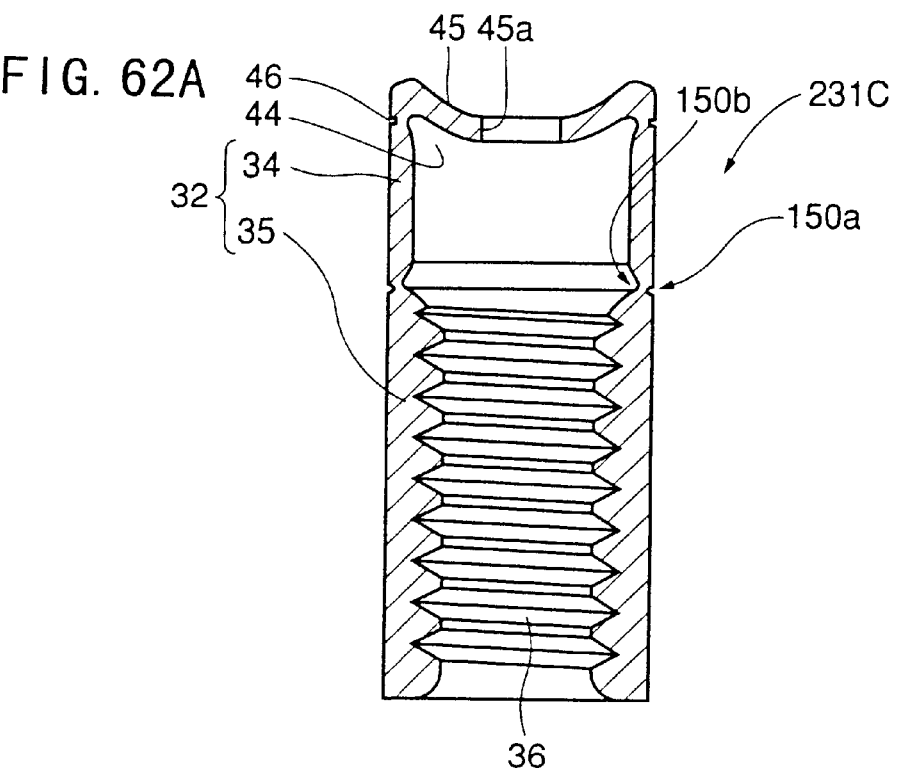
FIG. 62A is a central vertical section of a T nut 231C in accordance with a modification of the sixteenth embodiment of the present invention.
Figure 62B:
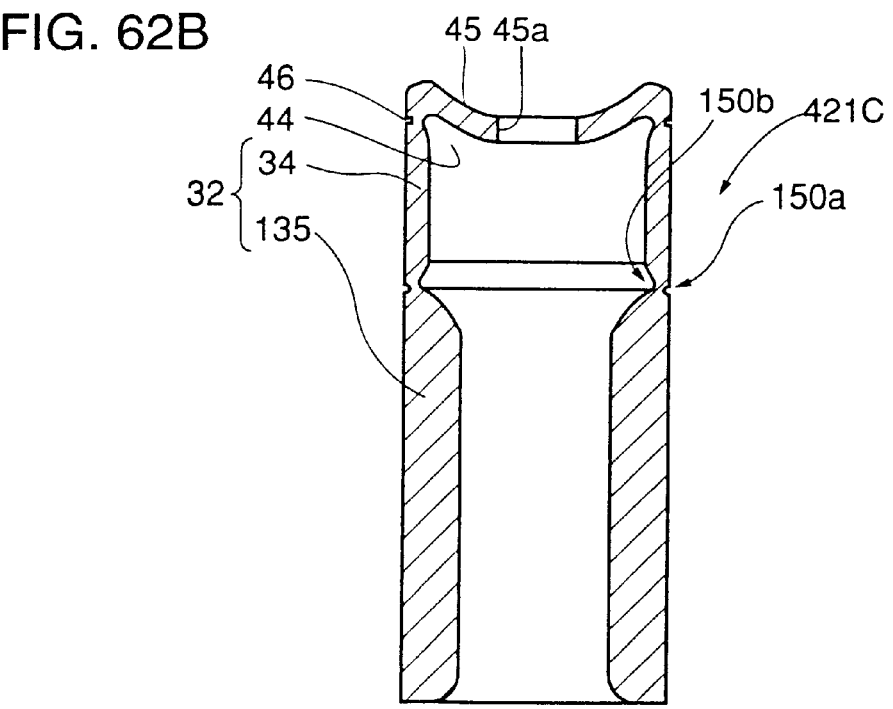
FIG. 62B is a central vertical section of a rivet 421C in accordance with a modification of the sixteenth embodiment of the present invention.

FIGS. 62A and 62B show T nut 231C and rivet 421C as further modifications of T nut 231A and rivet 421A. T nut 231C and rivet 421C are different in that flange 133 is not provided, and other structure and function are the same. When recycle is not intended, annular groove 150a is unnecessary.

Figure 63A:
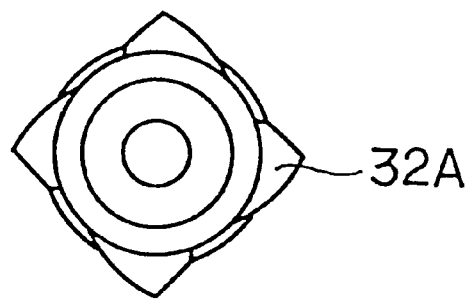
FIG. 63A is a plan view representing a modification of the sixteenth embodiment of the present invention.
Figure 63B:
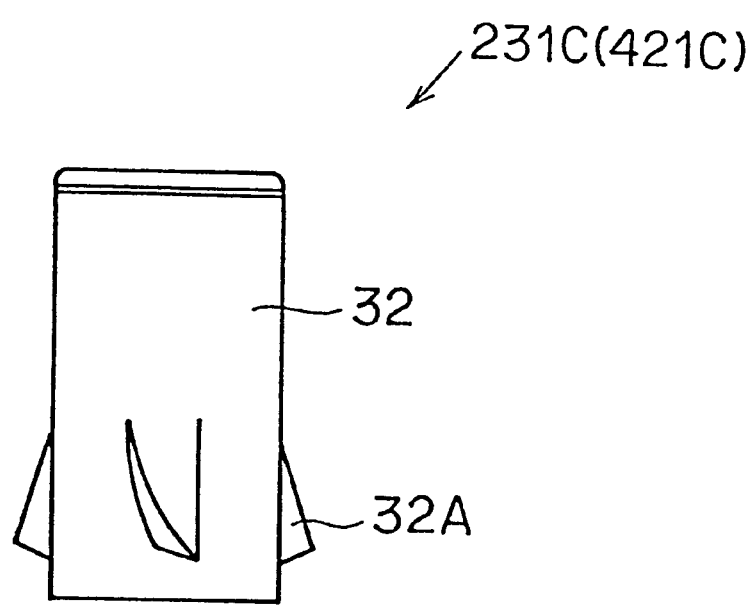
FIG. 63B is a side view representing the modification of the sixteenth embodiment of the present invention.

As a rotation stopper of T nut 231C and rivet 421C, a screw member 32A as a protruding portion extending outward from the outer peripheral surface of shaft 32 may be provided, as shown in FIGS. 63A and 63B. Any shape may be employed provided that the function and effect of a rotation stopper are attained, other than screw member 32A.

Figure 64A:
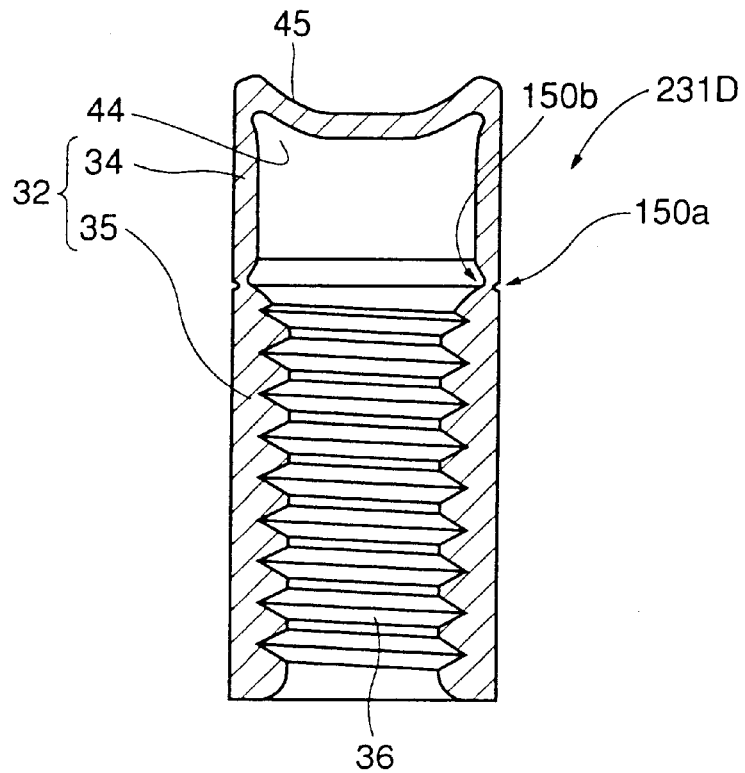
FIG. 64A is a central vertical section of a T nut 231D in accordance with a modification of the sixteenth embodiment of the present invention.
Figure 64B:
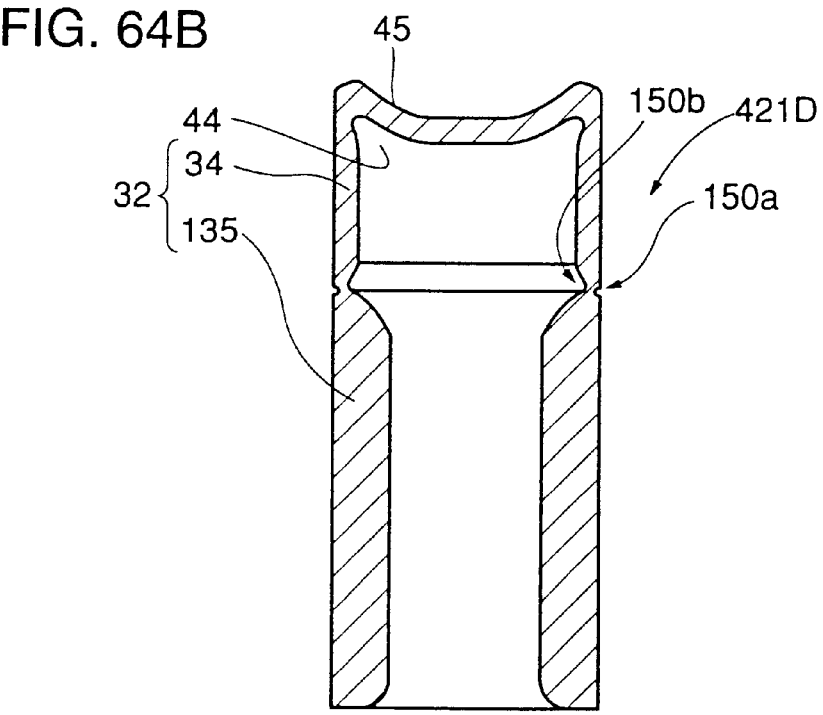
FIG. 64B is a central vertical section of a rivet 421D in accordance with the sixteenth embodiment of the present invention.

FIGS. 64A and 64B show T nut 231D and rivet 421D which are further modifications of T nut 231C and rivet 421C. T nut 231D and rivet 421D are different in that cap portion 45 does not have opening 45a and that flarable portion 34 is not provided with groove 46. Except these points, the structure and function are the same. If recycling is not intended, annular groove 150a is unnecessary.

Figure 65A:
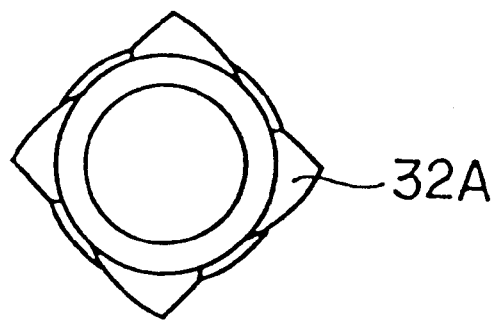
FIG. 65A is a plan view representing a modification of the sixteenth embodiment of the present invention.
Figure 65B:
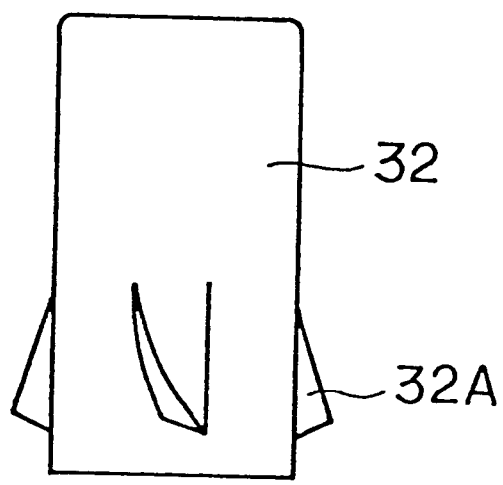
FIG. 65B is a side view representing a modification of the sixteenth embodiment of the present invention.

As a rotation stopper of T nut 231D and rivet 421D, a screw member 32A as a protruding portion extending outward from the outer peripheral surface of shaft 32 may be provided, as shown in FIGS. 65A and 65B. Any shape may be employed provided that the function and effect of a rotation stopper are attained, other than screw member 32A.

As to the shape of the connecting region, not only the structure shown in FIGS. 58 to 65 but also the structure shown in FIGS. 5 to 24 and FIG. 29 may be applicable. Driving into the object of fixing is performed in the similar manner as described with reference to FIGS. 25 to 28 and FIGS. 30 to 33.

As to the position and cross sectional shape of annular groove 150a, the structure shown in FIGS. 39 and 40 may be employed.

Seventeenth Embodiment: Modification of T Nut

Figure 66A:
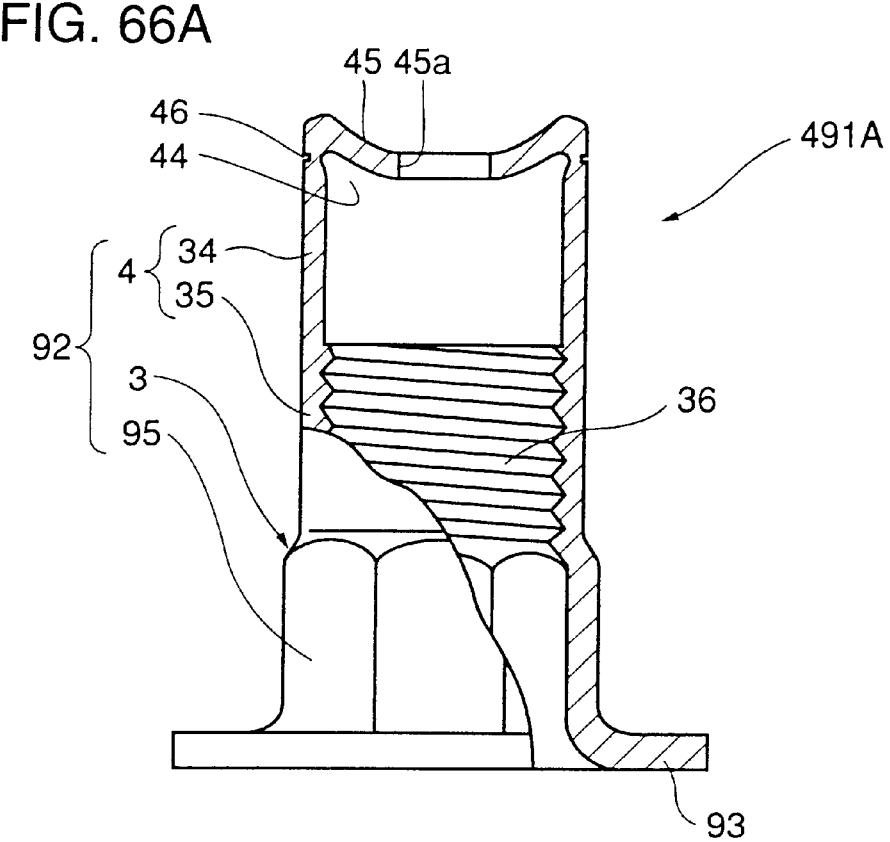
FIG. 66A is a central vertical section of a T nut 491A in accordance with a seventeenth embodiment of the present invention.
Figure 66B:
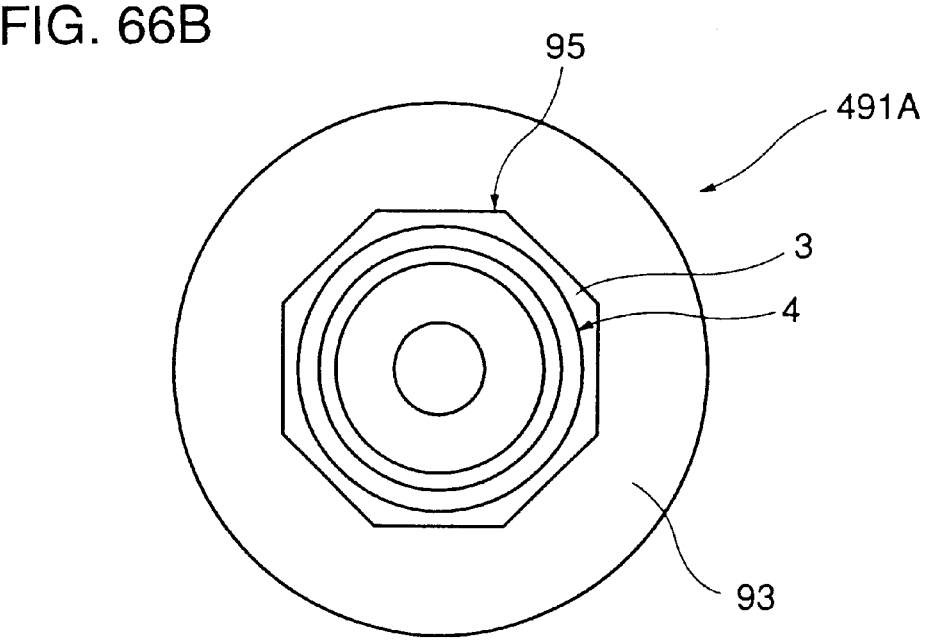
FIG. 66B is a plan view thereof.

T nut 491A in accordance with the seventeenth embodiment of the present invention will be described with reference to FIGS. 66A and 66B. T nut 491A of the present embodiment has a common shaft portion as T nut 181A in accordance with the fourteenth embodiment described above in that shaft portion 92 has a stepped portion 3, and a flarable portion 34 and female screw forming portion 35 at the hollow cylindrical portion 4 at the tip end side. T nut 491A differs from T nut 181A in that the enlarged cylindrical portion 95 on the proximal end on the side of flange portion from stepped portion 3 does not have a hollow cylindrical shape but an approximately regular octagonal shape viewed from the axial direction, and that flange 93 has a disk shape.

When T nut 491A having such a structure is driven into a through hole of plate material having approximately the same diameter as the hollow cylindrical portion 4 at the tip end side and press fit so that the enlarged cylindrical portion 95 on the proximal end of approximately regular octagonal shape bites the plate material, the enlarged cylindrical portion functions as the rotation stopper. As a result, though flange portion 93 has a flat disk shape without pawls, it does not cause rotation when fixed on the plate member and attains secure fixing.

Figure 69A:
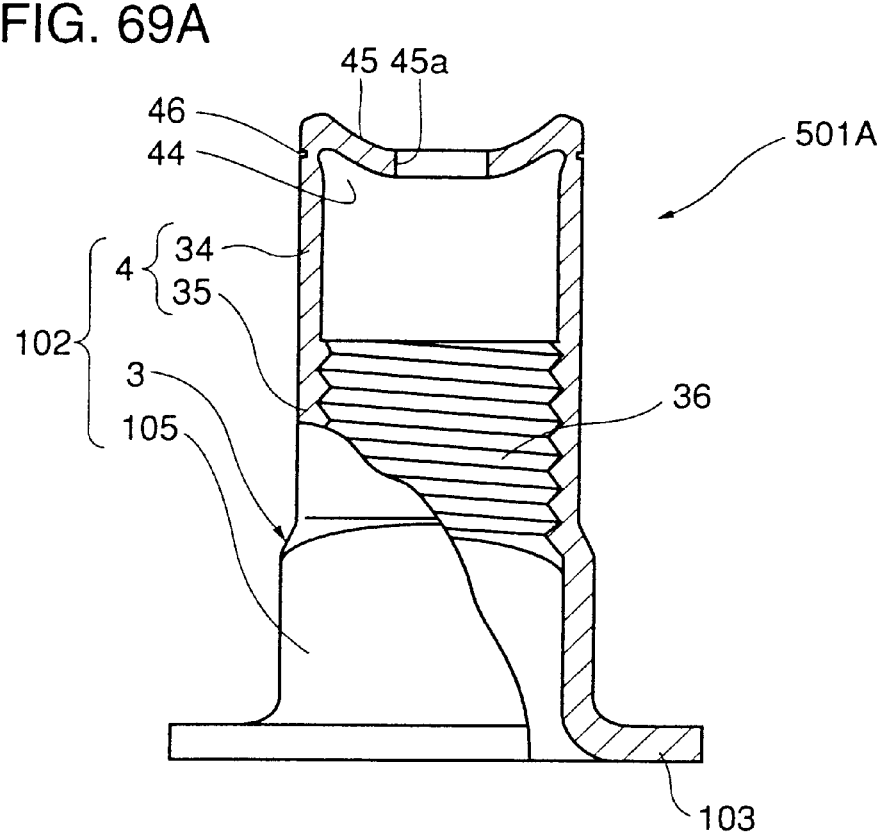
FIG. 69A is a central vertical section of a T nut 501A in accordance with a modification of the seventeenth embodiment of the present invention.
Figure 69B:
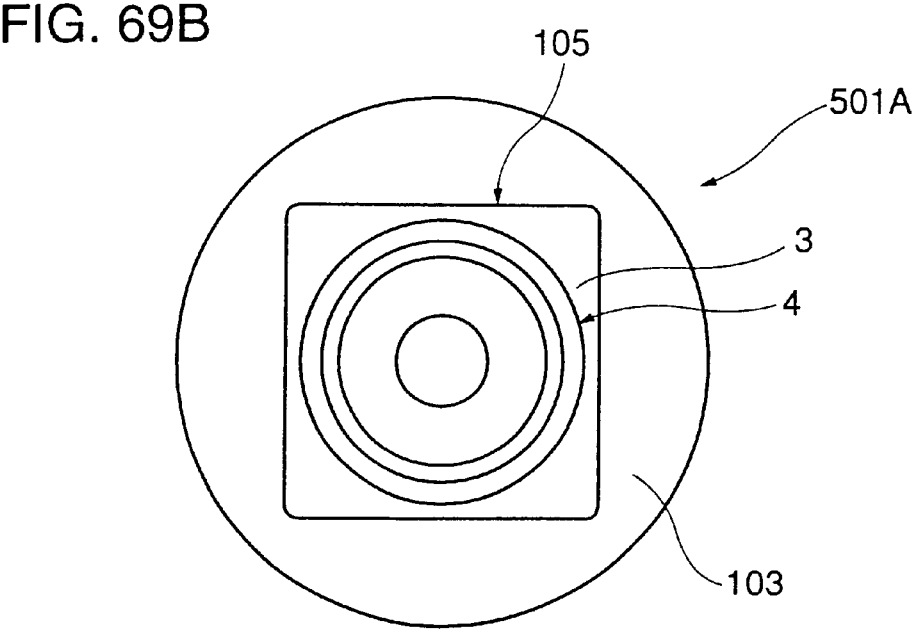
FIG. 69B is a plan view thereof.

Though the enlarged cylindrical portion 95 of the proximal end is formed to have approximately regular octagonal shape when viewed from the axial direction, the shape is not limited thereto. For example, as in a T nut 501A shown in FIGS. 69A and 69B, shaft portion 102 may have an enlarged cylindrical portion 105 on the proximal end which is formed to be approximately square when viewed from the axial direction. Further, as the shape of enlarged cylindrical portion 105 of the proximal end viewed from the axial direction, other polygonal shape such as a hexagon may be selected.

In the T nut of the present embodiment, stepped portion 3 is provided over the entire outer periphery of shaft portion 102, when the enlarged cylindrical portion of the proximal end is provided as a rotation stopper in the state of use as in the present embodiment, it is not always necessary to provide the stepped portion over the entire outer periphery of shaft portion 102. More specifically, the function of rotation stopper at the time of use can be attained so long as the stepped portion is provided at least partially at the outer periphery of the enlarged cylindrical portion on the proximal end closer to the side of the flange than the stepped portion and that portion is larger than the cylindrical portion of the tip end side. side, as described in the embodiments above.

Figure 67A:
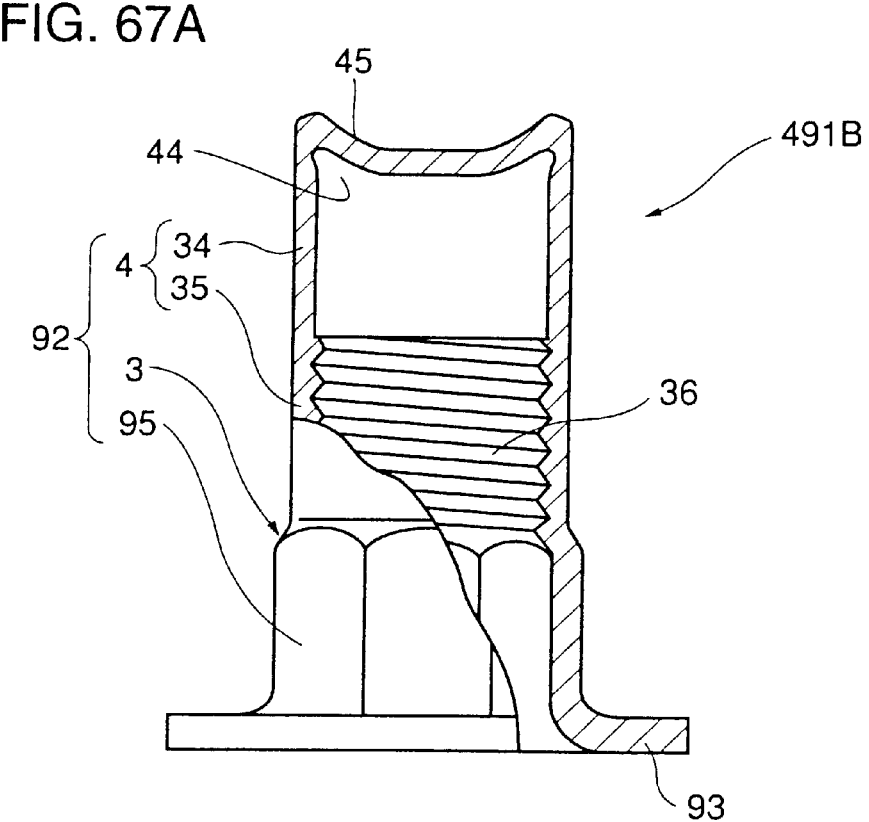
FIG. 67A is a central vertical section of a T nut 491B in accordance with a modification of the seventeenth embodiment of the present invention.
Figure 67B:
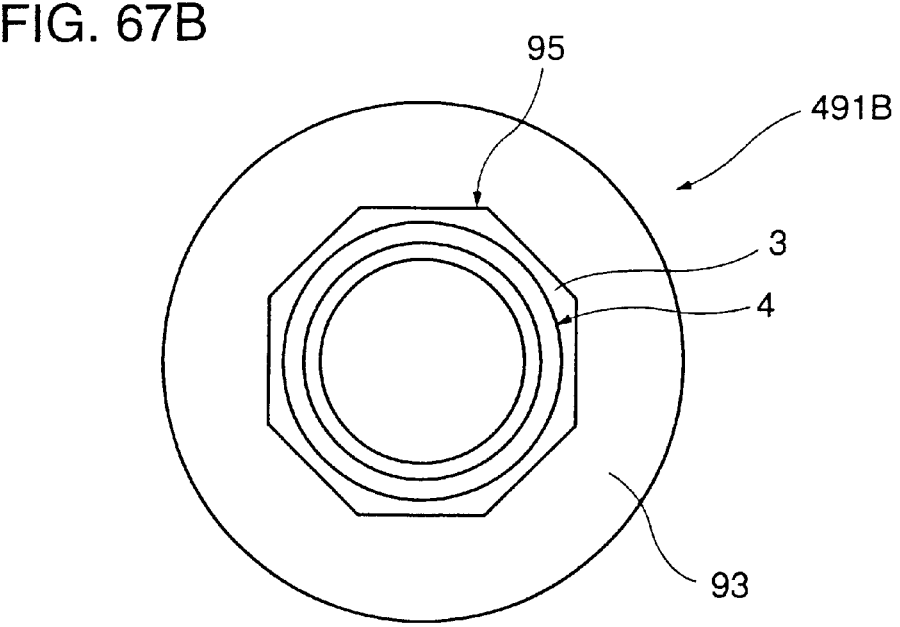
FIG. 67B is a plan view thereof.
Figure 70A:
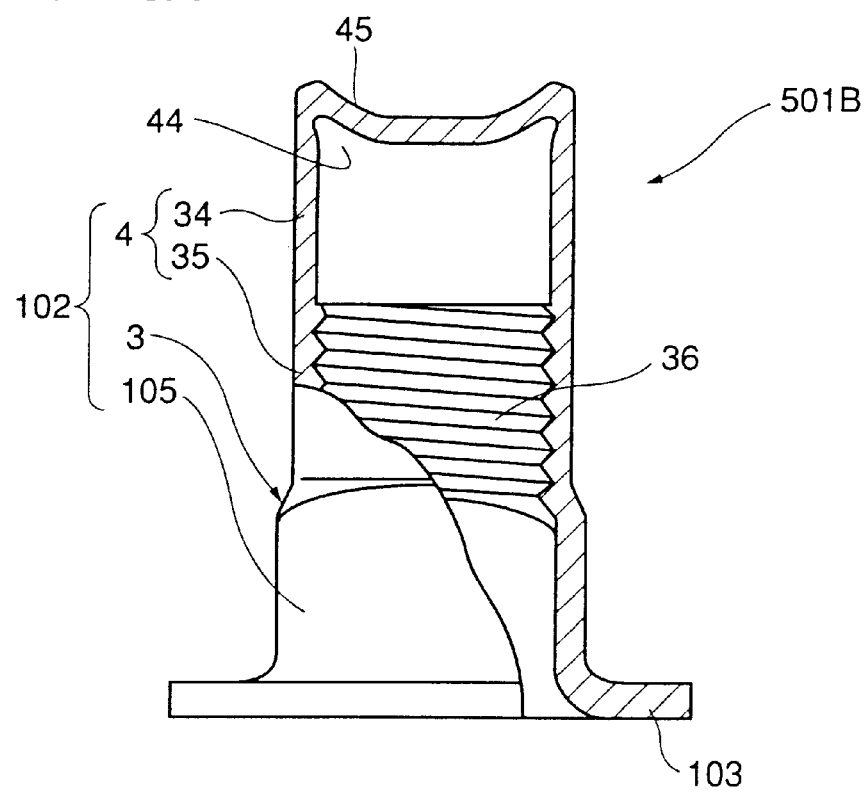
FIG. 70A is a central vertical section of a T nut 501B in accordance with a modification of the seventeenth embodiment of the present invention.
Figure 70B:
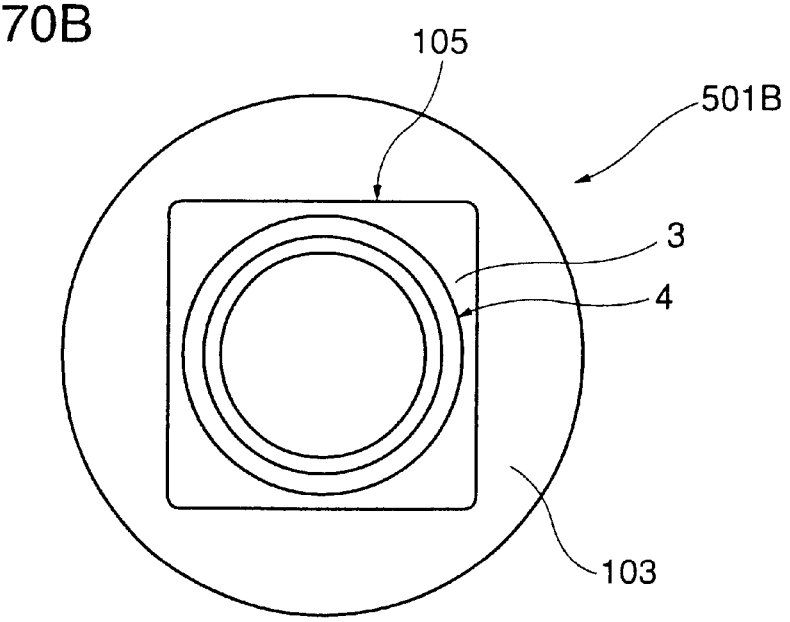
FIG. 70B is a plan view thereof.

FIGS. 67 and 70 show T nuts 491B and 501B, respectively, which are further modifications of T nuts 491A and 501A. T nuts 491B and 501B are different in that cap portion 45 does not have opening 45a and that flarable portion 34 is not provided with groove 46. Except these points, the structure and function are the same. If recycling is intended, an annular groove may be provided at the hollow cylindrical portion 4 on the tip end side, as described in the embodiments above.

Figure 68A:
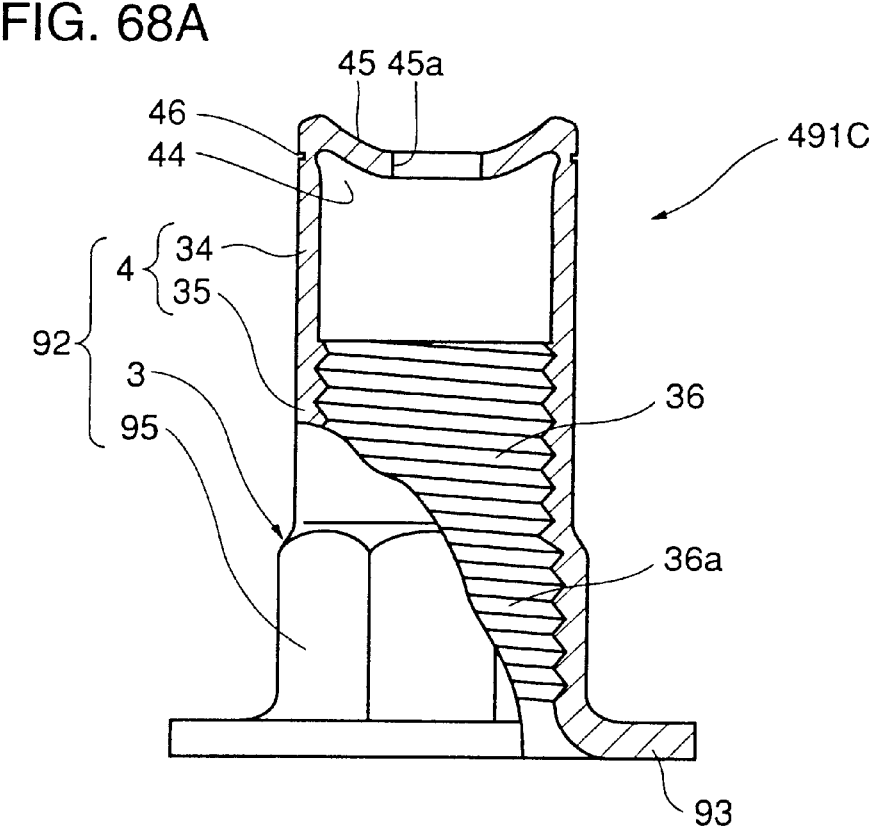
FIG. 68A is a central vertical section of a T nut 491C in accordance with a modification of the seventeenth embodiment of the present invention.
Figure 68B:
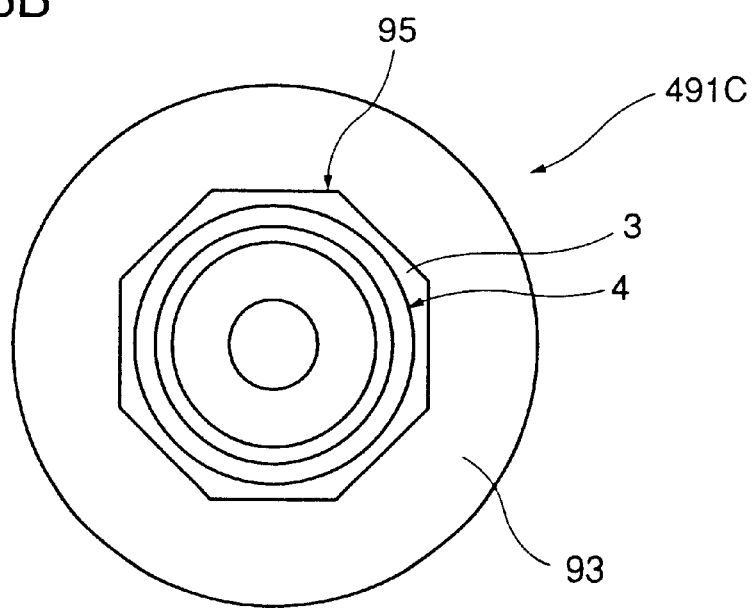
FIG. 68B is a plan view thereof.
Figure 71A:
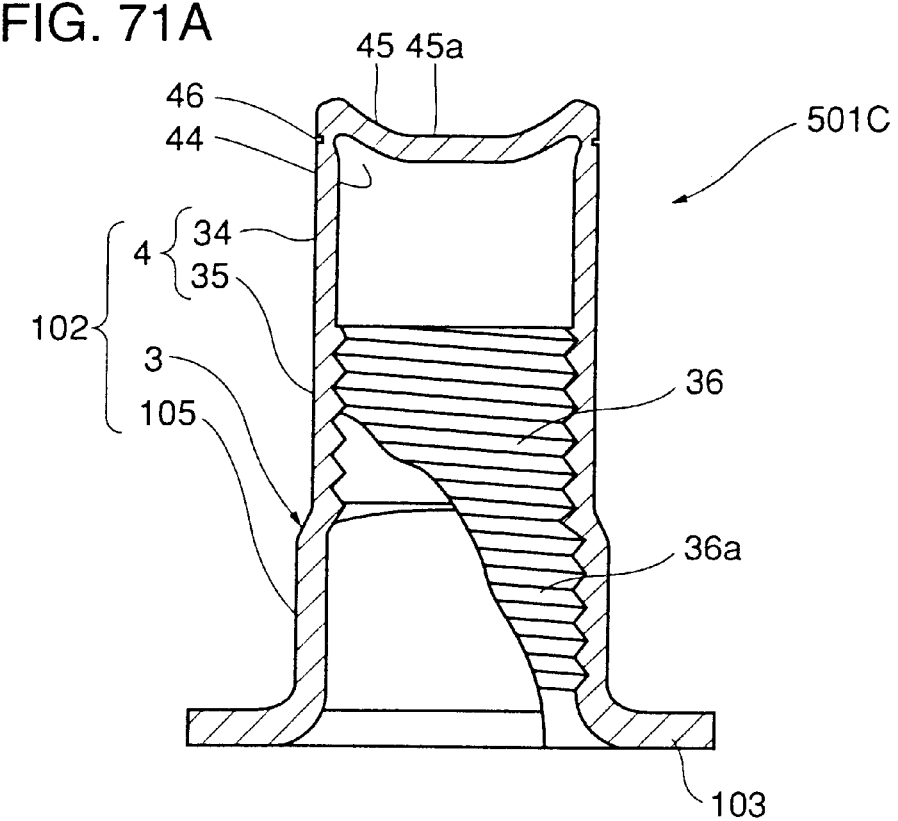
FIG. 71A is a central vertical section of a T nut 501C in accordance with a modification of the seventeenth embodiment of the present invention.
Figure 71B:
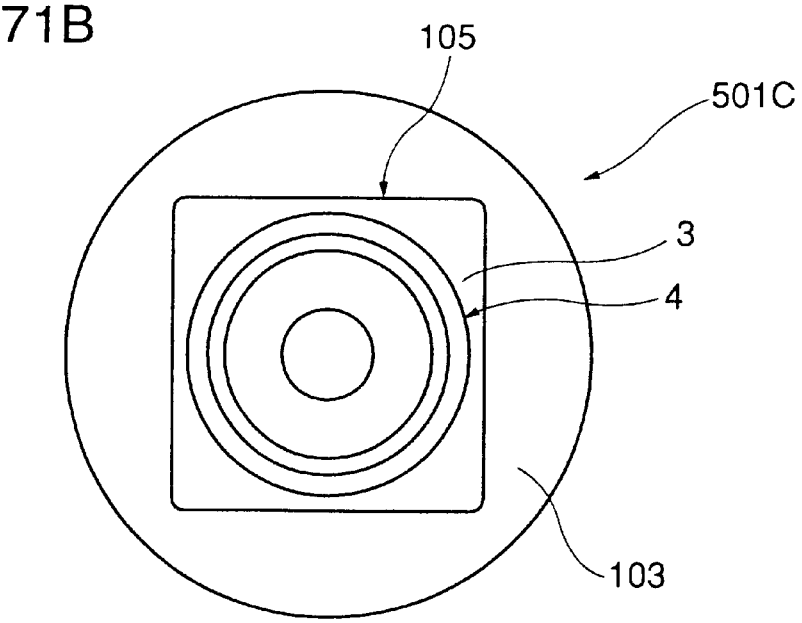
FIG. 71B is a plan view thereof.

FIG. 68 shows T nut 491C and FIG. 71 shows a T nut 501C, as further modifications of T nuts 491A and 501A. T nuts 491C and 501C are different in that female screw 36a is formed additionally on the inner surface of enlarged cylindrical portion 105 on the proximal end side, and other structure and function are the same. The shape of the enlarged cylindrical portion on the side of the proximal end may be arbitrarily selected as needed. If recycling is intended, an annular groove may be provided on the hollow cylindrical portion 4 at the tip end side, as described in the embodiments above.

As to the shape of the connecting region, not only the structure shown in FIGS. 66 to 71 but also the structure shown in FIGS. 5 to 24 and FIG. 29 may be applicable. Driving into the object of fixing is performed in the similar manner as described with reference to FIGS. 25 to 28 and FIGS. 30 to 33.

Eighteenth Embodiment: Modification of T Nut

Figure 72A:
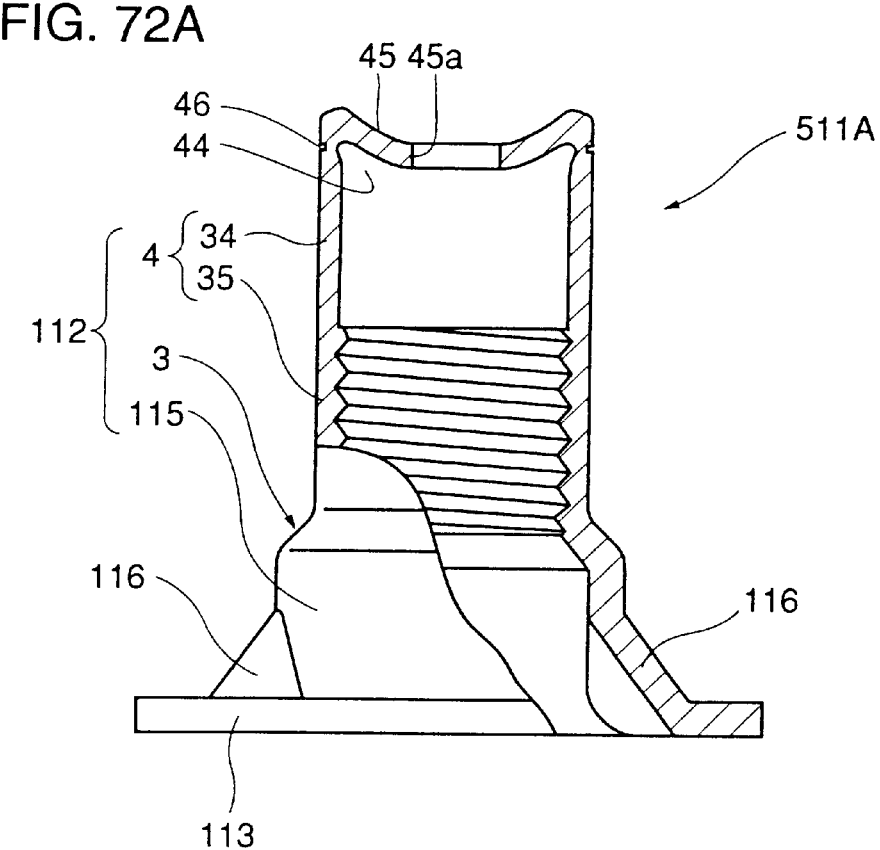
FIG. 72A is a central vertical section of a T nut 511A in accordance with an eighteenth embodiment of the present invention.
Figure 72B:
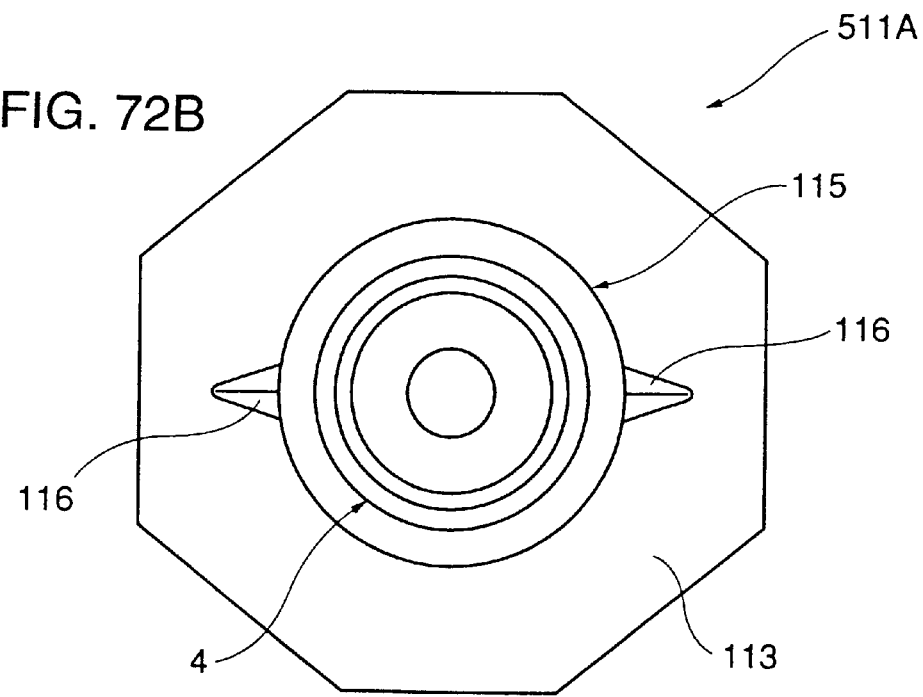
FIG. 72B is a plan view thereof.

T nut 511A in accordance with the eighteenth embodiment of the present invention will be described with reference to FIGS. 72A and 72B. T nut 511A in accordance with the present embodiment has a stepped portion 3 at shaft portion 112, and flarable portion 34 and female screw forming portion 35 at the hollow cylindrical portion 4 at the tip end side. In the vicinity of an interface between the outer periphery of enlarged cylindrical portion 115 on the proximal side and flange portion 113 on the side of flange portion 113 from stepped portion 3, a pair of approximately triangular projections 116 are formed at positions opposing to each other at 180°. Projections 116 are formed integral with flange portion 113 and enlarged cylindrical portion 115 on the proximal side, and bite the plate material when the nut is driven into the plate material, so that the projections attain the function of rotation stopper of T nut 511A. Though two projections 116 are provided in T nut 111A of the present embodiment, the number may be arbitrarily increased as needed, so as to reinforce the function of the rotation stopper.

Figure 74A:
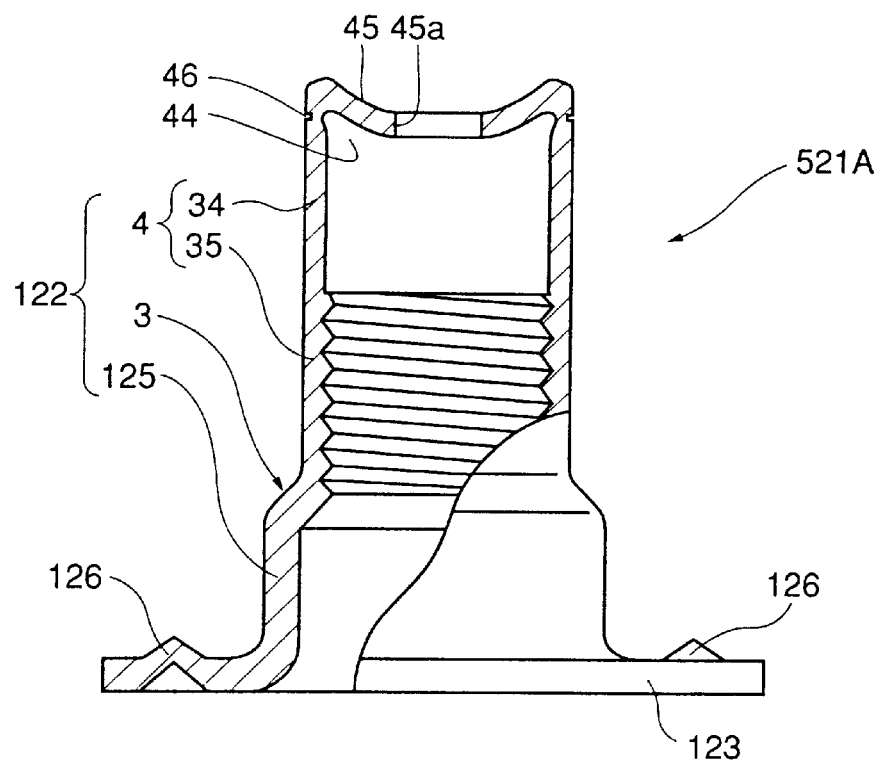
FIG. 74A is a central vertical section of a T nut 521A in accordance with a modification of the eighteenth embodiment of the present invention.
Figure 74B:
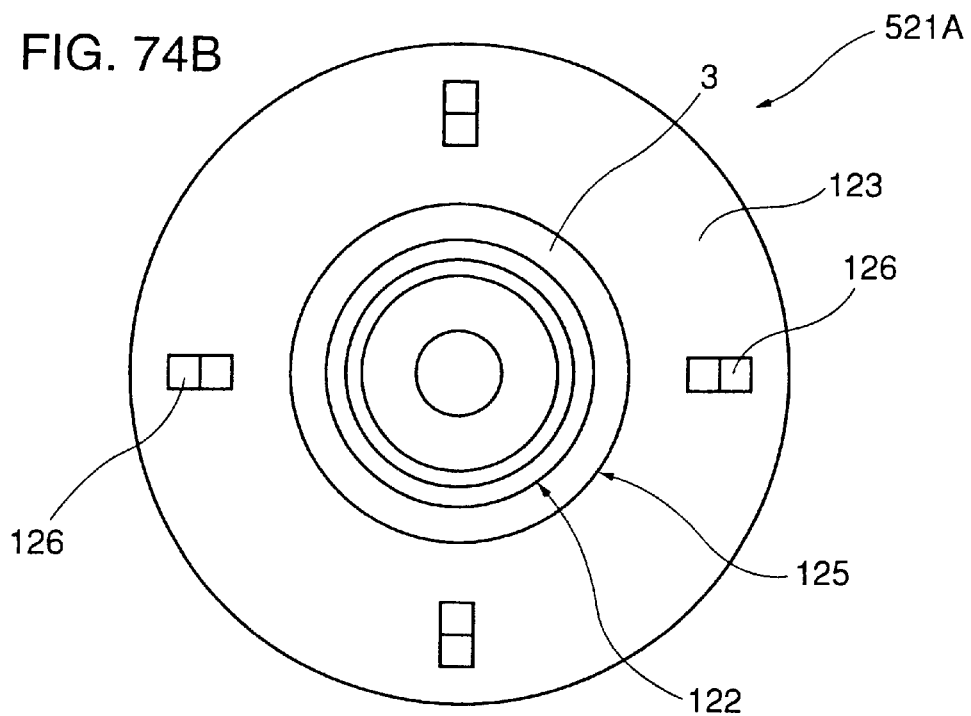
FIG. 74B is a plan view thereof.

The function of rotation stopper similar to that attained by projections 116 of T nut 511A can also be attained by a T nut 521A shown in FIGS. 74A and 74B. In this T nut, the enlarged cylindrical portion 125 on the proximal end has a hollow cylindrical shape similar to T nut 181A, and projections 126 are each provided by lifting a portion formed by parallel two cuttings in disk shaped flange portion 123 formed integral with flange portion 123, in place of the projections 116 of T nut 511A. In T nut 521A, there are four projections 126 at uniform intervals on flange portion 123. The number and position of projections 126 may be appropriately changed as needed.

Figure 73A:
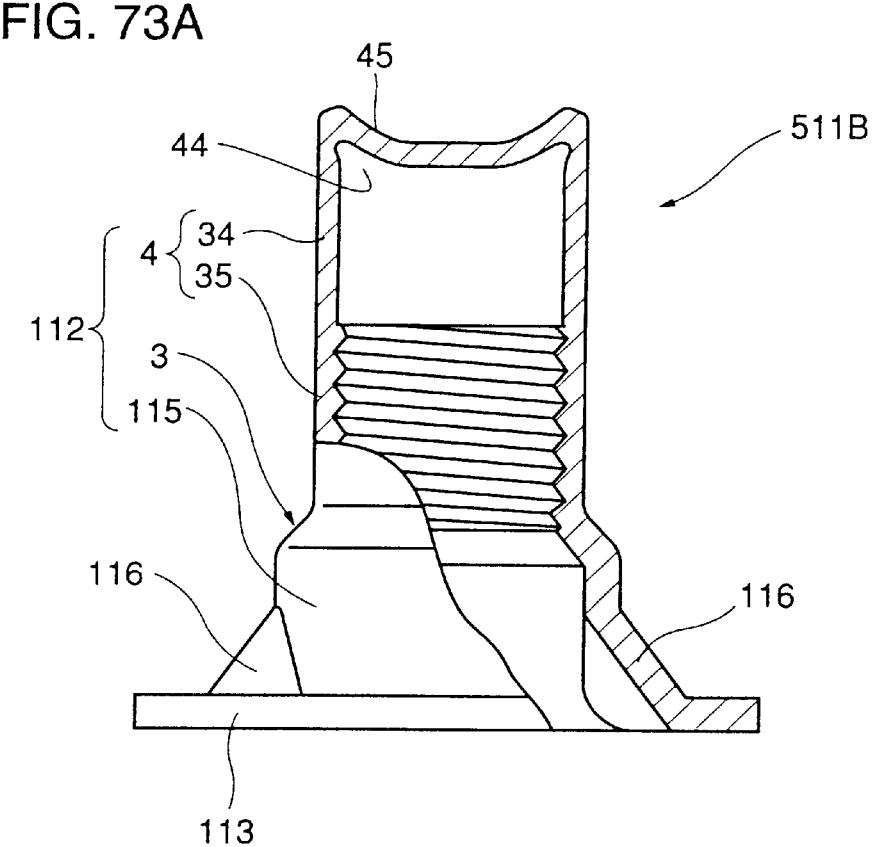
FIG. 73A is a central vertical section of a T nut 511B in accordance with a modification of the eighteenth embodiment of the present invention.
Figure 73B:
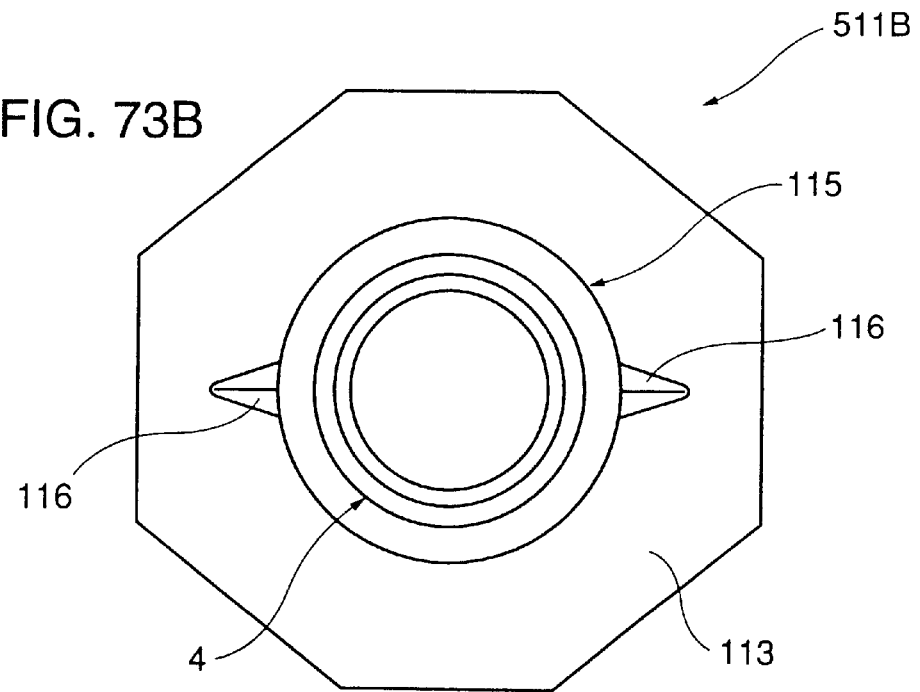
FIG. 73B is a plan view thereof.
Figure 75A:
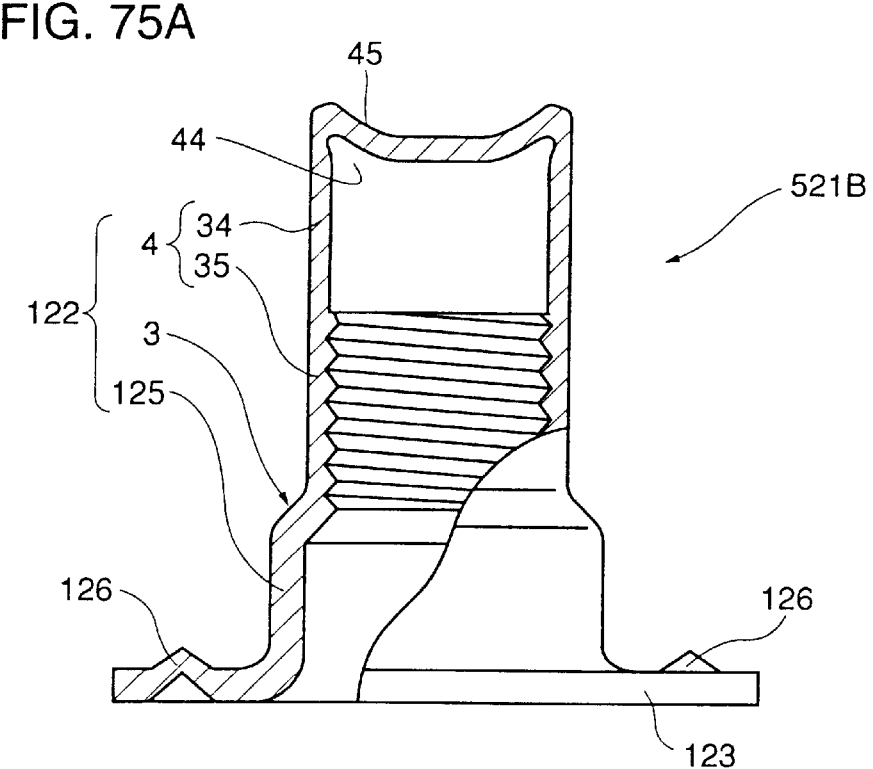
FIG. 75A is a central vertical section of a T nut 521B in accordance with a modification of the eighteenth embodiment of the present invention.
Figure 75B:
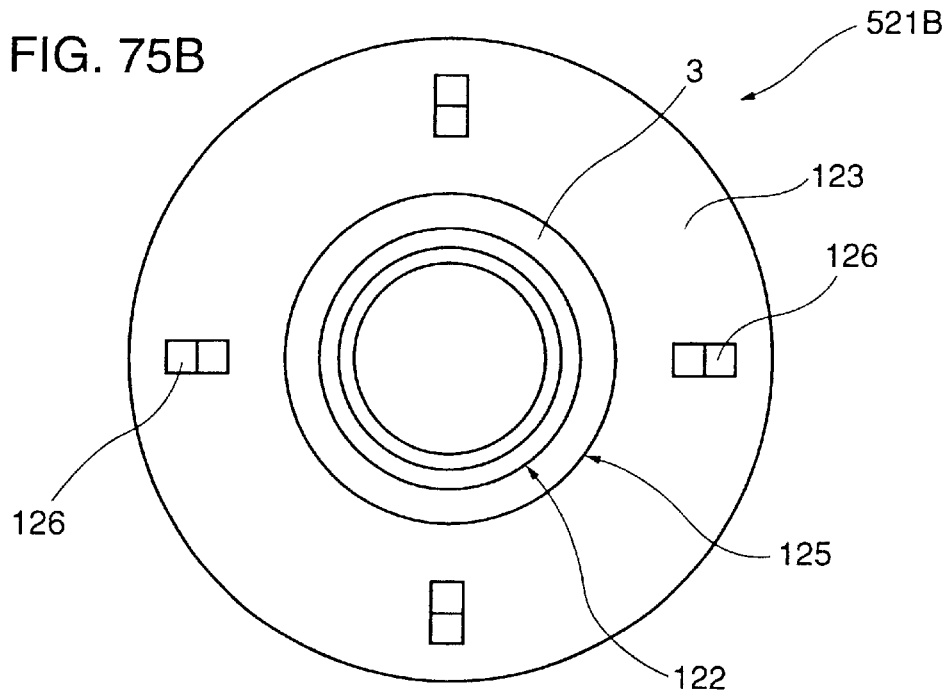
FIG. 75B is a plan view thereof

FIGS. 73 and 75 show T nuts 511B and 521B, respectively, which are further modifications of T nuts 511A and 521A. T nuts 511B and 521B are different in that cap portion 45 does not have opening 45a and that flarable portion 34 is not provided with groove 46. Except these points, the structure and function are the same. If recycling is intended, an annular groove may be provided at the hollow cylindrical portion 4 on the tip end side, as described in the embodiments above.

As to the shape of the connecting region, not only the structure shown in FIGS. 72 to 75 but also the structure shown in FIGS. 5 to 24 and FIG. 29 may be applicable. Driving into the object of fixing is performed in the similar manner as described with reference to FIGS. 25 to 28 and FIGS. 30 to 33.

Nineteenth Embodiment: Shape of T Nut 51A

Figure 76A:
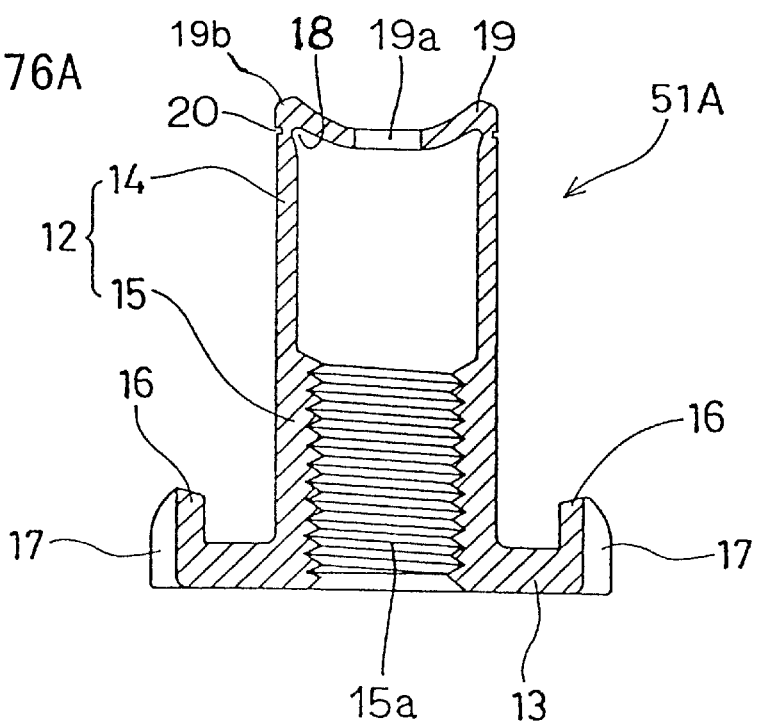
FIG. 76A is a central vertical section of a T nut 51A in accordance with a nineteenth embodiment of the present invention.
Figure 76B:
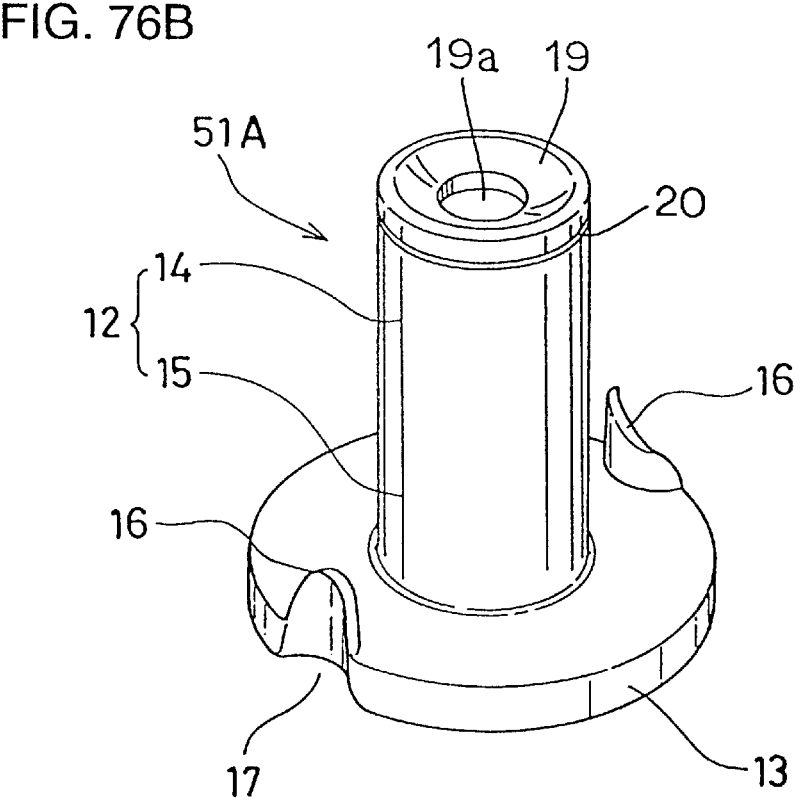
FIG. 76B is a perspective view thereof.
Figure 95A:
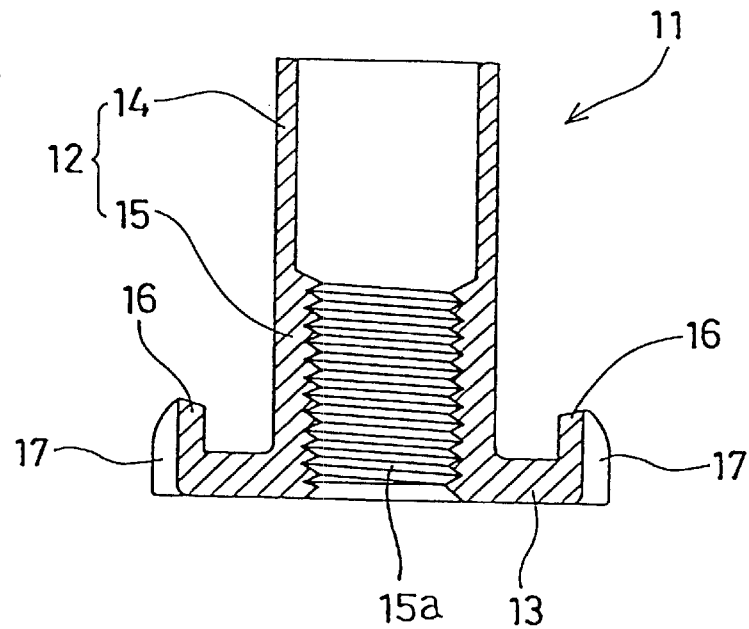
FIG. 95A is a central vertical section of a conventional T nut 11.
Figure 95B:
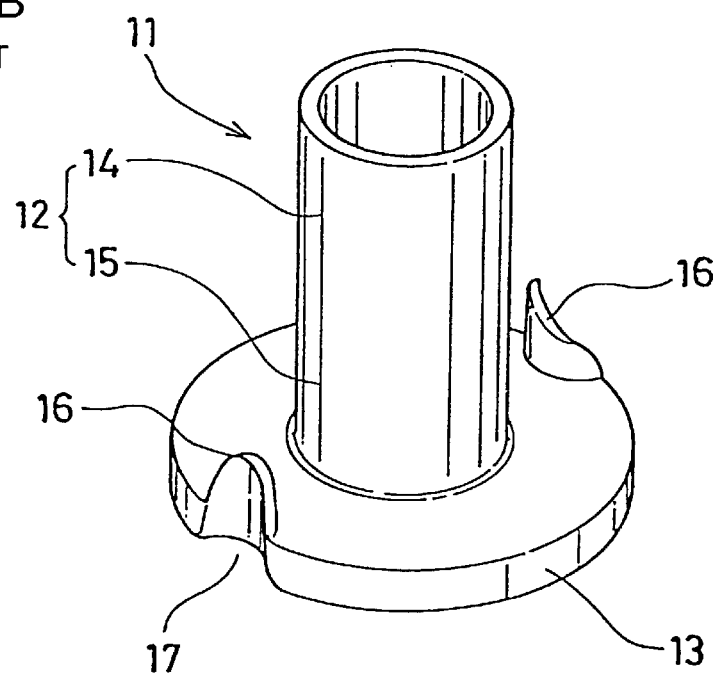
FIG. 95B is a perspective view thereof

In T nut 51A in accordance with the nineteenth embodiment of the present invention, shaft portion 12 and flange portion 13 have basically the same shape as those of the conventional T nut 11 disclosed in U.S. Pat. No. 5,238,344 described with reference to FIG. 95, as can be seen from FIGS. 76A and 76B. Therefore, common components are denoted by the same reference characters and detailed description thereof will not be repeated.

T nut 51A in accordance with the present embodiment differs from the conventional T nut 11 in that cap portion 19 is integrally formed continuous from the tip end portion of flarable portion 14. In T nut 51A in accordance with the present embodiment, cap portion has a dent at the central portion, and in view of processing of female screw forming portion 15a using a ball tap, a bent shank tap or the like, an opening 19a is provided at the central portion.

Further, in a connection region between flarable portion 14 and cap portion 19, inner surface 18 of flarable portion 14 is provided recessed outward. More specifically, various shapes as shown in FIGS. 3 to 11 may be used. Further, on an outer peripheral portion of cap portion 19 at the connecting region between flarable portion 14 and cap portion 19, an annular portion 19b protruding upward is provided. These shapes are examples only, and any structure may be used provided that the function and effect described below can be attained at the time when the T nut is driven.

In the example of FIG. 76, a groove 20 extending in the peripheral direction is provided on the outer peripheral surface of shaft portion 12 at the connecting region between flarable portion 14 and the cap portion 19. The groove 20 is to facilitate tearing of cap portion 19 at the time of driving as will be described later, and it is not always necessary.

As to the shape of the connecting region, not only the structure shown in FIG. 76 but also the structure shown in FIGS. 5 to 24 and FIG. 29 may be applicable. Driving into the object of fixing is performed in the similar manner as described with reference to FIGS. 25 to 28 and FIGS. 30 to 33.

Twentieth Embodiment: Shape of T Nut 51B

Figure 77A:
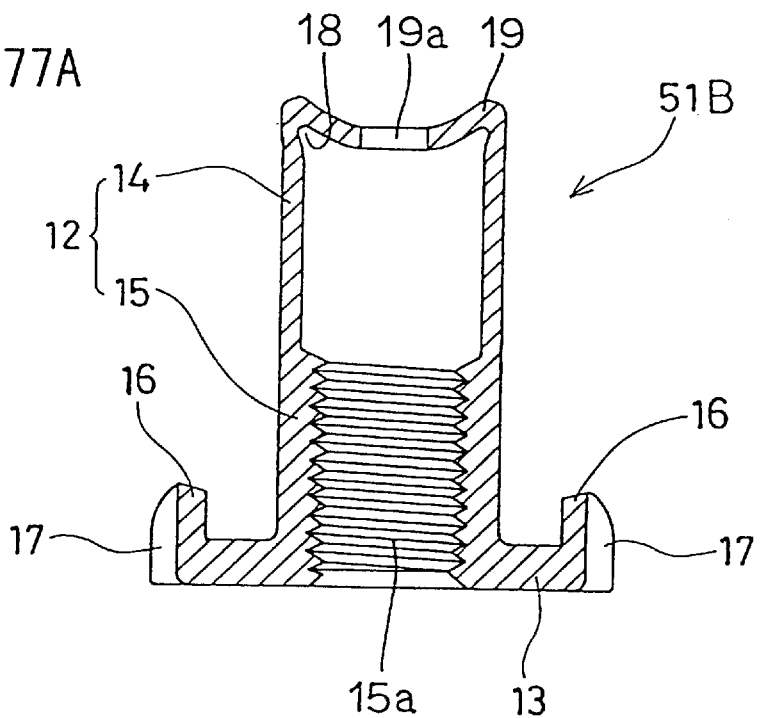
FIG. 77A is a central vertical section of a T nut 51B in accordance with a twentieth embodiment of the present invention.
Figure 77B:
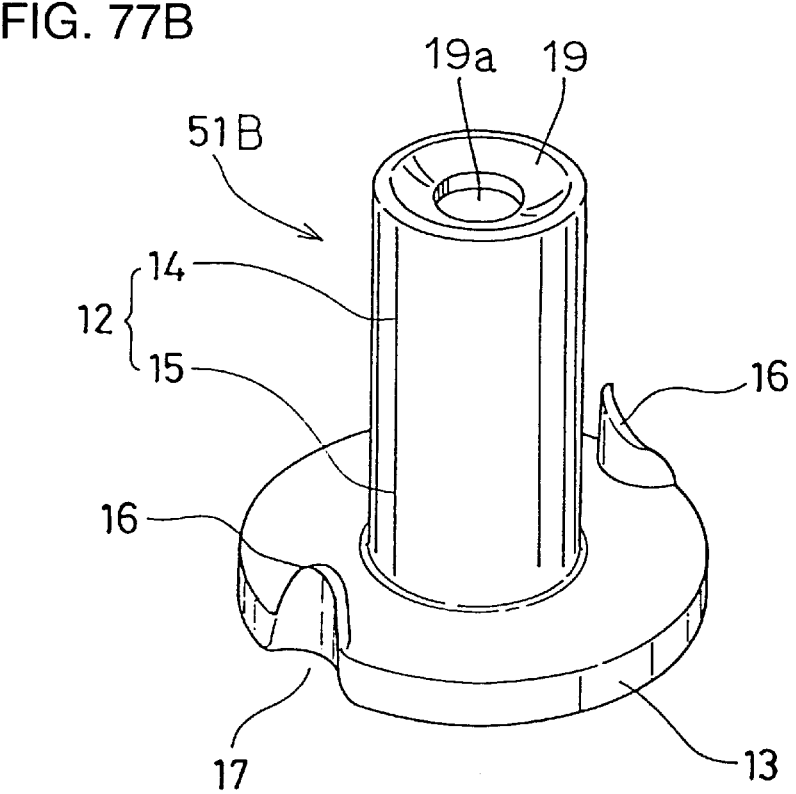
FIG. 77B is a perspective view thereof.

The shape of T nut 51B in accordance with the twentieth embodiment of the present invention is basically the same as that of T nut 51A in accordance with the nineteenth embodiment, as can be seen from FIGS. 77A and 77B. Therefore, common components will be denoted by the same reference characters and detailed description thereof will not be repeated.

T nut 51B in accordance with the present embodiment differs from the T nut 51A in accordance with the nineteenth embodiment in that groove 20 is not provided, and except this point, the structure is the same.

As to the shape of the connecting region, not only the structure shown in FIG. 77 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-First Embodiment: Shape of T Nut 51C

Figure 78A:
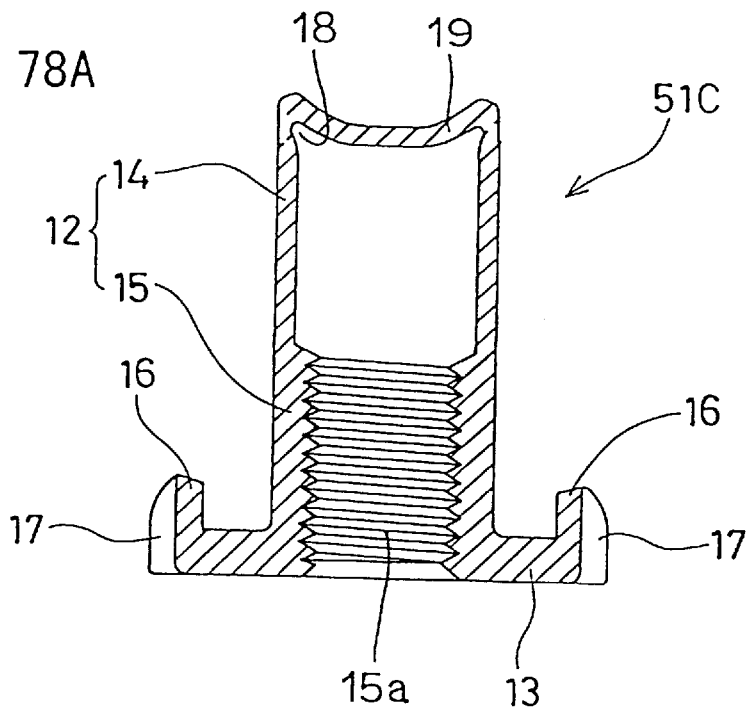
FIG. 78A is a central vertical section of a T nut 51C in accordance with a twenty-first embodiment of the present invention.
Figure 78B:
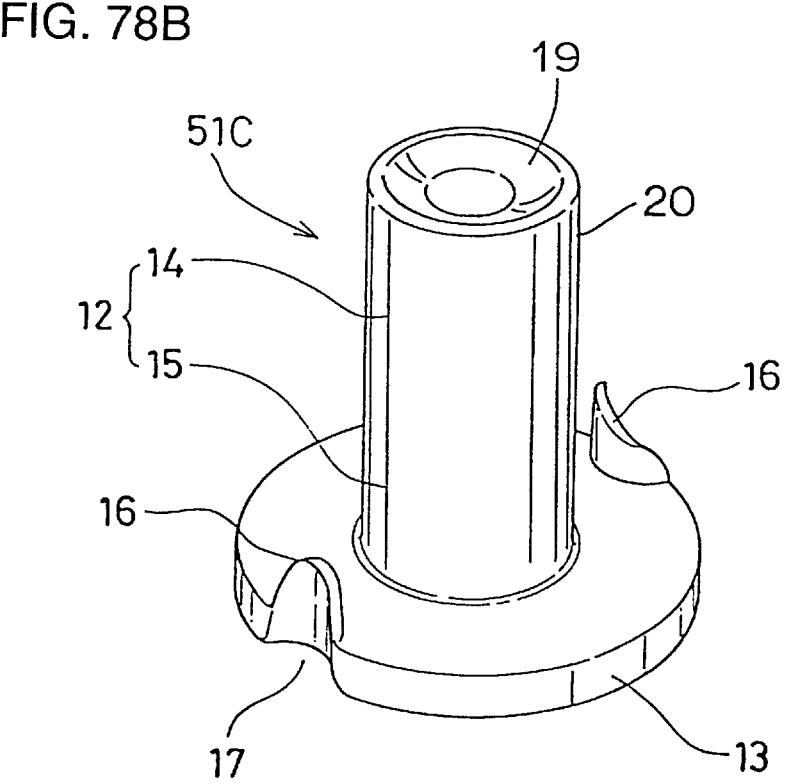
FIG. 78B is a perspective view thereof.

The shape of T nut 51C in accordance with the twenty-first embodiment of the present invention is basically the same as that of T nut 51A in accordance with the nineteenth embodiment, as can be seen from FIGS. 78A and 78B. Therefore, common components will be denoted by the same reference characters and detailed description thereof will not be repeated.

T nut 51C of the present embodiment differs from T nut 51A in accordance with the nineteenth embodiment in that cap portion 19 does not have opening 19a and that groove 20 is not provided, and except these points, the structure is the same.

As to the shape of the connecting region, not only the structure shown in FIG. 78 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-second Embodiment: Shape of T Nut 51D

Figure 79A:
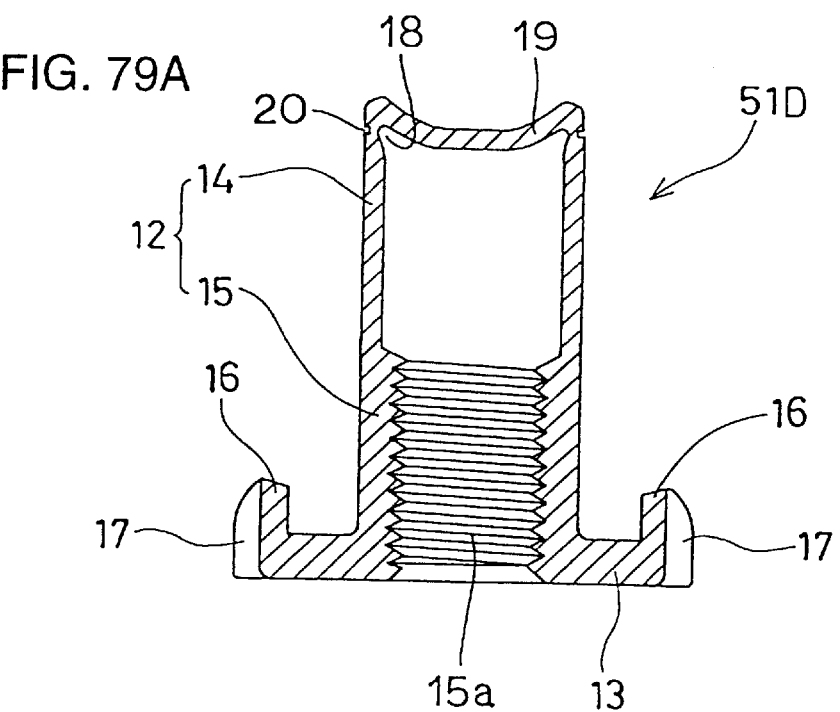
FIG. 79A is a central vertical section of a T nut 51D in accordance with a twenty-second embodiment of the present invention.
Figure 79B:
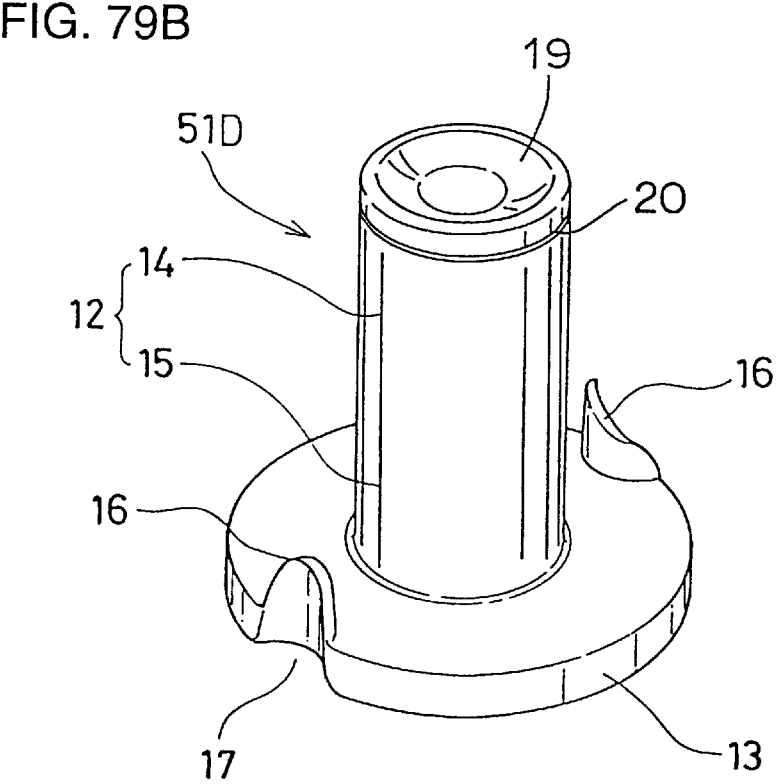
FIG. 79B is a perspective view thereof.

The shape of T nut 51D in accordance with the twenty-second embodiment of the present invention is basically the same as that of T nut 51A in accordance with the nineteenth embodiment, as can be seen from FIGS. 79A and 79B. Therefore, common components will be denoted by the same reference characters and detailed description thereof will not be repeated.

T nut 51D in accordance with the present embodiment differs from T nut 51A in accordance with the nineteenth embodiment in that cap portion 19 does not have opening 19a, and except this point, the structure is the same.

As to the shape of the connecting region, not only the structure shown in FIG. 79 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-Third Embodiment: Shape of Recycle T Nut 51E

Figure 80A:
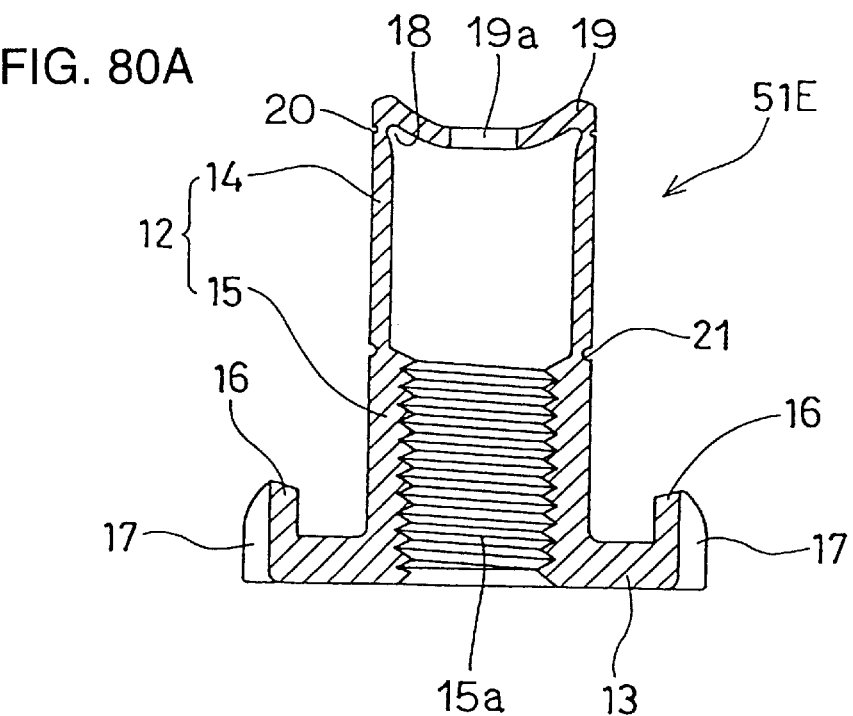
FIG. 80A is a central vertical section of a T nut 51E in accordance with a twenty-third embodiment of the present invention.
Figure 80B:
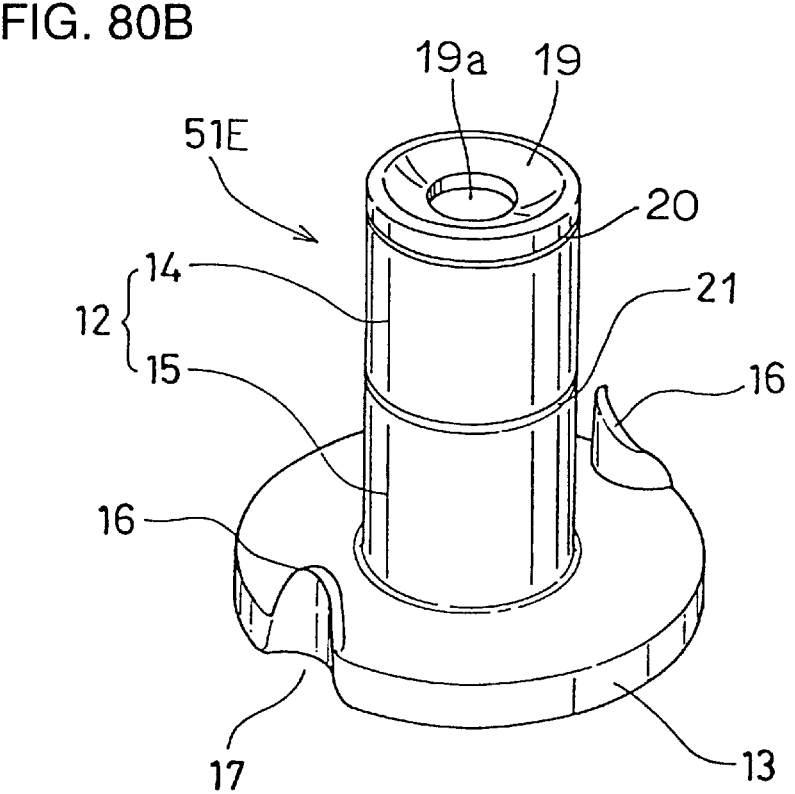
FIG. 80B is a perspective view thereof.

The shape of T nut 51E in accordance with the twenty-third embodiment of the present invention is basically the same as that of T nut 61A in accordance with the first embodiment, as can be seen from FIGS. 80A and 80B. Therefore, common components will be denoted by the same reference characters and detailed description thereof will not be repeated.

T nut 51E in accordance with the present embodiment differs from T nut 61A in accordance with the first embodiment in that an annular groove 21 is provided over the entire outer periphery of shaft portion 12 at the interface between flarable portion 14 and female screw forming portion 15. Cross sectional shape of the annular groove 21 may be arbitrarily selected to be a U shape, V shape or a rectangular shape with one side opened, in accordance with the material of the T nut or associated processing property, or mechanical property such as tensile strength. Annular groove 21 is provided for the purpose of promoting recycling of object 19 of fixing, as the groove facilitates separation and recovery of the object constituting the product when the product on which T nut 51E is caulked and fixed is finished. The method of recovery at the time of recycling is as described with reference to FIGS. 37 and 38.

As to the shape of the connecting region, not only the structure shown in FIG. 80 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-Fourth Embodiment: Shape of Recycle T Nut 51F

Figure 81A:
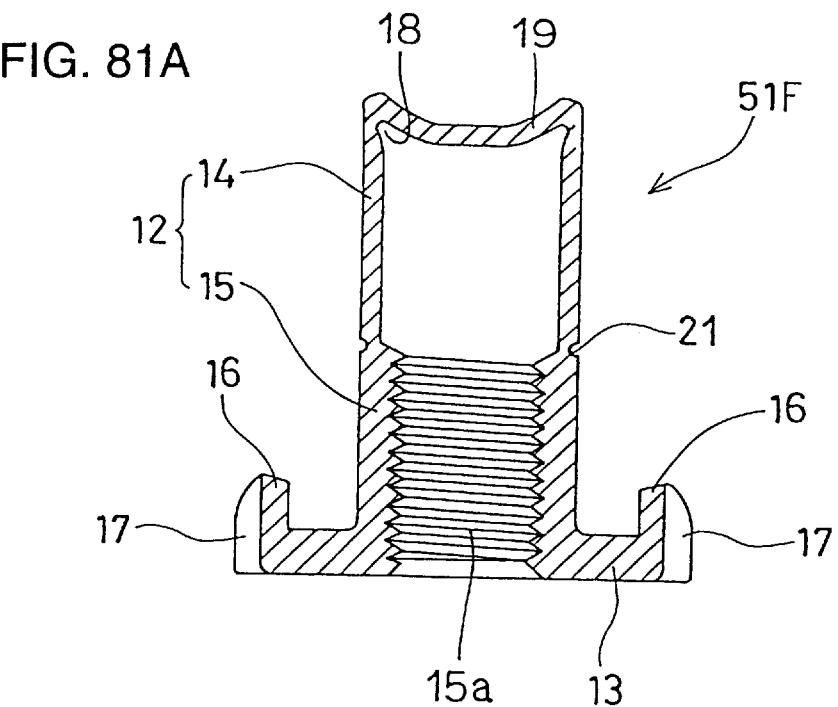
FIG. 81A is a central vertical section of a T nut 51F in accordance with a twenty-fourth embodiment of the present invention.
Figure 81B:
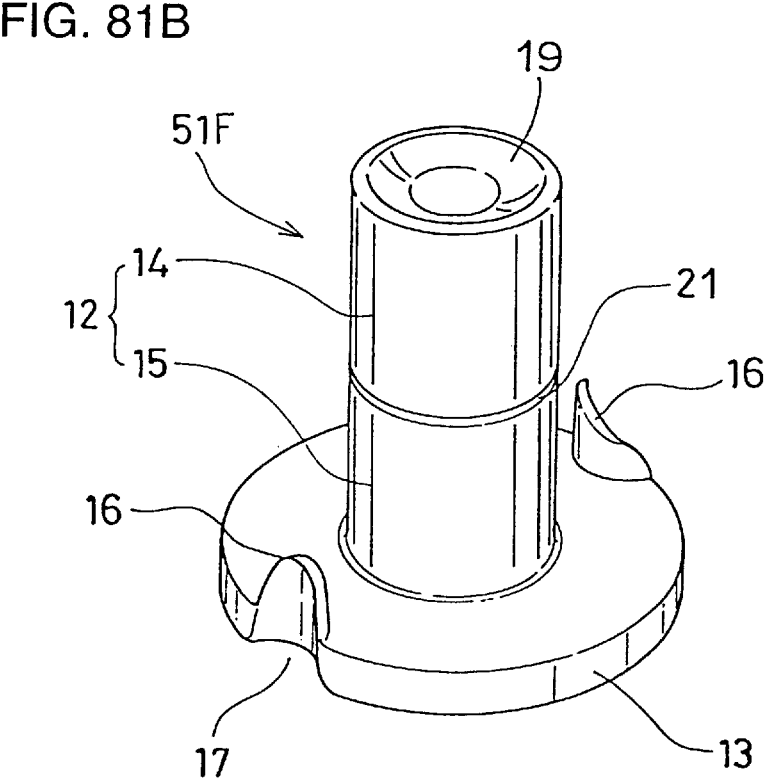
FIG. 81B is a perspective view thereof.

The shape of T nut 51F in accordance with the twenty-fourth embodiment of the present invention is basically the same as that of T nut 61D in accordance with the fourth embodiment, as can be seen from FIGS. 81A and 81B. Therefore, common components will be denoted by the same reference characters and detailed description thereof will not be repeated.

T nut 51F in accordance with the present embodiment differs from T nut 61D in accordance with the fourth embodiment in that an annular groove 21 is provided over the entire outer periphery of shaft portion 12 at the interface between flarable portion 14 and female screw forming portion 15. Cross sectional shape of the annular groove 21 may be arbitrarily selected to be a U shape, V shape or a rectangular shape with one side opened, in accordance with the material of the T nut or associated processing property, or mechanical property such as tensile strength. Annular groove 21 is provided for the purpose of promoting recycling of object 19 of fixing, as the groove facilitates separation and recovery of the object constituting the product when the product on which T nut 51F is caulked and fixed is finished. The method of recovery at the time of recycling is as described with reference to FIGS. 37 and 38.

As to the shape of the connecting region, not only the structure shown in FIG. 81 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-Fifth Embodiment: Shape of T Nut 61H

Figure 82A:
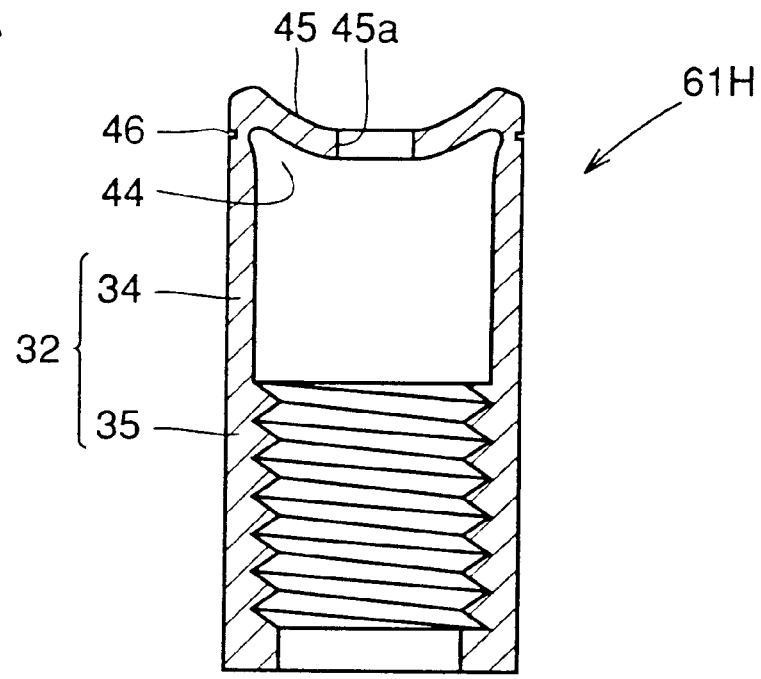
FIG. 82A is a central vertical section of a T nut 61H in accordance with a twenty-fifth embodiment of the present invention.
Figure 82B:
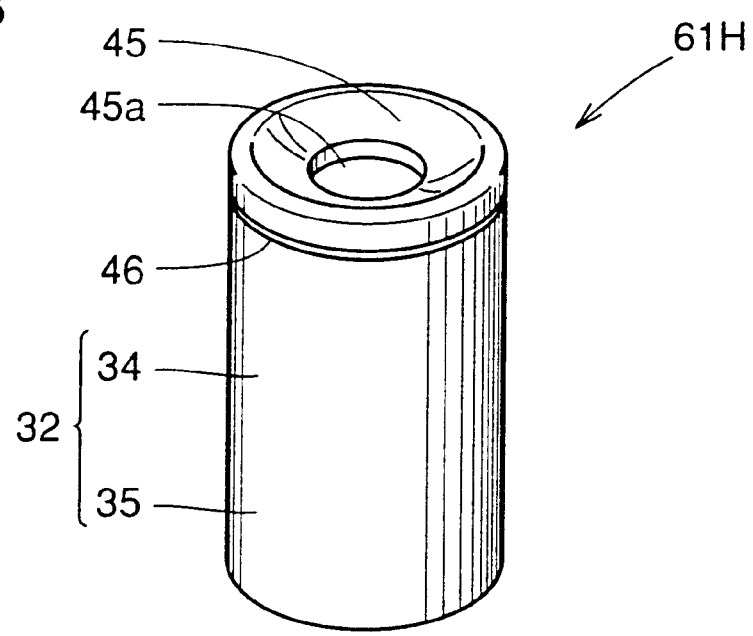
FIG. 82B is a perspective view thereof.

The shape of T nut 61H in accordance with the twenty-fifth embodiment of the present invention is basically the same as that of T nut 61A in accordance with the first embodiment, as can be seen from FIGS. 82A and 82B. Therefore, common components will be denoted by the same reference characters and detailed description thereof will not be repeated.

T nut 61H in accordance with the present embodiment differs from T nut 61A in accordance with the first embodiment in that flange 33 is not provided.

Figure 83A:
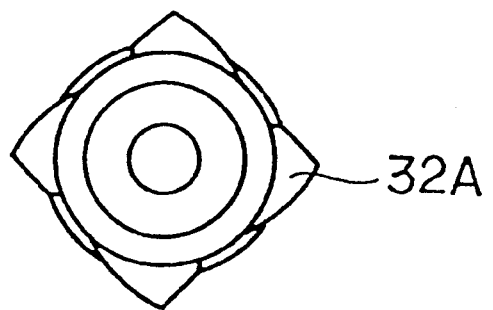
FIG. 83A is a plan view of a modification of T nut 61H in accordance with a twenty-fifth embodiment of the present invention.
Figure 83B:
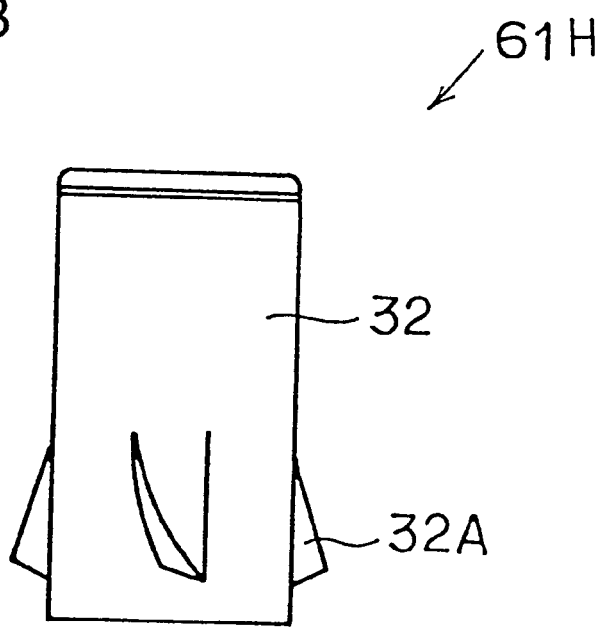
FIG. 83B is a side view thereof.

As rotation stopper of T nut 61H, screw members 32A as protruding portions extending outward from the outer peripheral surface of shaft portion 32 may be provided as shown in FIGS. 83A and 83B. Any other shape may be used provided that the function and effect of rotation stopper can be attained, other than screw member 32A.

As to the shape of the connecting region, not only the structure shown in FIG. 82 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-Sixth Embodiment: Shape of T Nut 61I

Figure 84A:
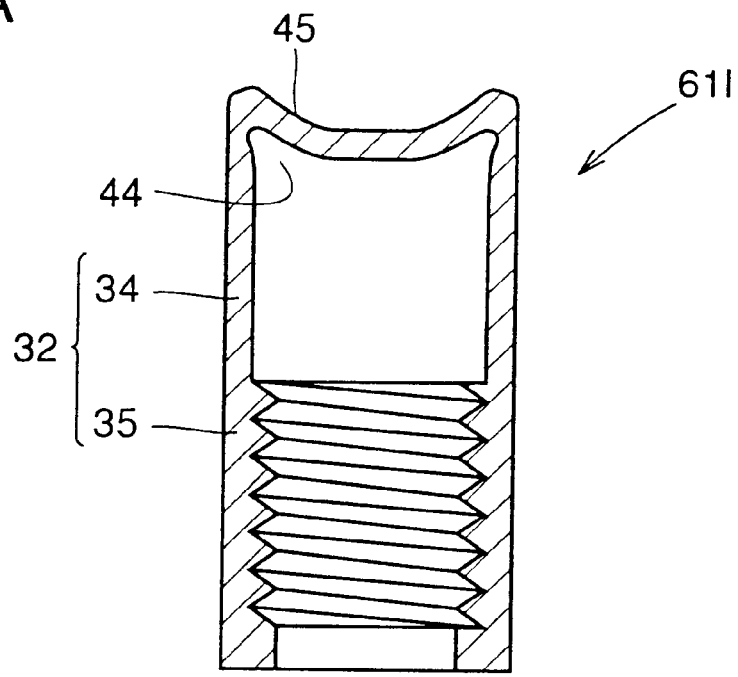
FIG. 84A is a central vertical section of a T nut 61I in accordance with a twenty-sixth embodiment of the present invention.
Figure 84B:
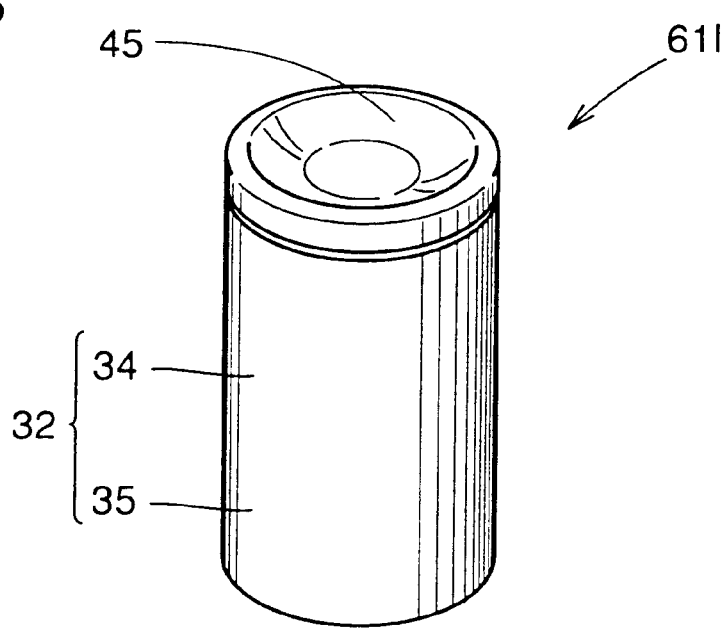
FIG. 84B is a perspective view thereof.

The shape of T nut 61I in accordance with the twenty-sixth embodiment of the present invention is basically the same as that of T nut 61D in accordance with the fourth embodiment, as can be seen from FIGS. 84A and 84B. Therefore, common components will be denoted by the same reference characters and detailed description thereof will not be repeated.

T nut 61I in accordance with the present embodiment differs from T nut 61D in accordance with the fourth embodiment in that flange 33 is not provided.

Figure 85A:
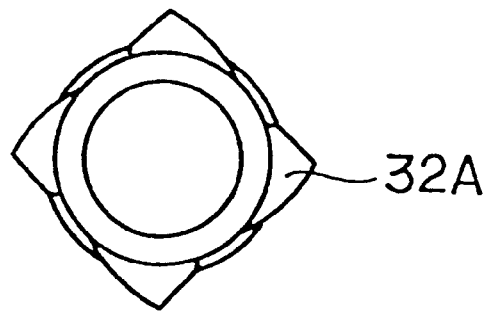
FIG. 85A is a plan view of a modification of T nut 61I in accordance with the twenty-sixth embodiment of the present invention.
Figure 85B:
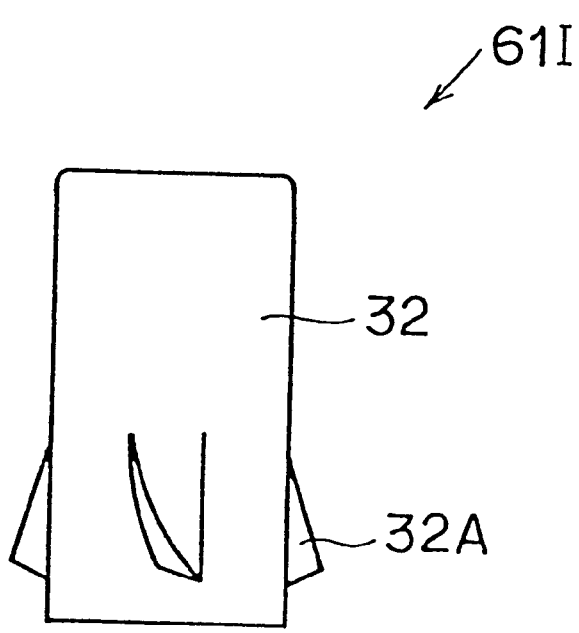
FIG. 85B is a side view thereof.

As rotation stopper of T nut 61I, screw members 32A as protruding portions extending outward from the outer peripheral surface of shaft portion 32 may be provided as shown in FIGS. 85A and 85B. Any other shape may be used provided that the function and effect of rotation stopper can be attained, other than screw member 32A.

As to the shape of the connecting region, not only the structure shown in FIG. 84 but also the structure shown in FIGS. 5 to 24 and FIG. 29 may be applicable. Driving into the object of fixing is performed in the similar manner as described with reference to FIGS. 25 to 28 and FIGS. 30 to 33.

Twenty-Seventh Embodiment: Outer Casing Member for a Bullet

Figure 86A:
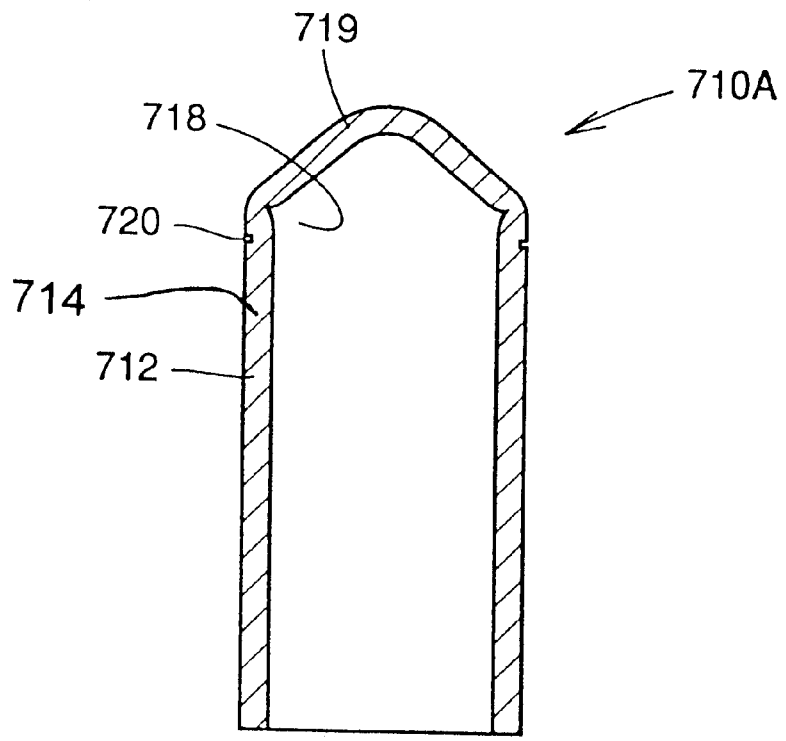
FIG. 86A is a central vertical section of an outer casing member 710A for a bullet in accordance with a twenty-seventh embodiment of the present invention.
Figure 86B:
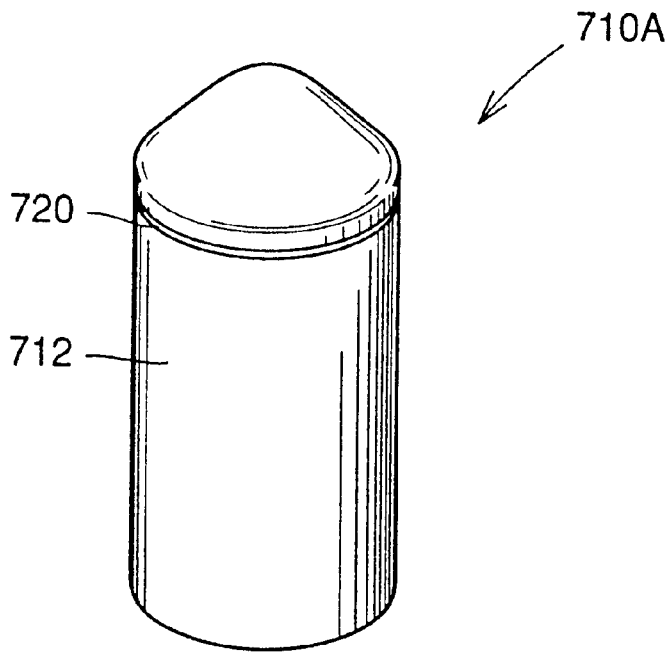
FIG. 86B is a perspective view thereof

An upper casing member for a bullet in accordance with a twenty-seventh embodiment of the present invention will be described. The shape of outer casing member 710A for a bullet in accordance with the present invention is as shown in FIGS. 86A and 86B, and it has a hollow shaft portion 712 and a cap portion 719 integrally formed continuously to the tip end portion of hollow shaft portion 712. In outer casing member 710 for a bullet in accordance with the present embodiment, the central portion of cap portion 719 is protruding outward. Further, at a connecting region between shaft portion 712 and cap portion 719, an inner surface 718 of a flarable portion 714 is provided recessed outward. As a specific shape, the structures of the connecting region shown in FIGS. 5 to 24 and FIG. 29 may be used.

These shapes are examples only, and essentially, any shape may be used provided that when a pressing force is applied to the tip end surface of cap portion 719 in a direction from the side of cap portion 719 to shaft portion 712, a force is exerted to bend shaft portion 712 outward so that cap portion 719 goes off from shaft portion 712 and shaft portion 712 is bent outward by the force.

Further, a groove 720 extending in the peripheral direction is provided on an outer peripheral surface of the connecting region between shaft portion 712 and cap portion 719. Groove 720 is to facilitate tearing of cap portion 719 at the time of driving into the object, and it is not always necessary.

Because of the outer casing member 710A for a bullet having the above described structure, when outer casing member 710A for a bullet collides against an object, cap portion 719 at the tip end portion is surely torn off, causing explosion, and therefor the object can more effectively be destroyed by explosion. The outer casing member for a bullet is applicable not only to a small size bullet but also to a missile or the like, provided that it is of the type containing explosives therein.

Figure 87:
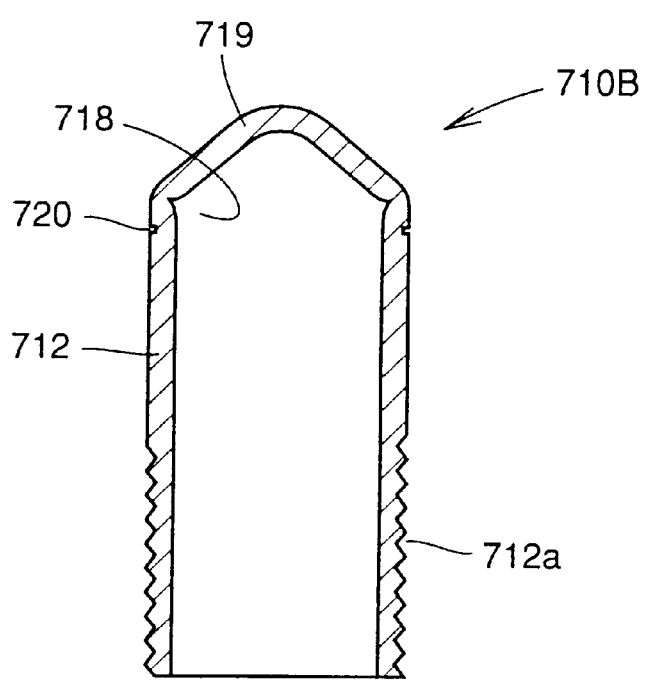
FIG. 87 is a central vertical section of an outer casing member 710B for a bullet in accordance with a modification of the outer casing member in accordance with the twenty-seventh embodiment of the present invention.

As a modification, in an outer casing member 710B for a bullet shown in FIG. 87, a male screw 712a is formed on an outer peripheral surface of shaft portion 712.

Twenty-Eighth Embodiment: Outer Casing Member for a Bullet

Figure 88A:
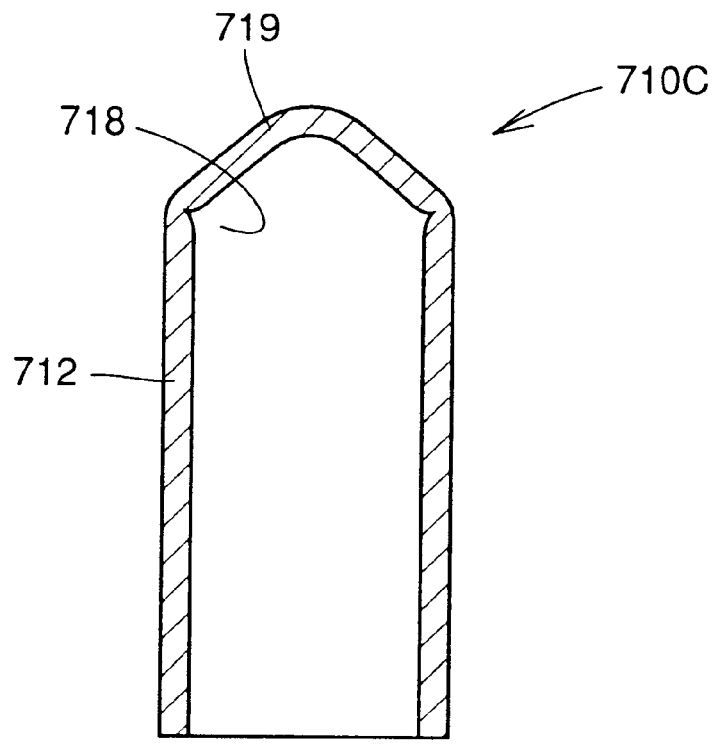
FIG. 88A is a central vertical section of an outer casing member 710C for a bullet in accordance with a twenty-eighth embodiment of the present invention.
Figure 88B:
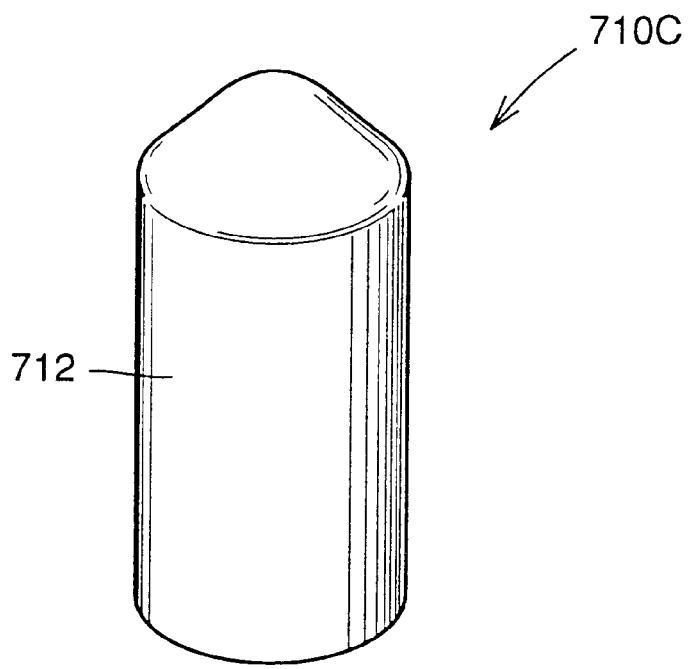
FIG. 88B is a perspective view thereof.

The outer casing member for a bullet in accordance with the twenty-eighth embodiment of the present invention will be described. The shape of outer casing member 710C for a bullet of the present embodiment is similar to that of outer casing member 710A for a bullet in accordance with the twenty-seventh embodiment described above, except that groove 720 is not provided, as can be seen from FIGS. 88A and 88B.

Figure 89:
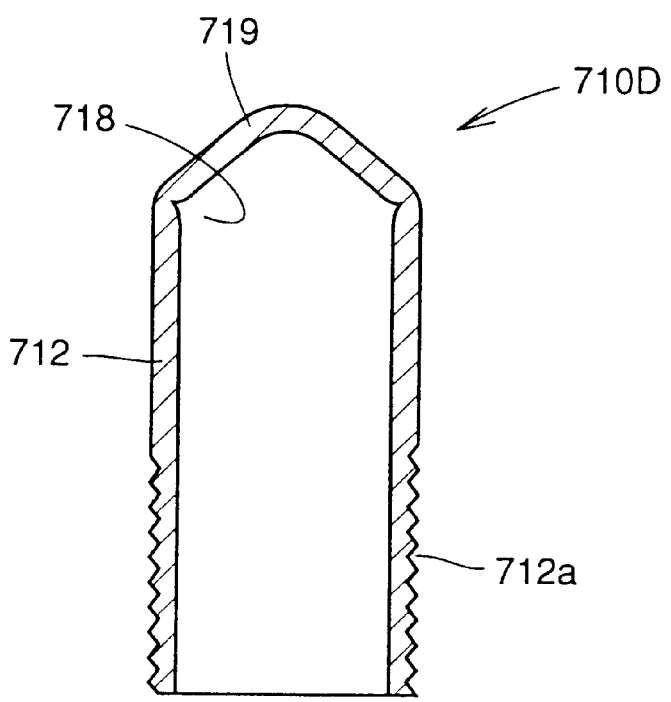
FIG. 89 is a central vertical section of an outer casing member 710D for a bullet in accordance with a modification of the outer casing member in accordance with the twenty-eighth embodiment of the present invention.

In an outer casing member 710D for a bullet as a modification shown in FIG. 89, a male screw 712a is formed on an outer peripheral surface of shaft portion 712.

Twenty-Ninth Embodiment: Outer Casing Member for a Bullet

Figure 90A:
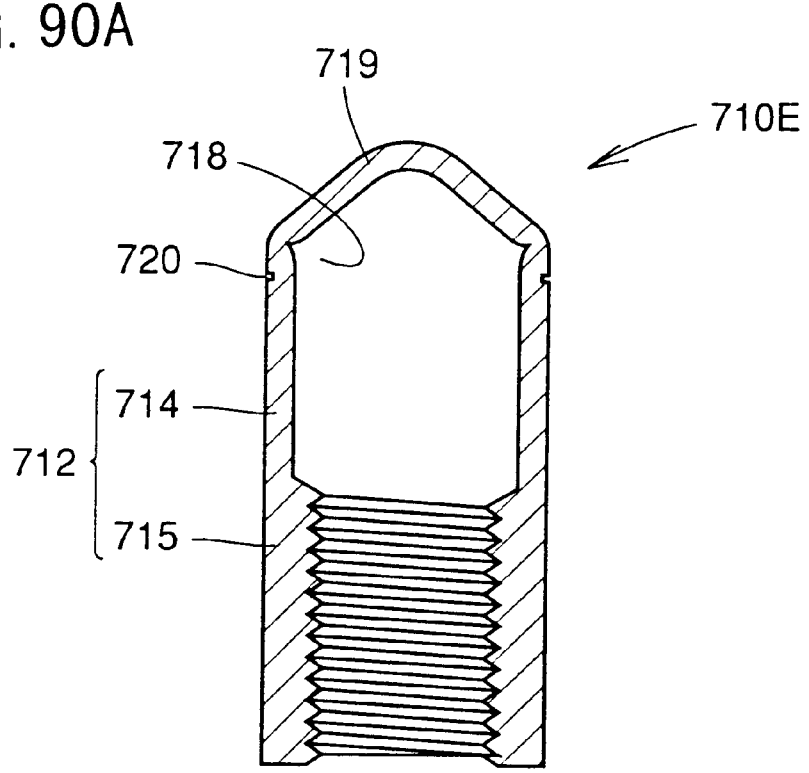
FIG. 90A is a central vertical section of an outer casing member 710E for a bullet in accordance with a twenty-ninth embodiment of the present invention.
Figure 90B:
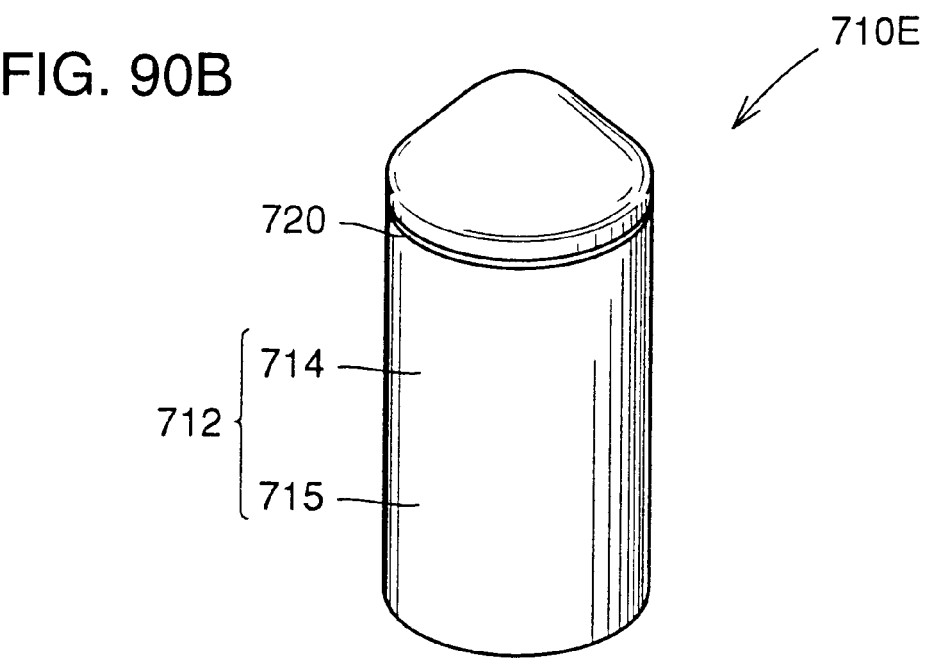
FIG. 90B is a perspective view thereof.

The outer casing member for a bullet in accordance with the twenty-ninth embodiment of the present invention will be described. The shape of outer casing member 710E for a bullet of the present embodiment is similar to that of outer casing member 710A for a bullet in accordance with the twenty-seventh embodiment described above, except that a female screw 715 is provided on an inner peripheral surface of shaft portion 712, as can be seen from FIGS. 90A and 90B.

Figure 91:
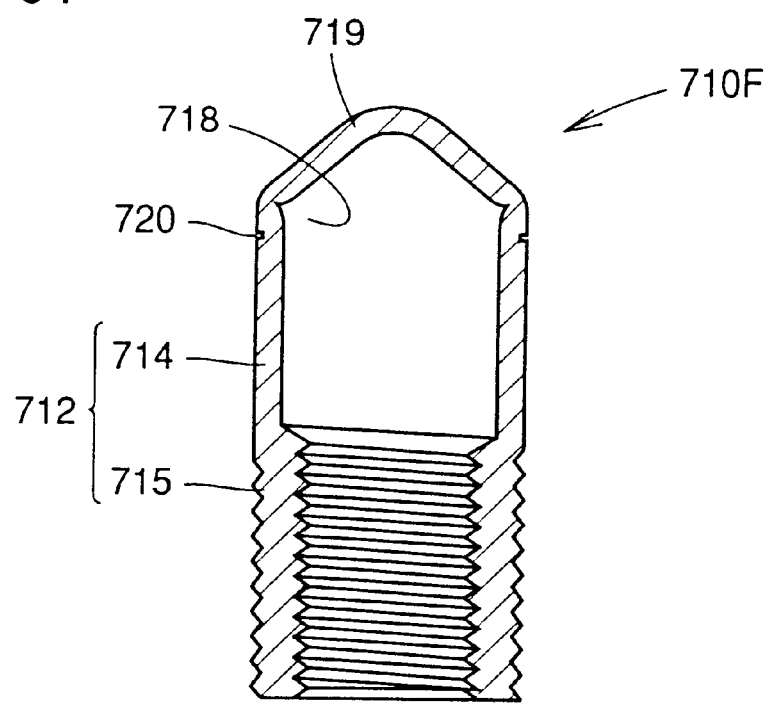
FIG. 91 is a central vertical section of an outer casing member 710F for a bullet in accordance with a modification of the outer casing member in accordance with the twenty-ninth embodiment of the present invention.

As a modification, an outer casing member 710F for a bullet shown in FIG. 91 has a male screw formed on an outer peripheral surface of shaft portion 712 and a female screw formed on the inner peripheral surface.

Thirtieth Embodiment: Outer Casing Member for a Bullet

Figure 92A:
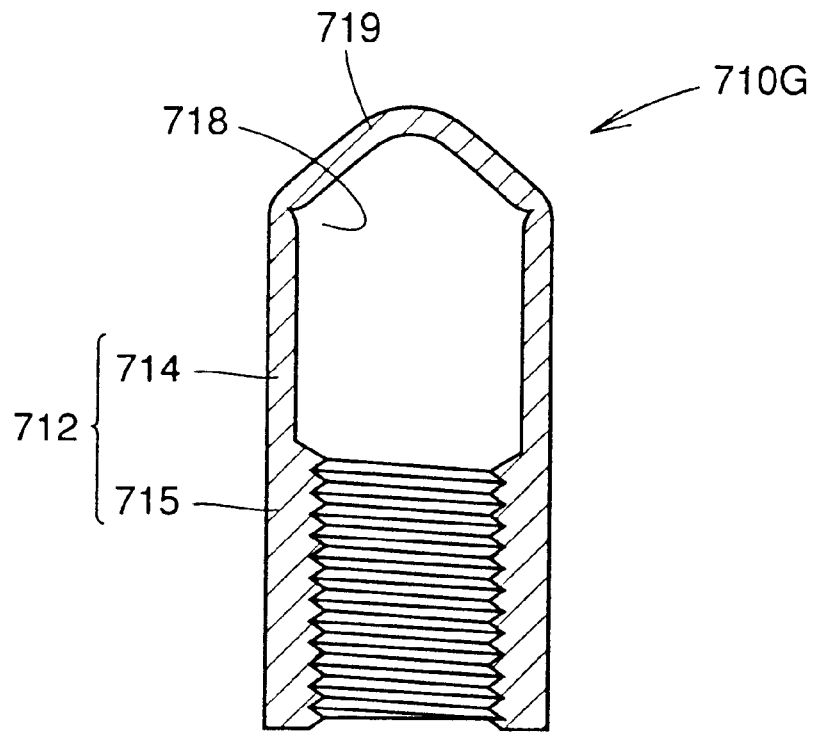
FIG. 92A is a central vertical section of an outer casing member 710G in accordance with a thirtieth embodiment of the present invention.
Figure 92B:
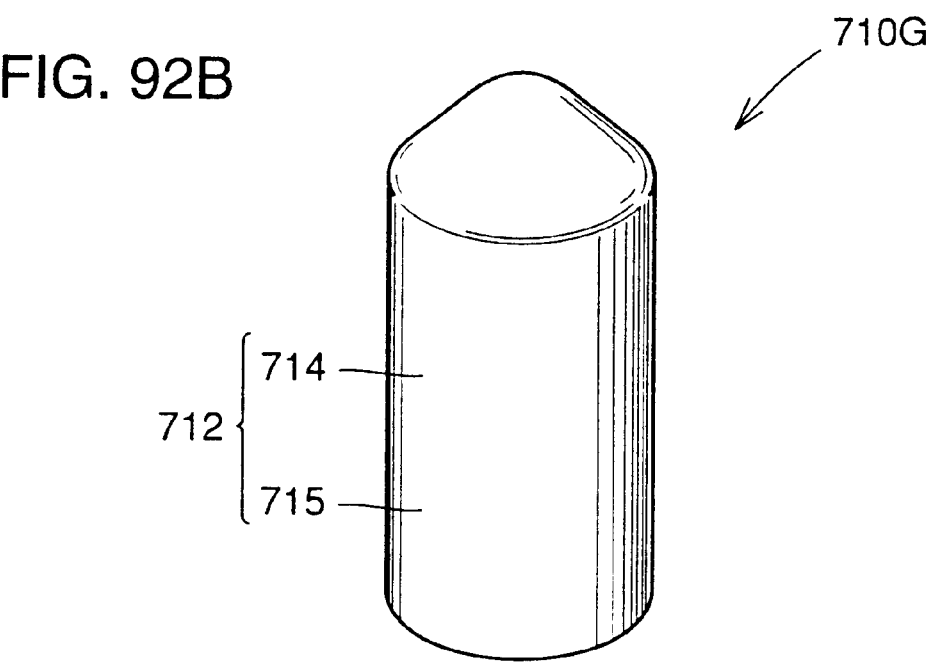
FIG. 92B is a perspective view thereof.

The outer casing member for a bullet in accordance with the thirtieth embodiment of the present invention will be described. The shape of outer casing member 710G for a bullet of the present embodiment is similar to that of outer casing member 710E for a bullet in accordance with the twenty-seventh embodiment described above, except that groove 720 is not provided, as can be seen from FIGS. 92A and 92B.

Figure 93:
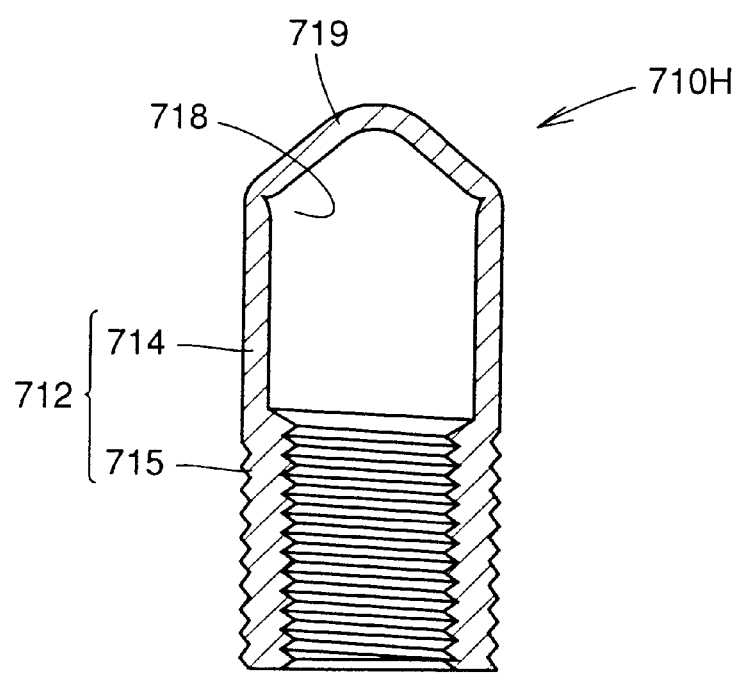
FIG. 93 is a central vertical section of an outer casing member 710H for a bullet in accordance with a modification of the outer casing member in accordance with the thirtieth embodiment of the present invention.

As a modification, an outer casing member 710H for a bullet shown in FIG. 93 has a male screw formed on an outer peripheral surface of shaft portion 712 and a female screw formed on the inner peripheral surface.

The shapes of the T nuts described in accordance with the first to twenty-sixth embodiment above are applicable as the shape of outer casing member for a bullet, and the shapes of outer casing members for bullets described with reference to the twenty-seventh to thirty-first embodiments are applicable as the shape of T nuts.

Figure 94A:
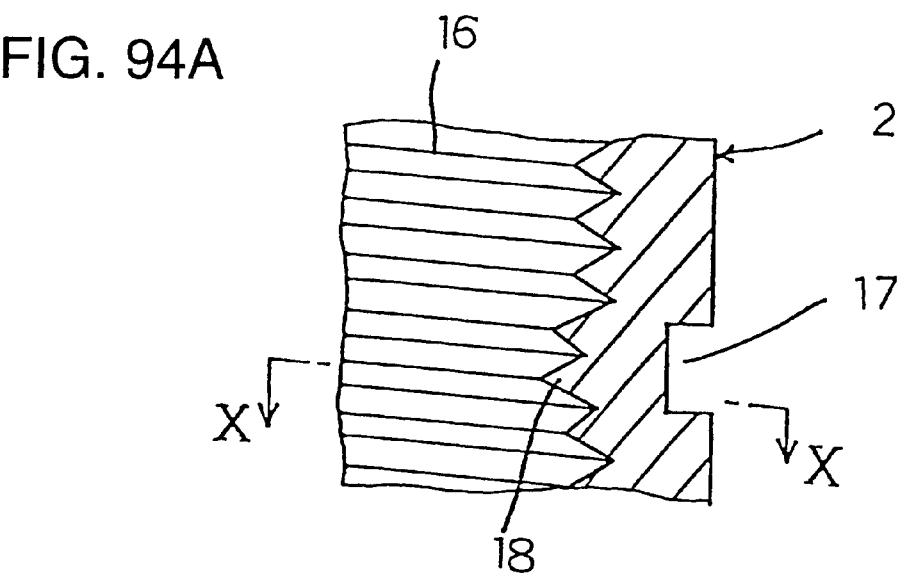
FIG. 94A is a partial cross section showing, in enlargement, a structure having an irregular portion provided at a female screw forming portion of the T nut in accordance with a thirty-first embodiment of the present invention.
Figure 94B:
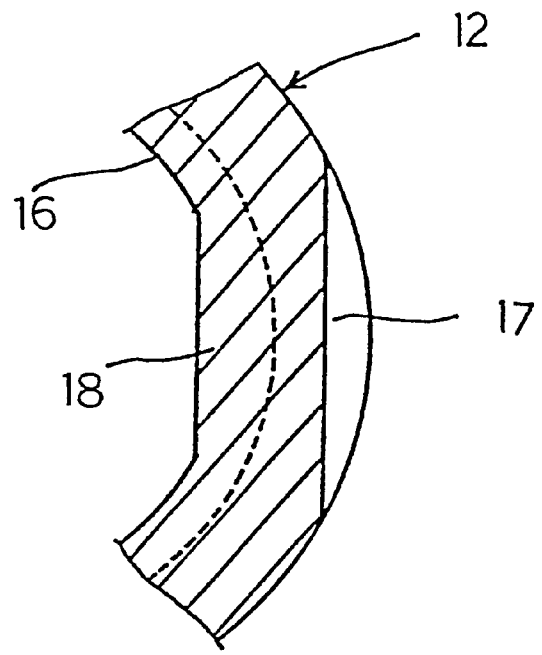
FIG. 94B is a cross section taken along the line X—X of FIG. 94A.

Thirty-First Embodiment: Modifications of T Nut and Outer Casing Member for a Bullet In the region where a screw is formed in the T nut and the outer casing member for a bullet in accordance with each of the above described embodiment, it is preferable that an irregular threaded portion is formed as locking means for preventing loosening of a bolt to be screwed therein. In order to make irregular part of the thread, a processing method may be employed in which an outer peripheral surface of female screw forming portion 16 at shaft portion 2 of a T nut is pressed inward to form a recessed portion 17 as can be seen from FIGS. 94A and 94B. For example, two recessed portions 17 may be formed spaced by 180°. The recessed portions 17 may be formed by pinching prescribed portions of female screw forming portion 16 by a pair of appropriate tools and strongly pressing the tools toward the female screw forming portion 16. As such irregular portion 18 of the female screw is provided, the bolt cannot be inserted unless it is rotated relatively strongly, and therefore the screwed state is locked and the loosening of the bolt can be prevented.

As described above, the gist of the present invention resides in the shape of the connecting region between the flarable portion (shaft portion) and the cap portion. Provided that when a pressing force is applied to a tip surface of cap portion in a direction from the side of the cap portion to the flarable portion (shaft portion), a force is exerted to bend flarable portion (shaft portion) outward so that the cap portion goes off from the flarable portion (shaft portion) and the flarable portion is bent outward by the force, any shape may be adapted, not limited to the shapes described in each of the embodiments above.

Because of this structure, when the T nut (outer casing member for a bullet) is driven into an object, the object is ejected by the cap portion, and therefore it is unnecessary to provide in advance a receiving hole in the object to which the metal fastening member (outer casing member for a bullet) is driven.

As a result, when the present invention is applied to a metal fastening member, driving of a T nut into an object of fixing by automatic control without the necessity of providing a receiving hole in advance becomes possible, so that working efficiency is improved and the cost of driving can be reduced.

When the present invention is applied to an outer casing member for a bullet, an outer casing member for a bullet of which tip end portion surely tears simultaneously with the collision against the object can be obtained.

Further, the shapes of the cap portion, shaft portion and the flange portion disclosed in the embodiments above may be appropriately combined, and not limited to those of the embodiments described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A metal fastener member to be installed in a workpiece, wherein:
   said fastener member comprises a cylindrical shaft, a cap, and a frangible connecting region;
   said fastener member is made of a single metal material and has an initial state before being installed in the workpiece and a final state after being installed in the workpiece;
   said cylindrical shaft includes a flarable portion and a shaft body which are integral and continuous with one another in both said initial state and said final state;
   said flarable portion has a cylindrical shape and extends axially from said shaft body about a common central axis of said shaft body and said flarable portion in said initial state, and said flarable portion is flared radially outwardly from said shaft body in said final state;
   said cap is integrally and continuously connected by said frangible connecting region to said flarable portion at an end thereof opposite said shaft body and protrudes radially inwardly from said flarable portion in said initial state;
   said frangible connecting region is broken such that said cap is separated from said flarable portion through said broken frangible connecting region in said final state; and
   said frangible connecting region has such a shape in said initial state so that when a pressing force is applied to said cap portion directed toward said shaft body, then a reaction force is exerted to flare said flarable portion radially outwardly and to break said frangible connection region to separate said cap from said flarable portion.

2. The metal fastener member according to claim 1, wherein said flarable portion has an inner surface that is recessed outwardly at said frangible connecting region.

3. The metal fastener member according to claim 2, wherein said inner surface of said flarable portion is curved smoothly outwardly from said flarable portion toward said cap at said frangible connecting region.

4. The metal fastener member according to claim 2, wherein said flarable portion has a wall thickness that smoothly reduces toward said cap to said frangible connecting region.

5. The metal fastener member according to claim 1, further having a peripherally extending groove in an outer peripheral surface of said metal fastener member at said frangible connecting region.

6. The metal fastener member according to claim 1, wherein said cap has an axially inwardly indented bowl shape at a central portion thereof.

7. The metal fastener member according to claim 1, wherein said cap has an opening therethrough at a central portion thereof coaxially on said common central axis.

8. The metal fastener member according to claim 7, wherein said opening has an inner diameter that is the smallest inner diameter of any part of said metal fastener member.

9. The metal fastener member according to claim 7, wherein said opening has an inner diameter that is smaller than an inner diameter of any part of said cylindrical shaft.

10. The metal fastener member according to claim 1, wherein said cap protrudes radially inwardly from said flarable portion to a point that is closer to said common central axis than is any other part of said metal fastener member in said initial state.

11. The metal fastener member according to claim 1, wherein, in said final state, said flarable portion consists of a single layer of said single metal material that is bent and flared radially outwardly from said shaft body.

12. The metal fastener member according to claim 11, wherein, in said final state, said flarable portion has a radially outwardly directed broken terminal edge that has been broken and separated from said cap along said frangible connecting region by which said cap was connected to said flarable portion in said initial state.

13. The metal fastener member according to claim 1, wherein said shaft body has a female screw threading formed on at least a portion of an inner periphery thereof.

14. The metal fastener member according to claim 1, further comprising a flange that extends radially outwardly at an end of said shaft body opposite said flarable portion and that is integral and continuous with said shaft body in both said initial state and said final state.

15. The metal fastener member according to claim 14, wherein said flange has a polygonal peripheral shape.

16. The metal fastener member according to claim 15, further comprising a pawl extending from an outer periphery of said flange in a direction toward said cap.

17. The metal fastener member according to claim 15, wherein said flange includes a planar flange body and a protruding portion that protrudes from said flange body in a direction toward said cap.

18. The metal fastener member according to claim 14, further comprising a pawl extending from an outer periphery of said flange in a direction toward said cap.

19. The metal fastener member according to claim 14, wherein said flange has a non-circular shape.

20. A metal fastener member entirely made of a single metal material and comprising:

a cylindrical shaft including a shaft body and a flarable portion that extends integrally and continuously from said shaft body and that is adapted to be caulked and flared radially outwardly from said shaft body;

a cap; and frangible connecting means for frangibly integrally connecting said cap to an end of said flarable portion opposite said shaft body such that said cap protrudes radially inwardly from said flarable portion, and for frangibly breaking and thereby separating said cap from said flarable portion responsive to a caulking force applied to said cap in a direction toward said shaft body.

* * * * *

UNITED STATES PATENT AND TRADEMARK OFFICE
CERTIFICATE OF CORRECTION

PATENT NO. : 6,511,274 B1
DATED : January 28, 2003
INVENTOR(S) : Nagayama

It is certified that error appears in the above-identified patent and that said Letters Patent is hereby corrected as shown below:

<u>Column 25,</u>
Line 16, after "102", replace ", when" by -- . When --;
Line 26, after "tip end side.", delete "side, as described in the embodiments above."

Signed and Sealed this

Tenth Day of June, 2003

JAMES E. ROGAN
*Director of the United States Patent and Trademark Office*